(12) United States Patent
Suntych

(10) Patent No.: US 11,278,009 B2
(45) Date of Patent: *Mar. 22, 2022

(54) PHOTON MODULATION MANAGEMENT SYSTEM FOR STIMULATION OF A DESIRED RESPONSE IN BIRDS

(71) Applicant: XIANT TECHNOLOGIES, INC., Greeley, CO (US)

(72) Inventor: Jon Daren Suntych, Greeley, CO (US)

(73) Assignee: XIANT TECHNOLOGIES, INC., Greeley, CO (US)

( * ) Notice: Subject to any disclaimer, the term of this patent is extended or adjusted under 35 U.S.C. 154(b) by 170 days.

This patent is subject to a terminal disclaimer.

(21) Appl. No.: 16/836,537

(22) Filed: Mar. 31, 2020

(65) Prior Publication Data

US 2020/0281167 A1    Sep. 10, 2020

Related U.S. Application Data

(63) Continuation of application No. 16/247,107, filed on Jan. 14, 2019, now Pat. No. 10,609,909, which is a continuation of application No. 15/907,995, filed on Feb. 28, 2018, now Pat. No. 10,182,557, which is a continuation of application No. 15/424,040, filed on
(Continued)

(51) Int. Cl.
| | | |
|---|---|---|
| A01K 45/00 | (2006.01) | |
| A01K 39/012 | (2006.01) | |
| A01K 29/00 | (2006.01) | |
| H05B 47/16 | (2020.01) | |
| H05B 47/165 | (2020.01) | |

(52) U.S. Cl.
CPC ............ *A01K 45/00* (2013.01); *A01K 29/005* (2013.01); *A01K 39/012* (2013.01); *H05B 47/16* (2020.01); *H05B 47/165* (2020.01); *Y02B 20/40* (2013.01)

(58) Field of Classification Search
CPC .... A01K 29/005; A01K 45/00; H05B 47/165; H05B 47/16
See application file for complete search history.

(56) References Cited

U.S. PATENT DOCUMENTS 2,300,727 A    11/1942    Durling
2,986,842 A     6/1961    Toulmin, Jr.
(Continued)

FOREIGN PATENT DOCUMENTS

CA    2914575 A1    12/2014
CN    203840585 U    9/2014
(Continued)

OTHER PUBLICATIONS

Hendricks, Sterling B.; How Light Interacts With Living Matter; Scientific American, Inc.; 1968; pp. 175-186.
(Continued)

*Primary Examiner* — Monica L Barlow
(74) *Attorney, Agent, or Firm* — Weatherly IP Solutions, LLC; James M. Weatherly

(57) ABSTRACT

Embodiments described herein provide systems and methods for stimulating a desired response, such as ovulation and egg laying, fertility, hunger, growth, mood and sexual maturity in birds or ayes, by controlling the pulsing of two or more different wavelength bands, duty cycle, and frequency of photon bursts within a photon signal to a bird, where the photon modulation and duty cycle is based upon the specific needs of the bird.

30 Claims, 40 Drawing Sheets

Related U.S. Application Data

Feb. 3, 2017, now Pat. No. 9,907,296, which is a continuation of application No. 15/278,676, filed on Sep. 28, 2016, now Pat. No. 9,560,837, which is a continuation-in-part of application No. 14/943,135, filed on Nov. 17, 2015, now Pat. No. 9,844,209, and a continuation-in-part of application No. PCT/US2015/047239, filed on Aug. 27, 2015, and a continuation-in-part of application No. 14/197,949, filed on Mar. 5, 2014, now Pat. No. 9,526,215.

(60) Provisional application No. 62/083,779, filed on Nov. 24, 2014, provisional application No. 62/043,523, filed on Aug. 29, 2014, provisional application No. 61/929,872, filed on Jan. 21, 2014, provisional application No. 61/772,856, filed on Mar. 5, 2013.

(56) References Cited

U.S. PATENT DOCUMENTS

| | | |
|---|---|---|
| 3,089,280 A | 5/1963 | Klaas |
| 3,352,058 A | 11/1967 | Brant |
| 3,703,051 A | 11/1972 | Weinberger |
| 3,876,907 A | 4/1975 | Widmayer |
| 3,930,335 A | 1/1976 | Widmayer |
| 3,931,695 A | 1/1976 | Widmayer |
| 4,396,872 A | 8/1983 | Nutter |
| 4,749,916 A | 6/1988 | Yamazaki et al. |
| 5,012,609 A | 5/1991 | Ignatius et al. |
| 5,173,737 A | 12/1992 | Mitchell |
| 5,381,075 A | 1/1995 | Jordan |
| 5,454,187 A | 10/1995 | Wasserman |
| 5,675,931 A | 10/1997 | Wasserman |
| 5,818,734 A | 10/1998 | Albright |
| 6,396,938 B1 | 5/2002 | Tao |
| 6,615,538 B2 | 9/2003 | Hittin |
| 6,860,225 B2 | 3/2005 | Hebrank |
| 6,940,424 B2 | 9/2005 | Philiben |
| 7,160,717 B2 | 1/2007 | Everett |
| 7,600,343 B2 | 10/2009 | Schultheiss et al. |
| 8,074,397 B2 | 12/2011 | Yoneda et al. |
| 8,181,387 B2 | 5/2012 | Loebl et al. |
| 8,302,346 B2 | 11/2012 | Hunt et al. |
| 8,384,047 B2 | 2/2013 | Shur et al. |
| 8,596,804 B2 | 12/2013 | Grajcar |
| 8,847,514 B1 | 9/2014 | Reynoso et al. |
| 8,858,005 B2 | 10/2014 | Grajcar |
| 8,876,313 B2 | 11/2014 | Grajcar |
| 9,016,240 B2 | 4/2015 | Delabbio |
| 9,185,888 B2 | 11/2015 | Grajcar |
| 9,433,194 B2 | 9/2016 | Grajcar et al. |
| 9,482,397 B2 | 11/2016 | Grajcar |
| 9,526,215 B2 | 12/2016 | Suntych |
| 9,560,837 B1 | 2/2017 | Suntych |
| 9,675,054 B2 | 6/2017 | Grajcar et al. |
| 9,700,019 B2 | 7/2017 | Grajcar |
| 9,709,228 B2 | 7/2017 | Grajcar |
| 9,756,837 B2 | 9/2017 | Grajcar |
| 9,844,209 B1 | 12/2017 | Suntych |
| 9,844,210 B2 | 12/2017 | Grajcar et al. |
| 9,907,296 B2 | 2/2018 | Suntych |
| 10,028,448 B2 | 7/2018 | Grajcar et al. |
| 10,182,557 B2 | 1/2019 | Suntych |
| 10,212,892 B2 | 2/2019 | Grajcar |
| 10,244,595 B2 | 3/2019 | Grajcar |
| 10,524,426 B2 | 1/2020 | Grajcar |
| 10,609,909 B2 | 4/2020 | Suntych |
| 10,638,669 B2 | 5/2020 | Suntych |
| 2003/0009933 A1 | 1/2003 | Yoneda et al. |
| 2003/0172878 A1 | 9/2003 | El Halawani et al. |
| 2004/0109302 A1 | 6/2004 | Yoneda et al. |
| 2005/0076563 A1 | 4/2005 | Faris |
| 2005/0152143 A1 | 7/2005 | Lee et al. |
| 2005/0152146 A1 | 7/2005 | Owen et al. |
| 2007/0151149 A1 | 7/2007 | Karpinski |
| 2009/0007486 A1 | 1/2009 | Corradi |
| 2009/0047722 A1 | 2/2009 | Wilkerson et al. |
| 2009/0280223 A1 | 11/2009 | Scott |
| 2010/0115830 A1 | 5/2010 | Dube |
| 2010/0121131 A1 | 5/2010 | Mathes |
| 2010/0217358 A1 | 8/2010 | Herbert |
| 2010/0236497 A1 | 9/2010 | Philiben |
| 2010/0244724 A1 | 9/2010 | Jacobs et al. |
| 2011/0109236 A1 | 5/2011 | Zhurin |
| 2011/0115385 A1 | 5/2011 | Waumans et al. |
| 2011/0159562 A1 | 6/2011 | Deisseroth et al. |
| 2011/0179706 A1 | 7/2011 | Hunt et al. |
| 2011/0209404 A1 | 9/2011 | Scott |
| 2012/0042419 A1 | 2/2012 | Wilson et al. |
| 2012/0067296 A1 | 3/2012 | Hornung |
| 2012/0107792 A1 | 5/2012 | Babbitt et al. |
| 2012/0107921 A1 | 5/2012 | Willson et al. |
| 2012/0270304 A1 | 10/2012 | Johnson et al. |
| 2012/0293472 A1 | 11/2012 | Wong et al. |
| 2013/0008085 A1 | 1/2013 | Aikala et al. |
| 2013/0023044 A1 | 1/2013 | Gleason |
| 2013/0042523 A1 | 2/2013 | Lee et al. |
| 2013/0042527 A1 | 2/2013 | Aikala et al. |
| 2013/0044474 A1 | 2/2013 | Aikala et al. |
| 2013/0047503 A1 | 2/2013 | Aikala et al. |
| 2013/0076239 A1 | 3/2013 | Chung et al. |
| 2013/0133947 A1 | 5/2013 | Miller |
| 2013/0139437 A1 | 6/2013 | Maxik |
| 2014/0158050 A1 | 6/2014 | Grajcar |
| 2014/0250778 A1 | 9/2014 | Suntych |
| 2015/0150195 A1 | 6/2015 | Grajcar |
| 2015/0237890 A1 | 8/2015 | Grajcar |
| 2015/0273235 A1 | 10/2015 | Grajcar |
| 2016/0007424 A1 | 1/2016 | Maxik et al. |
| 2016/0011497 A1 | 1/2016 | Akiyama |
| 2016/0014974 A1 | 1/2016 | Grajcar et al. |
| 2016/0120155 A1 | 5/2016 | Grajcar |
| 2016/0165698 A1 | 6/2016 | Grajcar |
| 2016/0165859 A1 | 6/2016 | Grajcar |
| 2017/0000163 A1 | 1/2017 | Grajcar |
| 2017/0071166 A1 | 3/2017 | Grajcar et al. |
| 2017/0071167 A1 | 3/2017 | Grajcar et al. |
| 2017/0071168 A1 | 3/2017 | Grajcar et al. |
| 2017/0074464 A1 | 3/2017 | Grajcar et al. |
| 2017/0105391 A1 | 4/2017 | Grajcar |
| 2017/0135325 A1 | 5/2017 | Grajcar et al. |
| 2017/0259079 A1 | 9/2017 | Grajcar et al. |
| 2017/0290124 A1 | 10/2017 | Grajcar |
| 2017/0347532 A1 | 12/2017 | Suntych |
| 2018/0125040 A1 | 5/2018 | Grajcar et al. |
| 2018/0295788 A1 | 10/2018 | Grajcar et al. |
| 2019/0174594 A1 | 6/2019 | Grajcar |

FOREIGN PATENT DOCUMENTS

| | | |
|---|---|---|
| EP | 1374665 | 1/2004 |
| EP | 2044835 A1 | 4/2009 |
| JP | 4-75779 A | 3/1992 |
| JP | 9-275779 A | 10/1997 |
| JP | 10-178899 A | 7/1998 |
| JP | 2014064479 | 4/2014 |
| JP | 2015-192654 | 11/2015 |
| WO | 2001/62070 A1 | 8/2001 |
| WO | 2009046548 A3 | 4/2009 |
| WO | 2011086358 A2 | 7/2011 |
| WO | 2011/115123 A1 | 9/2011 |
| WO | 2013/113096 W1 | 8/2013 |
| WO | 2014011623 A2 | 1/2014 |
| WO | 2014/138262 A1 | 9/2014 |
| WO | 2015/106380 A1 | 7/2015 |
| WO | 2016/033350 A1 | 3/2016 |

OTHER PUBLICATIONS

PCT/US2014/20809—International Search Report and Written Opinion, dated Jun. 20, 2014.

(56) References Cited

OTHER PUBLICATIONS

United States Standards,Grades, and Weight Classes for Shell Eggs, United States Department of Agriculture, Agricultural Marketing Service, AMS 56, Jul. 20, 2000.
Hy-Line W-36 Commercial Layers, Management Guide, Hy-Line International, Jan. 2016.
Response to USPTO non-final office action, U.S. Appl. No. 14/197,949 (Publication 20140250778), dated May 13, 2016.
Non-Final Office Action,U.S. Appl. No. 14/197,949, mailed by USPTO dated Feb. 17, 2016.
The Science of Poultry Lighting. A Bird's Eye View. Once Innovations, Inc. published online, 2014.
Improved Reproductive Activities of Egg Type Birds By Green Opsin Manipulations, published online, 2014.
Energy Efficiency in Poultry House Lighting, N. Burrow, University of Kentucky,published on line at least as early as 2014.
PCT/US2015/047239—International Search Report and Written Opinion, dated Aug. 27, 2015.
PCT/US2016/054197—International Search Report and Written Opinion, dated Feb. 9, 2017.
Non-Final Office Action,U.S. Appl. No. 15/385,517, mailed by USPTO dated Jun. 26, 2017.
Response to USPTO non-final office action, U.S. Appl. No. 15/385,517, dated Sep. 18, 2017.
EPO Application No. 14761009, European Search Report, dated Sep. 12, 2016.
JP Application No. 2015-561614, English translation of Final Office Action dated Oct. 31, 2017.
CN Application No. 201480011700.9, English translation of Office Action dated Sep. 5, 2017.
Response to USPTO final office action, U.S. Appl. No. 15/385,517, dated Apr. 20, 2018.
CN Application No. 201680073509.6, English translation of Office Action dated Dec. 4, 2018.
CN Application No. 201680073509.6, English translation of Office Action dated May 24, 2019.
NZ Application No. 742370, Office Action dated May 22, 2019.
Response to office action as filed, CN Application No. 201680073509.6, dated Mar. 2019.
NZ Application No. 742370, First Office Action dated Oct. 30, 2018.
Response as filed NZ Application No. 742370, First Office Action dated Apr. 24, 2019.
EP Application No. 16781253.6, First office action dated May 29, 2019.
Response as filed EP Application No. 16781253.6, dated Oct. 7, 2019.
JP Application No. 2015-561614, English translation of Office Action dated May 23, 2017.
Japan Application: 2018-525590, Notice of Reasons for Rejection; dated Nov. 5, 2019.
Japan Application: 2018-525590, Response as filed Feb. 4, 2020.
Response to USPTO non-final office action, U.S. Appl. No. 15/385,517, dated May 28, 2019.
Response to USPTO final office action, U.S. Appl. No. 15/385,517, dated Feb. 26, 2020.
Response to USPTO non-final office action, U.S. Appl. No. 15/506,530, dated Aug. 20, 2019.
EP Application No. 16781253.6, Response as filed, dated Oct. 7, 2019.
China Application No. 201480011700.9—Response and amendment to China Notification of First Action, dated Jan. 18, 2018.
EPO Application EP15834847.4—Response and amendment to claims for European filing from PCT/US2015/47239, dated Nov. 5, 2018.
EPO Search Report 15834847.4—European Search Report dated Apr. 18, 2018, 13 pages.
First Non-Final Office Action,U.S. Appl. No. 15/385,517, dated Jun. 26, 2017.
Japan Application 2015-561614—Notice of Reasons for Rejection, dated Mar. 6, 2018.
U.S. Appl. No. 15/385,517, Declaration of Inventor under 37 CFR 1.131, dated Feb. 25, 2020.

US 11,278,009 B2

PHOTON MODULATION MANAGEMENT SYSTEM FOR STIMULATION OF A DESIRED RESPONSE IN BIRDS

CROSS REFERENCE TO RELATED APPLICATION

The present application is a continuation and claims priority to U.S. application Ser. No. 16/247,107, filed on Jan. 14, 2019, which is a continuation of U.S. Pat. No. 10,182, 557, which issued on Jan. 22, 2019, which is a continuation of U.S. Pat. No. 9,907,296, issued on Mar. 6, 2018, which is a continuation of U.S. Pat. No. 9,560,837, issued on Feb. 7, 2017, which is a continuation-in-part of and claims priority to U.S. Pat. No. 9,844,209, issued on Dec. 19, 2017, U.S. Provisional Application No. 62/083,779, as filed on Nov. 24, 2014, and claims priority to U.S. Application No. 62/043, 523, as filed Aug. 29, 2014, PCT Application No. PCT/US15/47239, as filed Aug. 27, 2015, U.S. Pat. No. 9,526, 215, issued on Dec. 27, 2016, U.S. Provisional Application No. 61/929,872, as filed on Jan. 21, 2014, and U.S. Provisional Application No. 61/772,856, as filed on Mar. 5, 2013, the entire contents are herein incorporated by reference for all the applications and issued patents teach and disclose.

The foregoing examples of related art and limitations related therewith are intended to be illustrative and not exclusive, and they do not imply any limitations on the inventions described herein. Other limitations of the related art will become apparent to those skilled in the art upon a reading of the specification and a study of the drawings.

SUMMARY

The following embodiments and aspects thereof are described and illustrated in conjunction with systems, tools and methods, which are meant to be exemplary and illustrative, not limiting in scope.

An embodiment of the present invention comprises a system for inducing a desired response in a bird, the system comprising: at least one photon emitter; at least one photon emission modulation controller in communication with the at least one photon emitter; where the at least one photon emitter is configured to produce a photon signal to the bird, where the photon signal comprises two or more independent components, where the two or more independent components comprise: a first independent component comprising a repetitive first modulated photon pulse group, where the first modulated photon pulse group has one or more photon pulse ON durations between 0.01 microseconds and 5000 milliseconds with one or more intensities, has one or more photon pulse OFF durations between 0.1 microseconds and 24 hours, and a wavelength color; and a second independent component comprising a repetitive second modulated photon pulse group, where the second modulated photon pulse group has one or more photon pulse ON durations between 0.01 microseconds and 5000 milliseconds with one or more intensities, has one or more second photon pulse OFF durations between is between 0.1 microseconds and 24 hours, and a wavelength color; where the first independent component and the second independent component are produced within the signal simultaneously; where the second modulated photon pulse group is different from the first modulated photon pulse group; and emitting the signal toward the bird from the at least one photon emitter, where the combined effect of the first modulated photon pulse group and the second modulated photon pulse group of the signal produces a desired response from the bird.

An embodiment of the present invention comprises a method for inducing a desired response in a bird, where the method comprises: providing at least one emission modulation controller in communication with the at least one photon emitter; communicating a command from the at least one photon emission modulation controller to the at least one photon emitter; providing a photon signal to the bird, where the photon signal comprises two or more independent components, where the two or more independent components comprise: a first independent component comprising a repetitive first modulated photon pulse group, where the first modulated photon pulse group has one or more photon pulse ON durations between 0.01 microseconds and 5000 milliseconds with one or more intensities, has one or more photon pulse OFF durations between 0.1 microseconds and 24 hours, and a wavelength color; and a second independent component comprising a repetitive second modulated photon pulse group, where the second modulated photon pulse group has one or more photon pulse ON durations between 0.01 microseconds and 5000 milliseconds with one or more intensities, has one or more second photon pulse OFF durations between is between 0.1 microseconds and 24 hours, and a wavelength color; where the first independent component and the second independent component are produced within the signal simultaneously; where the second modulated photon pulse group is different from the first modulated photon pulse group; and emitting the signal toward the bird from the at least one photon emitter, where the combined effect of first modulated photon pulse group and the second modulated photon pulse group of the signal produces a desired response from the bird.

BRIEF DESCRIPTION OF THE FIGURES

The accompanying drawings, which are incorporated herein and form a part of the specification, illustrate some, but not the only or exclusive, example embodiments and/or features. It is intended that the embodiments and figures disclosed herein are to be considered illustrative rather than limiting.

FIG. 8b is a photo showing the backside of the multiple colored die within a single LED of FIG. 8a.

FIG. 8c is a photo showing the high-speed switching circuitry for flashing of the multiple colored die within a single LED of FIG. 8a.

DETAILED DESCRIPTION

Figure 1:
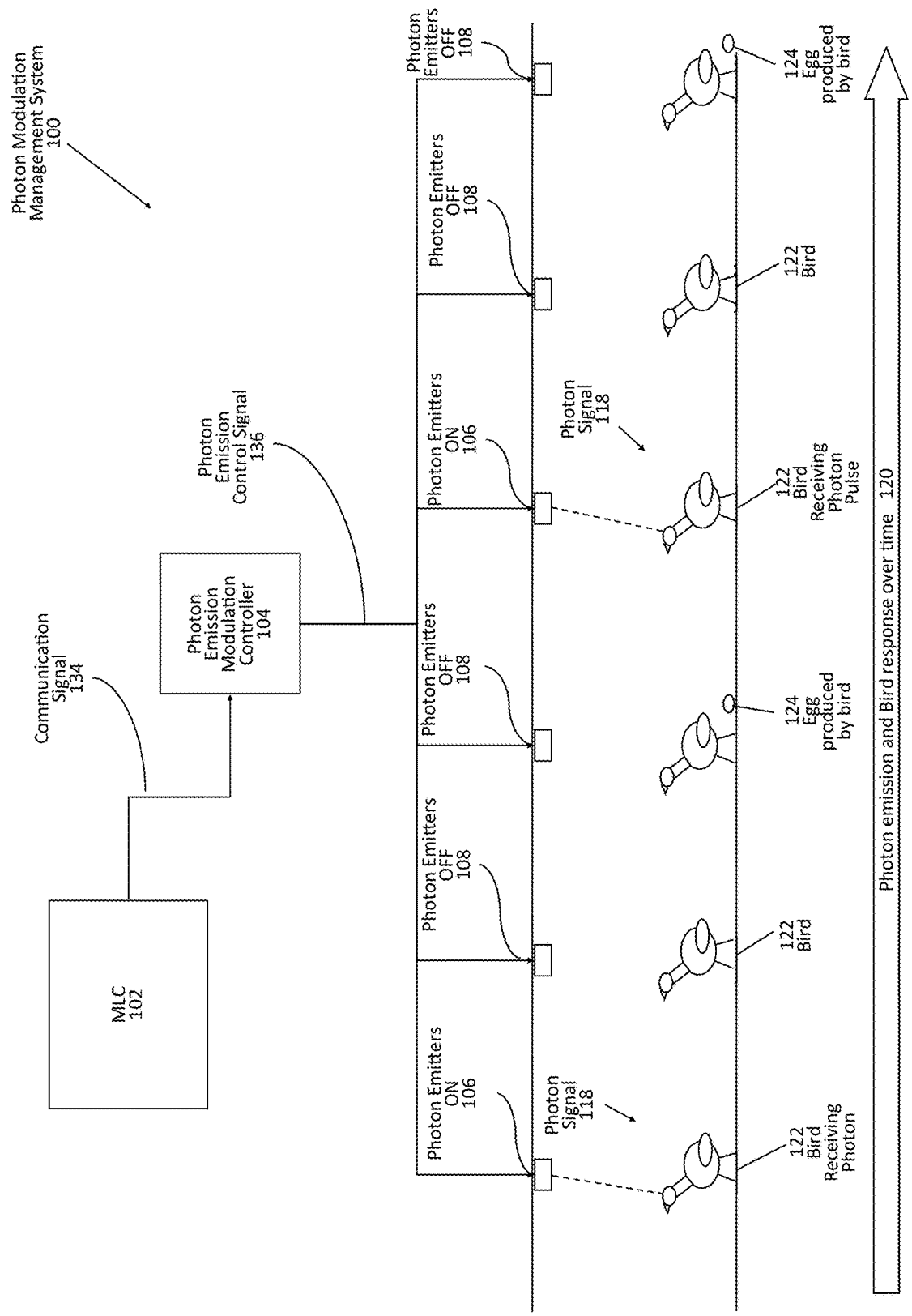
FIG. 1 is a diagram showing an example of a photon modulation growth system for stimulation of egg production.

Embodiments of the present disclosure provide systems, apparatuses and methods for inducing a desired response in egg laying vertebrates, such as birds or ayes, including but not limited to, chickens, grouse, quail, pheasant, quail, parrots, water fowl, geese, swans, doves, birds of prey, song birds, turkey, owls, vultures, penguins, hummingbirds, ostrich, duck or other birds, where the desired response includes but is not limited to fertility, ovulation, hunger, egg production, growth, sexual maturity, behavior and socialization and interpolation of circadian inputs. Examples include, but are not limited to; creating electro-magnetic wave emission pulse trains (photons) of individual color spectrums in sufficient intensity to drive photochemical response in a bird to stimulate egg production, using a characteristic frequency or pattern to minimize the required input power necessary to stimulate, while also allowing for the monitoring of the power consumption and other variables of the system. As will be discussed in further detail, by controlling the duty cycle, intensity, wavelength band and frequency of photon signals to a bird, such as stimulation of fertility, ovulation, or egg production or ovulation can not only be influenced by a human, but ovulation and egg production rates, size and quality, hunger, growth and mood can be controlled through the cycling between colors such as blue, green, yellow, near-red, far-red, infrared and ultra violet photon modulation.

Specifically by combining multiple repetitive wavelengths of photons pulses into photon signals at specific combination of rates, photochemical response by the birds can be optimized and controlled in order to stimulate egg production, development of pullets (young chickens) and poulets (young turkeys) and the finishing of birds or boilers (birds for meat).

The embodiments of the present disclosure induce a desired response in a bird, such as, hunger, fertility, sexual maturity, calming or production of eggs at a faster and or slower rate than traditional grow light systems used in egg laying or production. Each light "recipe" or option (a photon signal having one or more repetitive modulated photon pulse groups with one or more first photon pulse ON durations with one or more first intensities, one or more first photon pulse OFF durations, and a first wavelength color) can be optimized for each desired response to each species of bird.

An additional example embodiment to the methods, systems and apparatuses described herein may include less heat creation: LED lighting intrinsically creates less heat than conventional grow lights. When LED lights are used in a dosing application, they are ON less than they are OFF. This creates an environment with nominal heat production from the LED lights. This is not only beneficial in terms of not having to use energy to evacuate the heat from the system, but is beneficial to the bird because lighting may also be used to reduce animal stress or calm the animal while also reducing the risk of burning the bird.

For many types of birds, egg production is based on a day/night cycle, where longer day lengths induce increased egg production. As winter approaches egg laying decreases with many if not most species of bird. To combat the decrease in egg production, artificial light is often used in egg laying facilities to recreate or mimic a longer day length as opposed to night. Artificial light is often used throughout the chicken production process including but not limited to breeder houses, hatcheries, and broiler houses, to promote bird growth and egg production.

Growing birds within buildings and vertical farms requires the usage of powered lighting to provide essential light for egg production and animal growth. These lights often are electrically powered and emit photons used for biological processes such as ovulation, egg laying, muscle growth and development, mood control, and hunger. Examples of various light or photon sources include, but are not limited to, metal halide light, fluorescent light, high-pressure sodium light, incandescent light and LEDs.

While light is the key component of the egg production in birds, this system differs from other historical and even cutting edge lighting technologies as it is used as the fundamental controller of bird activity. Likewise, while LED technology is a core component of lighting in the present disclosure, it is a unique application of LED technology coupled with other engineering that dramatically expands the potential for reducing costs, increasing output, and enhancing control compared to existing lighting technology for the commercial production of eggs, breeder hens and broilers for meat.

An embodiment herein includes one or more repetitive modulated photon pulse groups within a photon signal, where each repetitive pulse group has individual color spectrums or ranges of color spectrums, including ultraviolet, blue, green, infrared, and/or red spectrums, at a frequency, intensity and duty cycle, which can be customized, monitored and optimized for the specific desired response, such as ovulation, egg production, hunger, mood and behavior, young bird growth and development as well as the finishing of broiler birds for meat while minimizing energy used in the system. By supplying control over the rates and efficiencies of modulated photon energy to the bird, different parts of the photostimulation of the bird's phytochromes located in the hypothalamus and the retina (such as red opsins and green opsins) photo receptors are maximized allowing for optimal influence on the desired response (such as egg laying) while also allowing for control of a birds response.

Opsins are a type of membrane bound phytochrome receptors found in the retina and the hypothalamus region of the brain of birds and mammals. Opsins mediate a variety of functions in birds and mammals, including ovulation, egg laying and behavior, through the conversion of photons of light into an electrochemical signal.

Photons are massless, elementary particles with no electric charge. Photons are emitted from a variety of sources such as molecular and nuclear processes, the quantum of light and all other forms of electromagnetic radiation. Photon energy can be absorbed by phytochromes in living birds, and convert it into an electrochemical signal which manipulates a metabolite.

This phenomenon can be seen in the vision opsin chromophore in humans. The absorption of a photon of light results in the photoisomerisation of the chromophore from the 11-cis to an all-trans conformation. The photoisomerization induces a conformational change in the opsin protein, causing the activation of the phototransduction cascade. The result is the conversion of rhodopsin into prelumirhodopsin with an all-trans chromophore. The opsin remains insensitive to light in the trans form. The change is followed by several rapid shifts in the structure of the opsin and also changes in the relation of the chromophore to the opsin. It is regenerated by the replacement of the all-trans retinal by a newly synthesized 11-cis-retinal provided from the retinal epithelial cells. This reversible and rapid chemical cycle is responsible for the identification and reception to color in humans. Similar biochemical processes exist in birds. Phytochromes and pheophytins behave very similarly to opsins in that they can be rapidly regulated to switch between the cis and trans configurations by dosing with differing wavelengths of light.

The responses of birds to the variations in the length of day and night involve photon absorption molecular changes that closely parallel those involved in the vision cycle in humans.

Bird responses to a photon signal with one or more specific photon modulations may be monitored depending upon the desired response. When the desired response is the production of eggs, the bird may be monitored for the release of luteinizing hormones, a heterodimeric glycoprotein to indicate impending ovulation in female birds. Luteinizing hormones may be monitored via blood or urinary samples. Samples may be taken daily or at various times during the day to identify the birds reaction to the photon modulation to ensure efficient egg production.

The present disclosure also provides methods and systems for the amount of electric power used in the process of bird egg production, as well as young and broiler bird growth and development, to be monitored and reduced, where the amount of energy delivered can be defined by calculating the total area under the graph of power over time. The present disclosure further provides methods and systems that allow for the monitoring, reporting and control of the amount of electric power used to stimulate a desired response in a bird, allowing an end user or energy provider to identify trends in energy use.

An embodiment of the system of the present disclosure comprises at least one photon emitter with at least one photon source, such as an LED in communication with a photon emission modulation controller, including but not limited to a digital output signal, a solid-state relay, field-effect transistor ("FET") or power converter. Photon emitters are modulated to send a repetitive pulse, waveform or pulse train of photons, where each individual pulse comprises at least one color spectrum, wavelength or multiple color spectrums or wavelengths and is capable varying intensities. Each photon pulse is directed toward a bird for a duration of time ON, such as two milliseconds with one or more intensities, with a duration of delay or time OFF between photon pulses, such as two hundred milliseconds or up to 24 hours.

As used herein "bird" includes warm-blooded, vertebrates, including but not limited to, birds or aves, including but not limited to, chickens, grouse, quail, pheasant, quail, parrots, water fowl, geese, swans, doves, birds of prey, song birds, turkey, owls, vultures, penguins, hummingbirds, ostrich, duck or other birds.

As used herein, "duty cycle" is the length of time it takes for a device to go through a complete ON/OFF cycle or photon signal. Duty cycle is the percent of time that an entity spends in an active state as a fraction of the total time under consideration. The term duty cycle is often used pertaining to electrical devices, such as switching power supplies. In an electrical device, a 60% duty cycle means the power is on 60% of the time and off 40% of the time. An example duty cycle of the present disclosure may range from 0.01% to 90% including all integers in between.

As used herein "frequency" is the number of occurrences of a repeating event per unit time and any frequency may be used in the system of the present disclosure. Frequency may also refer to a temporal frequency. The repeated period is the duration of one cycle in a repeating event, so the period is the reciprocal of the frequency.

As used herein, the term "waveform" refers to the shape of a graph of the varying quantity against time or distance.

As used herein, the term "pulse wave" or "pulse train" is a kind of non-sinusoidal waveform that is similar to a square wave, but does not have the symmetrical shape associated with a perfect square wave. It is a term common to synthesizer programming, and is a typical waveform available on many synthesizers. The exact shape of the wave is determined by the duty cycle of the oscillator. In many synthesizers, the duty cycle can be modulated (sometimes called pulse-width modulation) for a more dynamic timbre. The pulse wave is also known as the rectangular wave, the periodic version of the rectangular function.

In an embodiment of the present disclosure and as will be described in further detail below, the emission of one or more repetitive photon pulses within a photon signal from the growth system described herein where each repetitive photon pulse has a duration ON with one or more intensities and a duration OFF, a wavelength band and duty cycle induces a gain efficiency greater than 1 where Gain=Amplitude out/Amplitude in.

FIG. 1 provides a block diagram showing an example of a photon modulation management system 100. As shown in FIG. 1, a photon emitter 106 and 108 is shown over a period of time in communication with a photon emission modulation controller 104 for the purpose of modulating the emission of photons to a bird for inducing a wide range of desired responses in birds including but not limited to ovulation, sexual maturity, mood and hunger. The modulated application of photons to a bird by providing photon pulses of one or more frequencies followed by pulses of one or more other frequencies for a duration along with a delay between pulses, allows for peak stimulation/modulation of a bird's biological components (opsins receptors) and biological responses, such as a the pulsing of one or more specific spectrums of light to induce a specific electrochemical signal for the production of a specific metabolite. Further, the modulation of photons to a bird allows for the optimization of photon absorption by opsin receptors without oversaturation of the receptors. As described below, the modulation of the photon pulses increase energy and heat efficiency of current poultry production lighting systems by reducing the overall power draw by the system of the present disclosure as much as 99% or more of the photon source when compared to conventional poultry production lighting systems, such as a 60 watt grow light, thereby reducing the amount of power and cost used to facilitate egg production from a bird. In an example of the energy saving potential of the present disclosure, the system pulses 49.2 watts of photons for two microseconds per 200 microseconds creating an effective power consumption of 0.49 watt-hrs/hr on the power payment meter or 0.82% of the power in a 60 watt standard incandescent bulb. In addition, because the photon emitter is not continuously emitting photons, the amount of heat produced from the photon emitter will be significantly reduced, thereby significantly reducing the cost of cooling a facility to compensate for the increased heat from lighting. The system of the present disclosure may be customized based upon bird-specific requirements for photon intensity, pulse ON duration, pulse OFF (or duty cycle), the light spectrum of the pulse including but not limited to white, near-red, yellow, green, and blue, orange, far-red, infrared, and ultra-violet to encourage optimal ovulation, hunger, mood and sexual development for selected birds such as chickens, ducks, quail or turkeys.

As shown in FIG. 1, a master logic controller (MLC) 102, such as solid-state circuit with digital output control or a central processing unit (CPU) is in communication with a photon emission modulation controller 104 by means of a communication signal 134. The MLC 102 provides the system of the present disclosure with input/output of the parameters and the appropriate instructions or the specialized functions for the modulation of photons from a photon emitter 106 and 108.

In a further embodiment, the MLC 102 may be hard wired or wireless to an external source such as a host, allowing external access to the MLC 102 by a host. This allows remote access by a user to monitor the input and output of the MLC 102, provide instructions or control to the systems while also allowing for remote programming and monitoring of the MLC 102.

In a further embodiment, a power measurement or power consumption sensor may be integrated or embedded into the MLC 102 in the form of an integrated circuit allowing for the measurement and reporting of the power consumption of the system based on the voltage and the current draw of the system of the present disclosure. The power consumption of the system can then be communicated either wirelessly or by hardwire from the MLC 102 to a host. Data, including power consumption may also be sent to an outside receiver such as a database that is not connected to the system.

The photon emission modulation controller 104 receives commands and instructions from the MLC 102, including but not limited to, the duration ON and intensity, duration OFF duty cycle, intensity, wavelength band and frequency of each repetitive photon pulse within a photon signal 118 from a photon emitter 106. The photon emission modulation controller 104 may be any device that modulates the quanta and provides the control and command for the duration ON and intensity, duration OFF, wavelength band, and frequency of each repetitive photon pulse from a photon emitter 106 and 108. A variety of devices may be used as the photon emission modulation controller 104, including but not limited to a solid-state relay (SSR), such as the Magnacraft 70S2 3V solid-state relay from Magnacraft Inc., optical choppers, power converters and other devices that induce modulation of a photon pulse. A variety of photon emitters 106 and 108 may be used, including but not limited to, an incandescent (Tungsten-halogen and Xenon), Fluorescent (CFL's), high intensity discharge (Metal Halide, High-Pressure Sodium, Low-Pressure Sodium, Mercury Vapor), sunlight, light emitting diodes (LEDs). It should be understood that this description is applicable to any such system with other types of photon emission modulation controllers, including other methods to cycle a light or photon source ON and OFF, cycling one or more colors or spectrums of light at different times, durations and intensities, such as ultraviolet, violet, near-red, green, yellow, orange, blue and far-red, allowing multiple pulses of one spectrum before pulsing another spectrum or in combination, as will be understood by one skilled in the art, once they understand the principles of the embodiments. It should also be understood that this ON and OFF cycling can be in the form of a digital pulse, pulse train, or varying waveform.

As shown in FIG. 1, based on the instructions from the MLC 102, the photon emission modulation controller 104 sends a photon emission control signal 136 to a photon emitter 106. When the photon emission control signal 136 is sent to the photon emitter 106 goes ON, the photon emitter 106 emits at least one photon signal 118 where each photon signal comprises one or more repetitive photon pulses, where each repetitive photon pulse has separate duration ON with one or more intensities, a wavelength band and frequency, which is transmitted to a bird 122. Then based on the instructions from the MLC 102, when the photon emitter control signal 136 sent to the photon emitter 108 goes OFF, the photon emitter 108 will not emit a photon pulse, and therefore no photons are transmitted to a bird 122. As shown in FIG. 1, starting from the left side of FIG. 1, the emission of photons 118, such as a pulse of near-red photons, and bird 122 ovulation and egg production 124 is shown over a period of time 120. The example of FIG. 1 provides a photon signal 118, such as near-red, emitted from a photon emitter 106 for two (2) milliseconds with a duration of delay of two hundred (200) milliseconds before a second photon signal 118 is emitted from the same photon emitter 106 for two milliseconds (please note that FIG. 1 is a descriptive example of photon pulses emitted over time. FIG. 1 is not drawn to scale and the amount of growth by the bird between pulses in FIG. 1 is not necessarily accurate).

As will be understood by one skilled in art, in an additional embodiment, the system as described in FIG. 1 may be completely housed in a single unit comprising multiple photon emitters creating an array (shown in FIG. 3, FIG. 7, FIGS. 8a, 8b, 8c, 8d, and FIG. 9), allowing each individual single unit to be self-sufficient, without the need for an external control or logic unit. An example self-sufficient unit with multiple photon emitters may be in the form of a unit that may be connected to a light socket, or light fixtures that may be suspended above one or more birds and connected to a power source.

The systems as shown in FIG. 1 may also take the form of a master/slave system, as will be discussed in FIG. 4, where by example, a master photon emitter containing all logic and controls for the emission of photon from master photon emitter as well as any additional photon emitters in communication with the master photon emitter.

A variety of power supplies may be used in the present disclosure. These sources of power may include but are not limited to battery, converters for line power, solar and/or wind power. The intensity of the photon pulse may be static with distinct ON/OFF cycles or the intensity may be changes of 1% or larger of the quanta of the photon pulse. The intensity of the photon pulse from the photon emitter can be controlled through the variance of voltage and/or current from the power supplies and delivered to the light source. It will also be appreciated by one skilled in the art as to the support circuitry that will be required for the system of the present disclosure, including the photon emitter control unit and the photon emitters. Further, it will be appreciated that the configuration, installation and operation of the required components and support circuitry are well known in the art. The program code, if a program code is utilized, for performing the operations disclosed herein will be dependent upon the particular processor and programming language utilized in the system of the present disclosure. Consequently, it will be appreciated that the generation of a program code from the disclosure presented herein would be within the skill of an ordinary artisan.

Figure 2:
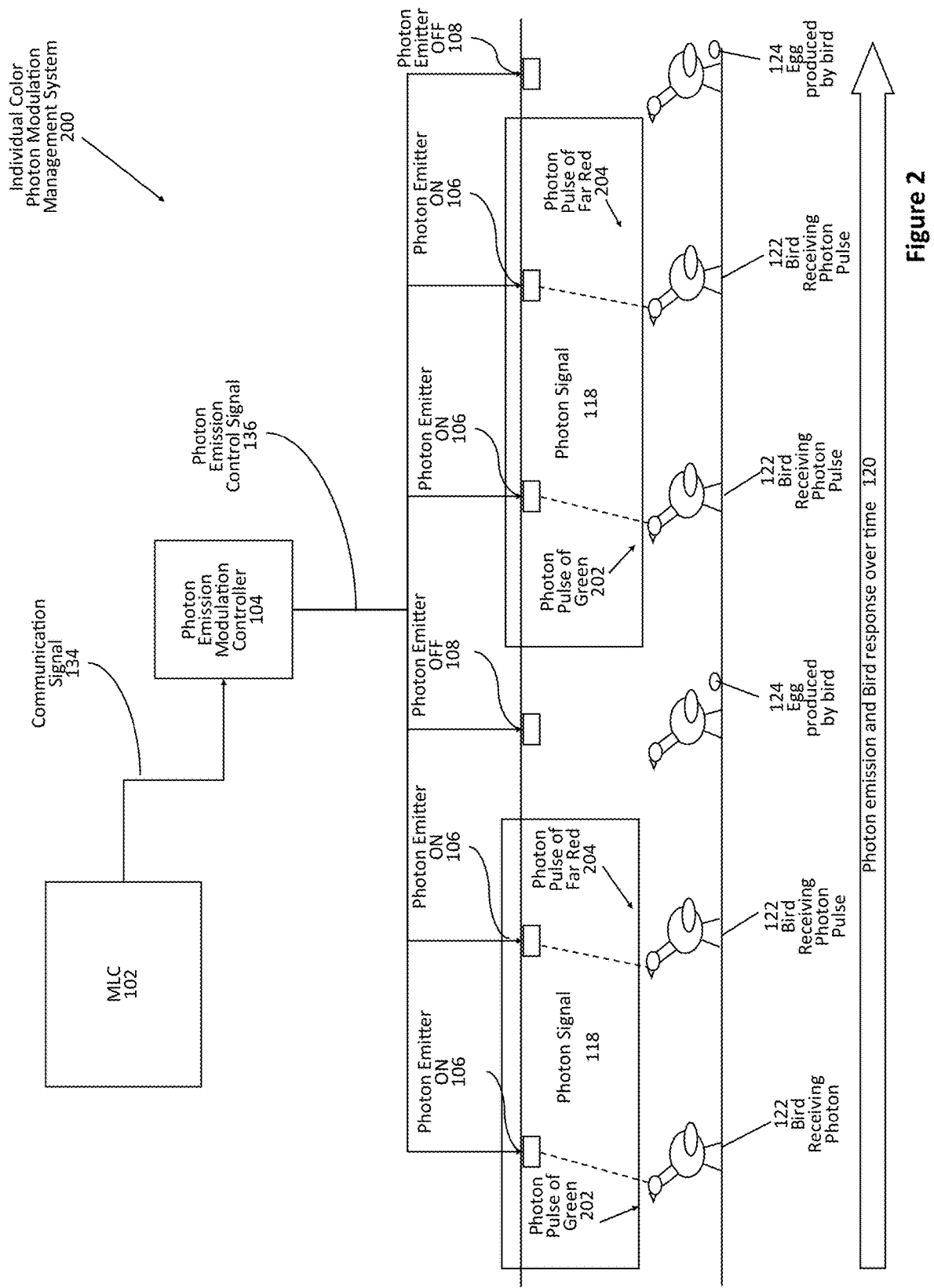
FIG. 2 is a diagram showing an example of an individual color photon modulation growth system pulsing different specific wavelengths of light within a signal to induce egg production in a bird.

FIG. 2 provide two different block diagrams showing examples of a photon modulation management system 200. As shown in FIG. 2 and repeated from FIG. 1, a photon emitter 106 and 108 is shown over a period of time in communication with a photon emission modulation controller 104 for the purpose of modulating individual pulses of photons comprising individual color spectrums to a bird, including but not limited to white, green, near-red, blue, yellow orange, far-red, infrared, and ultra-violet color spectrums, wavelength between 0.1 nm and 1 cm. As will be understood by one skilled in the art, the present disclosure may include color spectrums of specific, individual wavelengths between 0.1 nm and 1.0 cm, or may include a range or band of wavelengths 0.1 to 200 nm in width, herein "wavelength band."

The modulation of individual color spectrums of photons to a bird by providing specific color spectrum pulses for a duration along with a delay between pulses, allows for peak stimulation of a bird's biological components and responses, such as a bird's retina opsins and hypothalamus opsins for egg production. Examples of the ability to control specific aspects of a bird's biological components or responses through the pulsing of individual color spectrums, specific color wavelength or a range of color wavelengths may include, but are not limited to:

a. egg production through the modulation of pulses of a specific far-red or in combination with near red wavelengths (example wavelengths may include 620 nm to 850 nm) for a period of time;
b. hunger, growth, sexual development as well as helps to control the mood of the birds by pulses of blue light, as well as the regulation of circadian rhythms (an example range may include with a range of 450 nm to 495 nm);
c. ultraviolet or violet light (by example 10 nm to 450 nm) may be used to influence social behavior and mood as well as to facilitate nutrient update such as calcium;
d. green light (such as 560 nm, but may include 495 nm to 570 nm) may be used to promote or stimulate growth, including muscle growth, improve reproduction as well as egg quality; and
e. additional orange light (590 nm to 620 nm) and/or yellow light (570 nm to 590 nm) may also be used to influence bird responses.

The modulation of individual color spectrums, specific wavelength and a range of wavelengths of photons to a bird by providing specific color spectrum pulses for a duration along with a delay between pulses also allows for the control of growth or biological responses, such as mood, growth, ovulation, sexual maturity, and hunger in birds. An example may include one light or through the combination of many lights, cycling the lights on and off to control ovulation and growth in a bird.

As shown in FIG. 2 and repeated from FIG. 1, a master logic controller (MLC) 102 is in communication with a photon emission modulation controller 104 by means of a communication signal 134. The MLC 102 provides the system of the present disclosure with input/output of the parameters and the appropriate instructions or the specialized functions for the modulation of a specific individual color spectrum of photons from a photon emitter 106 and 108.

The photon emission modulation controller 104 receives commands and instructions from the MLC 102 including but not limited to the duration ON and intensity, duration OFF, wavelength band and frequency of each repetitive photon pulse 202 and 204 within a photon signal 118 or a plurality of pulses of a specific color spectrum from a photon emitter 106 and 108 within a photon signal. The photon emission modulation controller 104 provides the control and command for the duration ON and intensity, duration OFF, wavelength band and frequency of each repetitive photon pulse 202 and 204 within a photon signal 118 or plurality of pulses from a photon emitter 106, and 108.

As shown in FIG. 2, based on the instructions from the MLC 102, the photon emission modulation controller 104 sends a photon emission control signal 136 to a photon emitter 106 and 108. When the photon emission control signal 136 sent to the photon emitter 106 ON, the photon emitter 106 emits one or more repetitive photon pulses of a specific color spectrum 202 or 204, comprising the photon signal 118, which is transmitted to a bird 122. Then based on the instructions from the MLC 102, when the photon emitter control signal 136 sent to the photon emitter 108 goes OFF, the photon emitter 108 will not emit a photon signal, and therefore no photons are transmitted to a bird 122. As shown in FIG. 2, starting from the left side of FIG. 2, the emission of a photon signal 118 comprising repetitive photon pulses of a specific color spectrum 202 (green) and 204 (far-red) and bird 122 ovulation and egg production 124 is shown over a period of time 120. The example of FIG. 2 provides a photon signal 118 with photon pulse or plurality of pulses of a green color spectrum 202 emitted from a photon emitter 106 for two (2) milliseconds, followed by a photon pulse or plurality of pulses of a far-red color spectrum 204 for a duration of two (2) milliseconds with a duration of delay of two hundred (200) milliseconds of each pulse before the photon signal repeats with a photon pulse or plurality of pulses 202 emitted from the same photon emitter 106 for two milliseconds followed by a second photon pulse or plurality of pulses of a far-red color spectrum 204 for a duration of two milliseconds from the same photon emitter 114 (please note that FIG. 2 is a descriptive example of photon pulses emitted over time. FIG. 2 is not drawn to scale and the amount of growth or egg production by the bird between pulses in FIG. 2 is not necessarily to scale). While two photon pulses are shown in FIG. 2, as one skilled in the art will understand once they understand the invention, any number of pulses, from 1 to 15 or even more, may be within a photon signal.

The system of the present disclosure as described in FIGS. 1 and 2 allows for the manipulation and control of various responses by a bird through the cycling of one or more colors or spectrums of light at different times, durations and intensities, such as near-red, green, blue and far-red, allowing single pulses or multiple pulses of one spectrum with a delay before pulsing another spectrum. The pulsing of individual color spectrums in unison or individually for a duration with a delay between pulses allows for increased efficiency and speed from ovulation to finishing through control of the bird responses. The system described herein provides the ability to keep a bird in a particular response such as hunger or a specific mood.

By way of example, studies have shown that using the pulse of specific color spectrums to a bird, groups of birds may be induced to ovulate. At this point protocols may be changed on one group to encourage and allow for hunger or mood control.

A variety of sources or devices may be used to produce photons from the photon emitters, many of which are known in the art. However, an example of a devices or sources suitable for the emission or production of photons from a photon emitter include an LED, which may be packaged within an LED array designed to create a desired spectrum of photons. While LEDs are shown in this example, it will be understood by one skilled in the art that a variety of sources may be used for the emission of photons including but not limited to metal halide light, fluorescent light, high-pressure sodium light, incandescent light and LEDs. Please note that if a metal halide light, fluorescent light, high-pressure sodium light, incandescent light is used with the methods, systems and apparatuses described herein, the proper use of these forms of photon emitters would be to modulate and then filter the light to control what wavelength for what duration is passed through.

Embodiments of the present disclosure can apply to LEDs having various durations of photon emissions, including durations of photon emissions of specific color spectrums and intensity. The pulsed photon emissions of specific color spectrums within a photon signal may be longer or shorter depending on the bird in question, the age of the bird and how the emission will be used in facilitating biochemical processes for bird growth.

The use of an array of LEDs may be controlled to provide the optimal photon pulse of one or more color spectrums for specific bird ovulation or growth such as in chickens or turkeys. The user may simply select the photon pulse intensity, color spectrum, frequency and duty cycle for a particular type of bird to encourage efficient biological responses in birds. LED packages can be customized to meet each bird's specific requirements. By using packaged LED arrays with the customized pulsed photon emission, as discussed above, embodiments described herein may be used to control light to alter the shell thickness, bird weight, and sexual maturity within the target bird.

Figure 3:
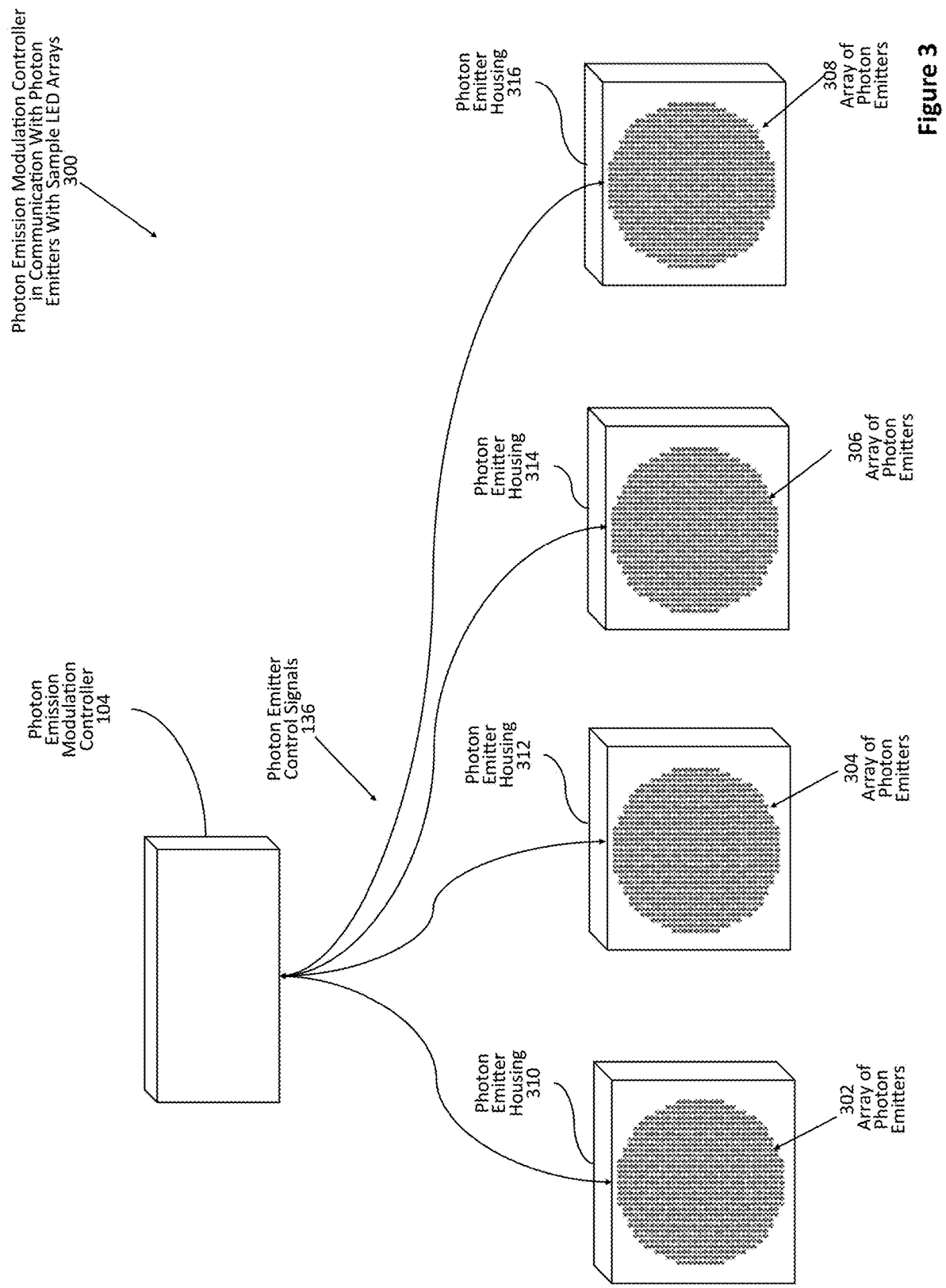
FIG. 3 is a diagram showing a photon emission modulation controller in communication with a plurality of photon emitters with sample LED arrays.

FIG. 3 is a diagram of an example of a plurality of photon emitters 106 and 108 with LED arrays 300 as the source of photons from the photon emitter. As shown in FIG. 3, a photon emission modulation controller 104 is in communication by means of a plurality of photon emitter control signals 136 with a plurality of photon emitters 106 and 108. As further shown in FIG. 3, each photon emitter 106 and 108, comprises an array of LEDs 302, 304, 306 and 308. Each array of LEDs 302, 304, 306 and 308 and the circuitry to allow for the array of LEDs to communicate with the photon emission modulation controller 104 are contained in an LED array housing 310, 312, 314 and 316.

As shown in FIG. 3, the shape of LED array is a circle, however as will be understood by one skilled in the art, the shape of the array may take a variety of forms based upon the needed biological response of the birds. The shape of the array may include but is not limited to, circular, square, rectangular, triangular, octagonal, pentagonal, rope lighting and a variety of other shapes.

The LED array housing 310, 312, 314 and 316 for each photon emitter 106 and 108, may be made of a variety of suitable materials including, but are not limited to, lastic, thermoplastic, and other types of polymeric materials. Composite materials or other engineered materials may also be used. In some embodiments, the housing may be made by a plastic injection molding manufacturing process. In some embodiments, the housing may be transparent or semi-transparent and in any color.

Figure 4:
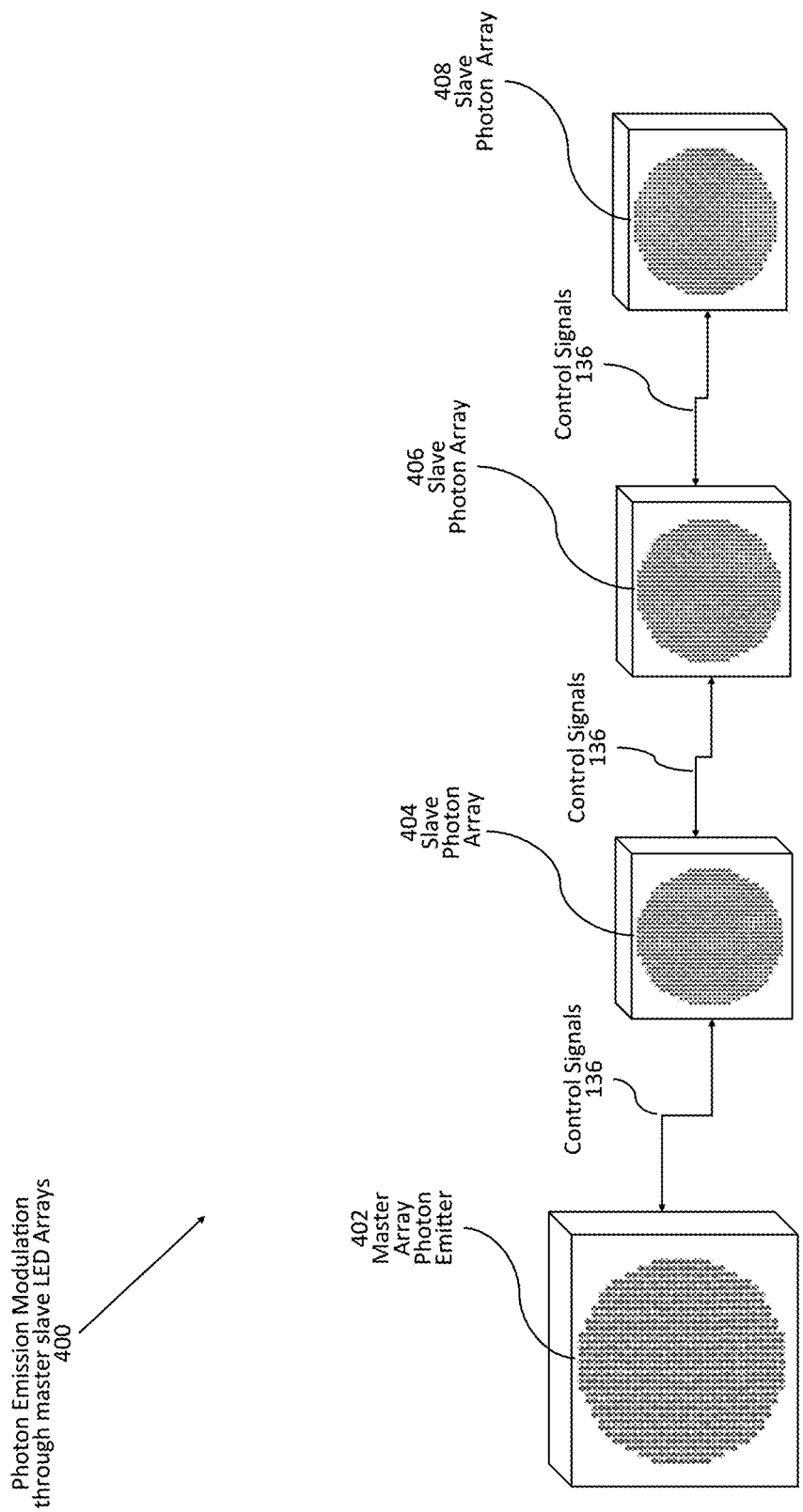
FIG. 4 is a diagram showing photon emission modulation through a master/slave LED array.

FIG. 4 is a diagram of an example of a plurality of photon emitters with a master photon emitter in communication and control of one or more slave photon emitters, 400. As shown in FIG. 4, a master photon emitter 402 is in communication by means of a photon control signal 136 with a series of slave photon emitters 404, 406, and 408. The master photon emitter 402 contains a controller, such as the MLC (102 of FIGS. 1 and 2), as well as photon emission modulation controller (shown as 104 FIGS. 1 and 2) which controls the duration ON and intensity, duration OFF, and frequency of each specific color spectrum photon pulse within each photon signal from an array of LEDs housed within the master photon emitter 402 while also allowing the master photon emitter to control the duration ON and intensity, duration OFF, and frequency of each specific color spectrum photon pulse within each photon signal from each slave photon emitters 404, 406, and 408.

Conversely, each slave photon emitter 404, 406, and 408 contains the circuitry to receive command signals 136 from the master photon emitter 402 and the circuitry necessary to emit a photon pulse of a specific spectrum from an array of LEDs (such as near-red, far-red, blue, green or orange) housed within each slave photon emitter 404, 406, and 408. For clarity, each slave photon emitter does not contain a controller such as the MLC nor does the slave photon emitter 404, 406, and 408 contain a photon emission modulation controller. All commands and controls for the slave photon emitter 404, 406, and 408 are received from the master photon emitter 402. This master/slave system allows for sharing of a single power supply and microcontroller. Master has the power supply and that power is also transferred to the slaves. Additionally, the master/slave system can be utilized to pulse photons in patterns to help stimulate the biological response in other birds.

A bus system may be included in MLC of the master photon emitter 402 or in each slave photon emitter 404, 406 and 408 to allow for the specific control by the master photon emitter 402 of each individual slave photon emitter 404, 406 and 408. By way of example, the master photon emitter 402 may send a signal 136 to a specific slave photon emitter 404 commanding the slave photon emitter 404 to emit photon signal with a far-red pulse for a specific duration, while the master photon emitter 402 simultaneously sends a command signal 136 to a second slave photon emitter 406 to emit a photon signal with green pulse for a specific duration. While this descriptive example shows an array, plurality or chain of three slave photon emitters 404, 406 and 408 in with a master photon emitter 402, it should be understood that this description is applicable to any such system with any number of slave photon emitters in communication and under the control of a master photon emitter, as will be understood by one skilled in the art, once they understand the principles of the embodiments.

In a further embodiment, the master photon emitter 402 may be hard wired or wireless to allow external access to the master photon emitter 402 by a host, allowing remote access to monitor the input and output of the master photon emitter 402 while also allowing for remote programming of the master photon emitter.

Figure 5:
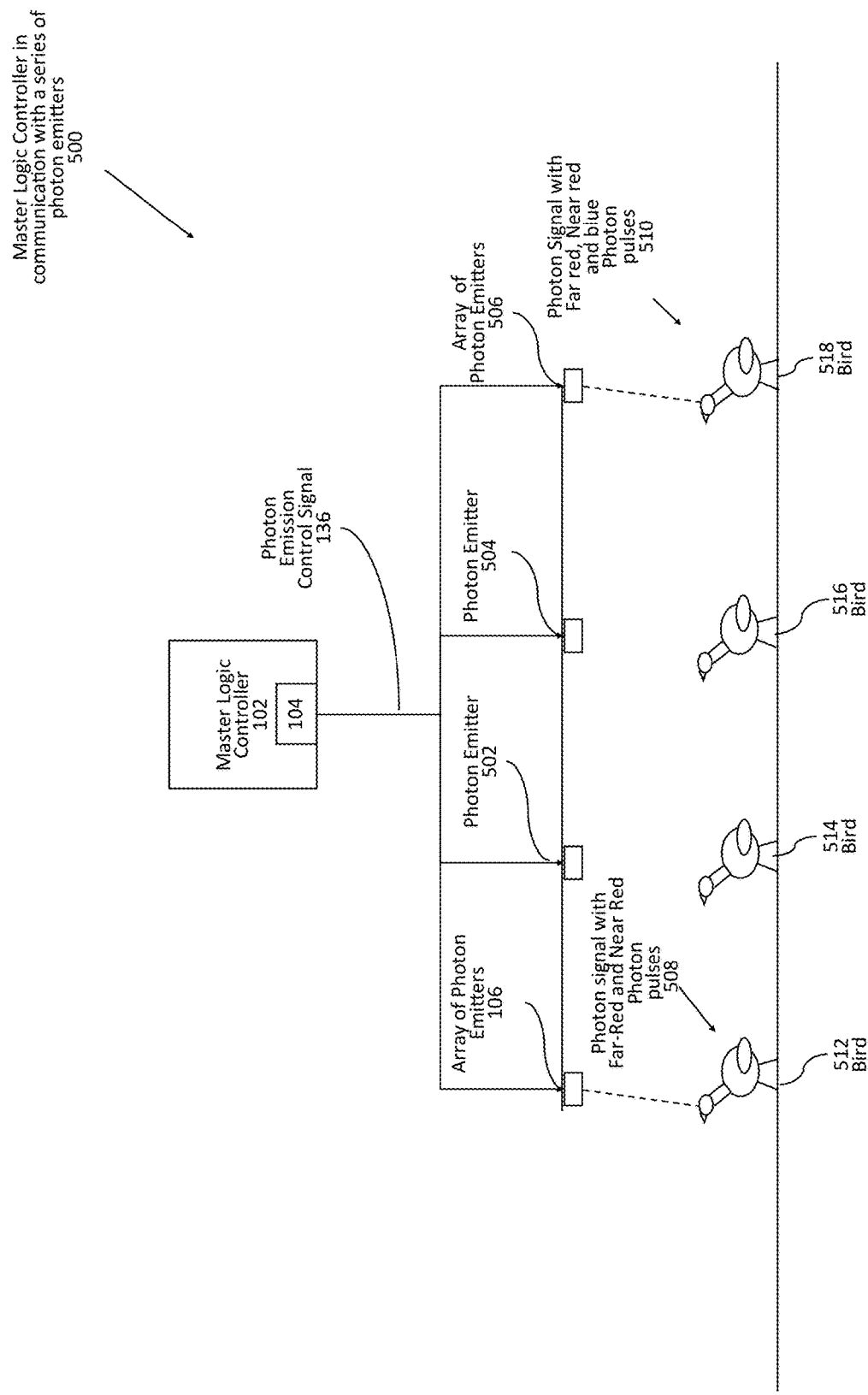
FIG. 5 is a diagram showing a master logic controller in communication and control of a series of photon emitters.

FIG. 5 is a diagram of an example of a master logic controller in communication and control of one or more photon emitters, 500. As shown in FIG. 5, a master logic controller 102 is in communication by means of a photon emission control signal 136 with a series of photon emitters 106, 502, 504 and 506 located above four different birds 512, 514, 516 or 518. In this example, the master logic controller or MLC 102 (as previously discussed in FIGS. 1, 2 and 3) also contains a photon emission modulation controller 104 (shown discussed in FIGS. 1, 2 and 3) which allows the MLC 102 to control the duration ON and intensity, duration OFF, and frequency of each specific color spectrum photon pulse within a photon signal from an array of LEDs housed within each photon emitter 106, 502, 504 and 506.

Through the photon emission modulation controller 104, the MLC 102 communicates commands and instructions to each photon emitter 106, 502, 504 and 506 including but not limited to the duration ON, intensity, duration OFF and frequency of each specific color spectrum photon pulse within each photon signal 508 and 510 from each photon emitter 106, 502, 504 and 506. The MLC 102 also maintains control of the power supply to the system and control the transfer of power to each individual photon emitter 106, 502, 504 and 506.

As shown in FIG. 5, based on the instructions from the MLC 102, the photon emission modulation controller 104 sends a photon emission control signal 136 to each individual photon emitter 106, 502, 504 and 506. Based on the specific instructions sent to each photon emitter 106, 502, 504 and 506, individual photon emitters 106 or 506 will emit a photon signal comprising repetitive photon pulses of one or more specific color spectrums 508 and 510 to a bird 512, 514, 516 or 518 (such as a photon signal with a far-red pulse and a near-red pulse 508 at various durations ON and OFF or a photon signal with pulse of far-red, a pulse of near-red and a pulse of blue at various durations ON and OFF 510). As further shown in FIG. 5, based on the instructions from the MLC 102, other individual photon emitters 502 or 504 may not emit a photon signal toward a bird 122 for a duration.

The ability of the MLC 102 to control the photon output or emission from each individual photon emitter 106, 502, 504 and 506 allows the system of the present disclosure to modify the photon emission to a bird based on the specific needs or requirements for a bird. As discussed in association with FIG. 2, by way of example, the MLC may be programmed to issue a signal to a specific emitter for modulation of pulses of far-red light for a period of time followed by pulses of blue light within a signal in combination with near-red light for the control of biological responses in birds such as ovulation/egg laying and mood/hunger.

In the example shown in FIG. 5, all commands and controls for each photon emitter 106, 502, 504 and 506 are received externally from the MLC 102. However, as will be understood by one skilled in the art, the logic and hardware associated with the MLC 102 and photon emission modulation controller 104 may also be housed within each individual photon emitter, allowing each individual photon emitter to be self-sufficient, without the need for an external control or logic unit.

In a further embodiment, the MLC 102 may be hard wired or wireless, allowing external access to the MLC 102 by a user. This allows remote access by a user to monitor the input and output of the MLC 102 while also allowing for remote programming of the MLC 102.

Figure 6:
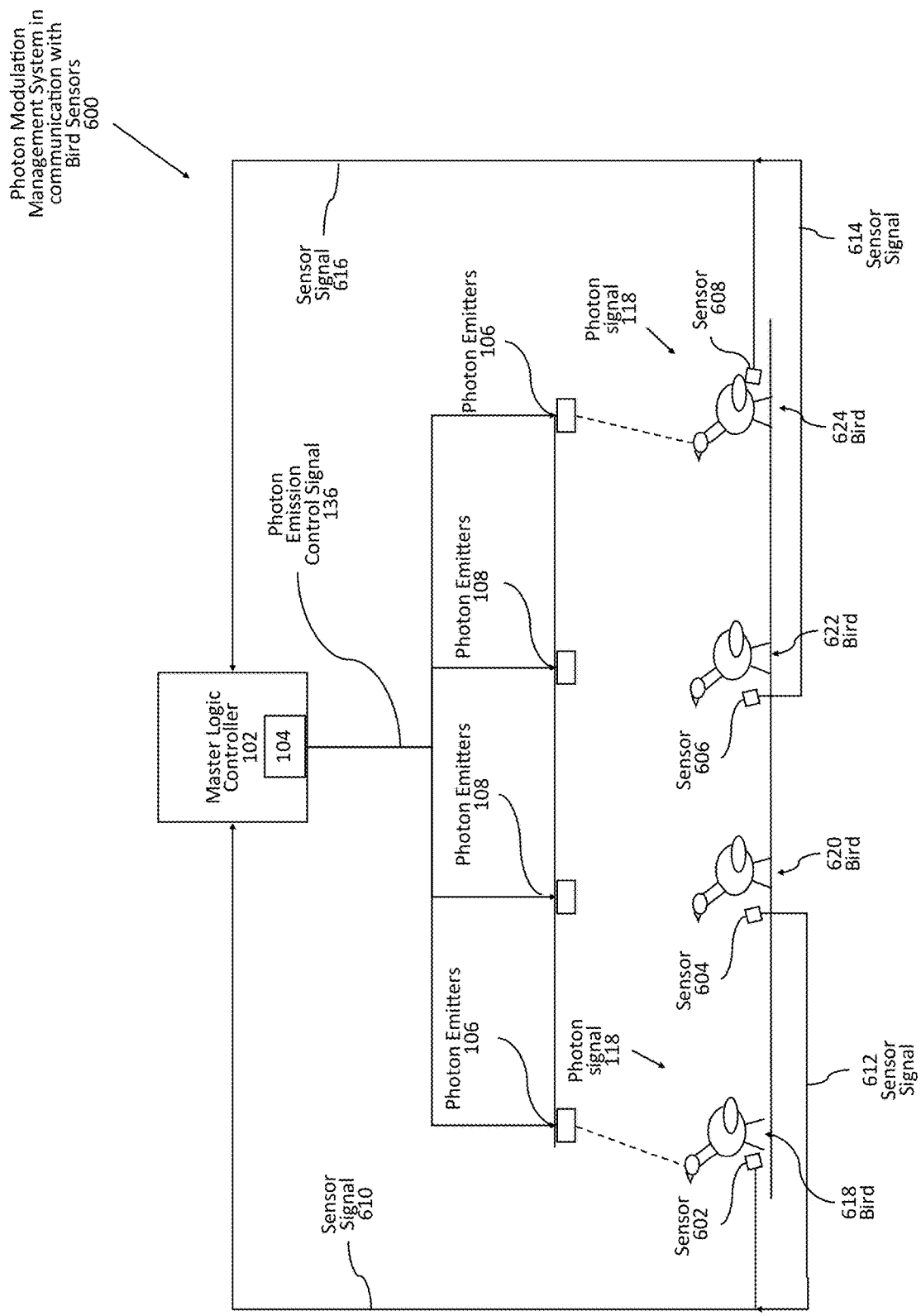
FIG. 6 is a diagram showing a photon modulation management system in communication with a series of bird sensors.

FIG. 6 provides an example of a further embodiment, showing the photon modulation system of the present disclosure where one or more sensors are used to monitor a bird's environmental conditions as well as the bird's responses 600. As shown in FIG. 6, one or more sensors 602, 604, 606 and 608 are associated with each bird 618, 620, 622, and 624 in order to monitor various conditions associated with the bird 618, 620, 622, and 624. The conditions associated with the bird or birds which may be monitored include but are not limited to, humidity, air temperature, volume, movement, $O_2$, $CO_2$, CO, pH, and weight. As will be understood by one skilled in the art, the sensors may include but are not limited to temperature sensor, an infrared sensor, motion sensor, microphones, gas sensors, cameras, and scales.

The sensors 602, 604, 606 and 608 monitor one or more conditions associated with the bird or birds 618, 620, 622, and 624 and then transmit the data 610, 612, 614 or 616 to the MLC 102. Transferring the data from the one or more sensors 602, 604, 606 and 608 to the MLC 102 can be accomplished in a number of ways, either wirelessly or hard wired. As will be understood by one skilled in art, a variety of communication systems may be used for the delivery of sensor-derived information from the bird 618, 620, 622, and 624 to the a MLC 102.

The data from the one or more sensors 602, 604, 606 and 608 is analyzed by the MLC 102. Based on the information from the sensors, the MLC 102, through the photon emission modulation controller 104, the MLC 102 is able to adjust the duration ON, intensity, duration OFF, duty cycle and frequency of each specific color spectrum photon pulse of each photon signal 118 of each individual photon emitter 106, and 108, or to adjust the duration ON, intensity, duration OFF, duty cycle and frequency of a group of photon emitters based on the needs of the individual birds 618, 620, 622, and 624 associated with a specific sensor 602, 604, 606 and 608 or the needs of the birds as a whole. An example may include adjusting a pulse to comprise both blue and far-red 118 at various durations or adjusting duration of a pulse of far-red, green and blue 610.

In additional embodiments, the system of the present disclosure may also include a watering system, feeding systems, environmental as well as health system (not shown in FIG. 6) in communication and under the control of the MLC 102 or a separate logic controller. Based on information from the sensors 602, 604, 606 and 608 associated with each bird or birds, the MLC 102 is able to communicate with a watering system, feeding system, heating and cooling systems, medication systems based upon the needs of the birds. Data, including power can be sent to an outside receiver such as a database that is not connected to the system.

Figure 7:
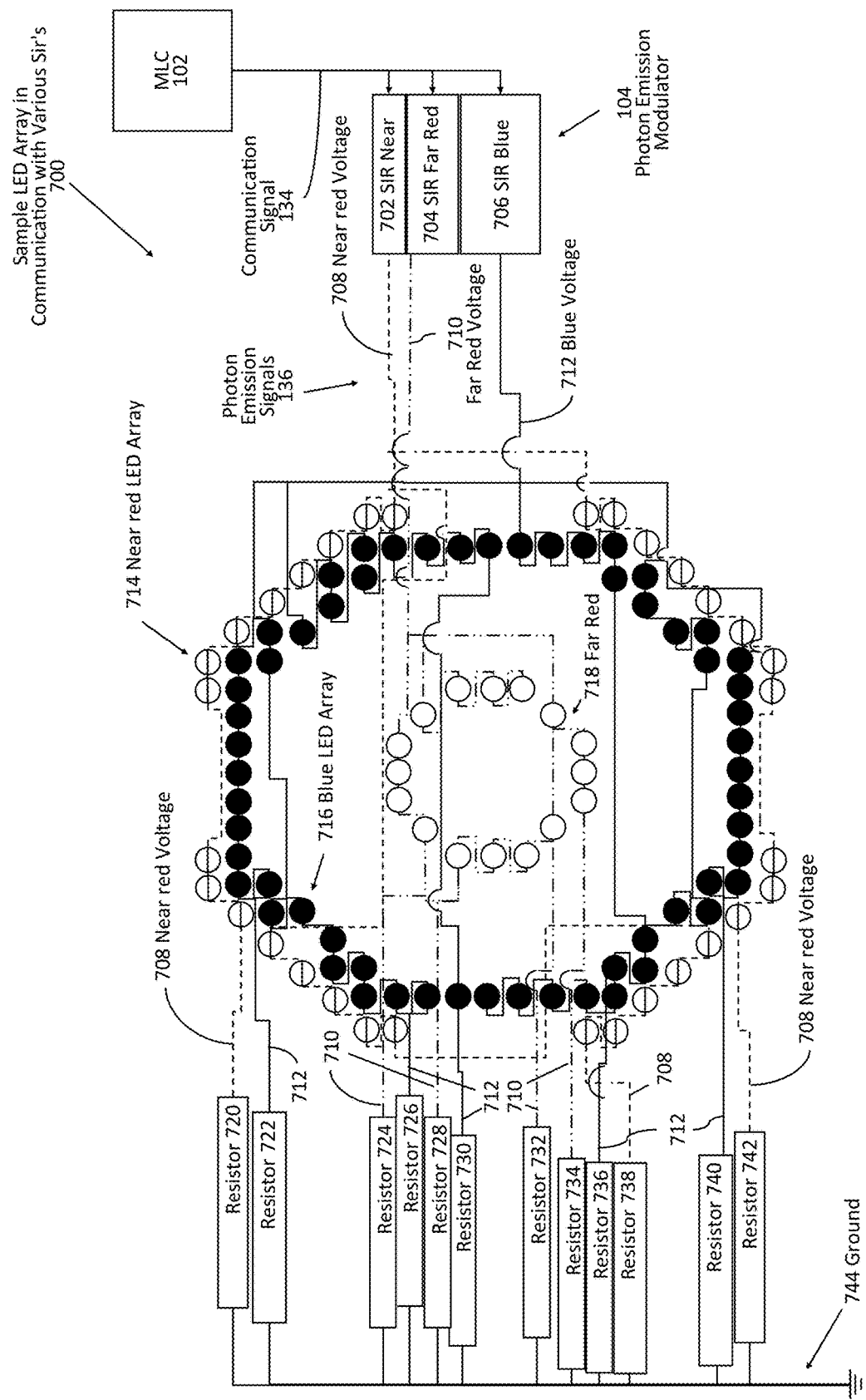
FIG. 7 is a diagram showing a sample LED array in communication with various SSRs (Solid State Relays), power transistors or FETS.

FIG. 7 provides an example of one embodiment of an array of LEDs in communication with a series of solid-state relays or SSRs 700. As shown in FIG. 7 and repeated from FIG. 1, a MLC 102 is in communication by means of a communication signal 134 with a photon emission modulation controller 104. The photon emission modulation controller 104 of this example contains three SSRs. The MLC 102 outputs a signal to control the SSRs. The first SSR controls an array of near-red LEDs 702, the second SSR controls an array of far-red LEDs 704 and the third SSR to controls an array of blue LEDs 706. Each SSR 702, 704 and 706 is in communication with an array of LEDs, 714, 716 and 718 by means of a photon emission signal 136. As shown in FIG. 7, the near-red SSR 702 sends a photon emission signal 136 to initiate a photon pulse of the near-red LEDS 714 comprising a near-red voltage 708 to an array of near-red LEDs 714. The near-red voltage 708 is then transmitted from the array of near-red LEDs 714 to a series of resistors 720, 742, 738, such as a 68 ohm resistor, with each resistor 720, 742 and 738 connected to a ground 744.

As further shown in FIG. 7, the far-red SSR 704 sends a photon emission signal 136 to initiate a photon pulse of far-red LEDs comprising a far-red voltage 710 to an array of red LEDs 718. The red voltage 710 is then transmitted from the red LED array 718 and a series of resistors 724, 728, 732 and 734, such as 390 ohm resistor with each resistor 724, 728, 732 and 734 connected to a ground 744. FIG. 7 also shows the blue SSR 706 sending a photon emission signal 136 to initiate a photon pulse of blue LEDs comprising a blue voltage 712 to an array of blue LEDs 716. The blue voltage 712 is then transmitted from the array of blue LEDs 716 and transmitted to a series of resistors 722, 726, 730, 736 and 740, such as a 150 ohm resistor, with each resistor 722, 726, 730, 736 and 740 connected to a ground 744.

Figure 8B:
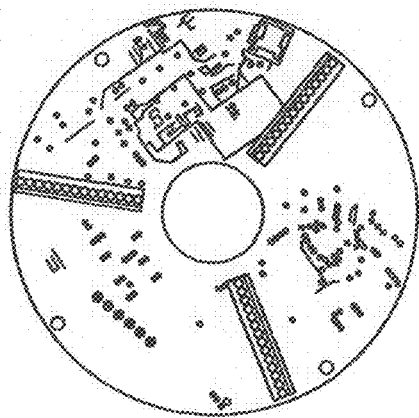
Figure 8D:
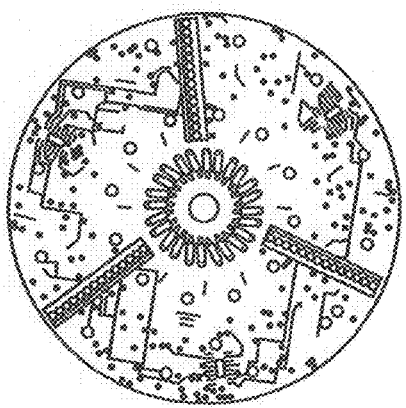
FIG. 8d is a photo showing the backside of the LED array of FIG. 8c with a replaceable multicolor die LED.
Figure 8A:
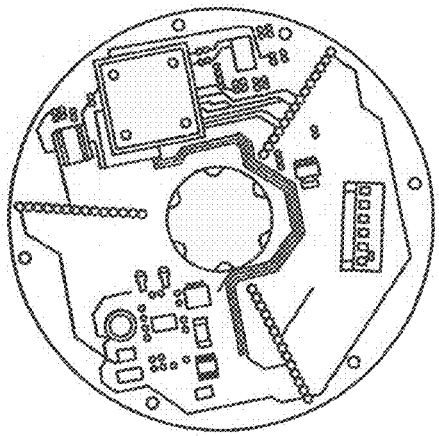
FIG. 8a is a photo showing the power converter, SPI, and microcontroller of a multiple colored die within a single LED.
Figure 8C:
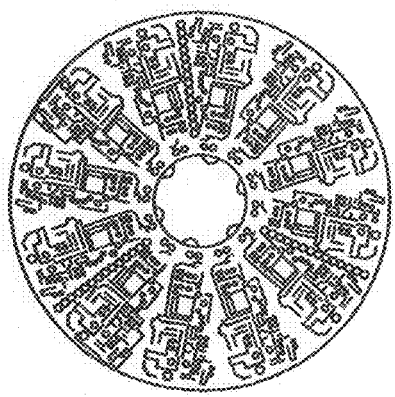

FIGS. 8a to 8d show various aspects of an example light assembly for the emission of photons within a signal for use in systems and methods described herein. FIG. 8a is a photo showing a power converter, serial peripheral interface (SPI), and microcontroller of a multiple colored die within a light assembly. FIG. 8b is a photo showing the backside of the multiple colored die within the light assembly of FIG. 8a. FIG. 8c is a photo showing the high-speed switching circuitry for flashing of the multiple colored die within the light assembly of FIG. 8a. FIG. 8d is a photo showing the backside of the light assembly of FIG. 8c with a replaceable multicolor die LED.

Figure 9:
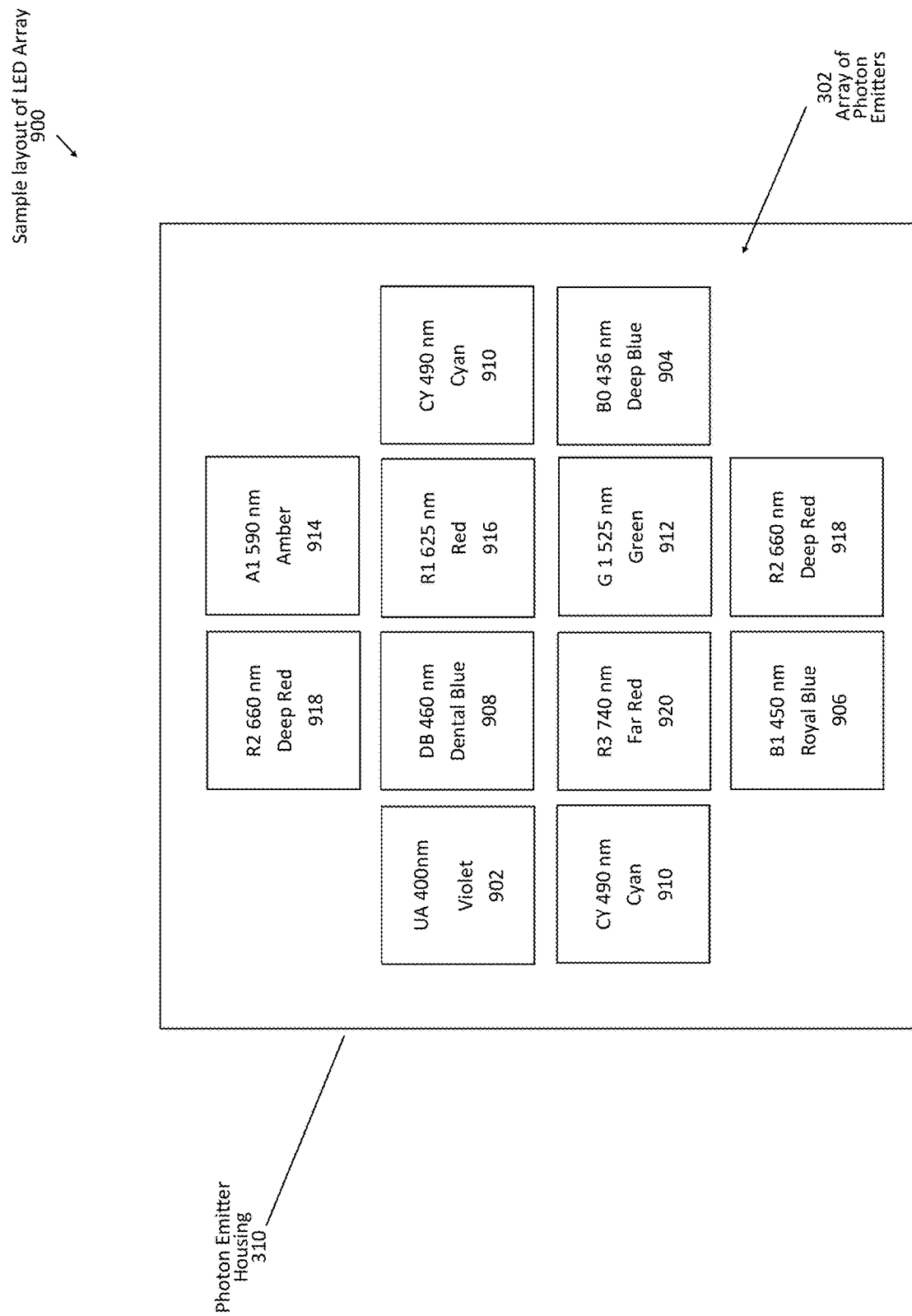
FIG. 9 is an example layout of LEDs within a LED array.

The light assembly of FIGS. 8a to 8d may be used in several embodiments described herein, including a master/ slave system, where a master photon emitter contains all logic and controls for the emission of photons and signals from the master photon emitter as well as any additional photon emitters in communication with the master photon emitter. The light assembly of FIGS. 8a-8d may also be used in a controller system. As discussed above, controller is in communication with two or more photon emitters FIG. 9 provides an example layout of LEDs within a LED array 900. As shown in FIG. 9, twelve LEDs form an array of photon emitters 302 in a photon emitter housing 310. The sample layout includes 400 nm (violet) 902, 436 nm (deep blue) 904, 450 nm (royal blue) 906, 460 nm (dental blue) 908, 490 nm (cyan) 910, 525 nm (green) 912, 590 nm (amber) 914, 625 nm (red) 916, 660 nm (deep red) 918, and 740 nm (far red) 920.

Figure 10:
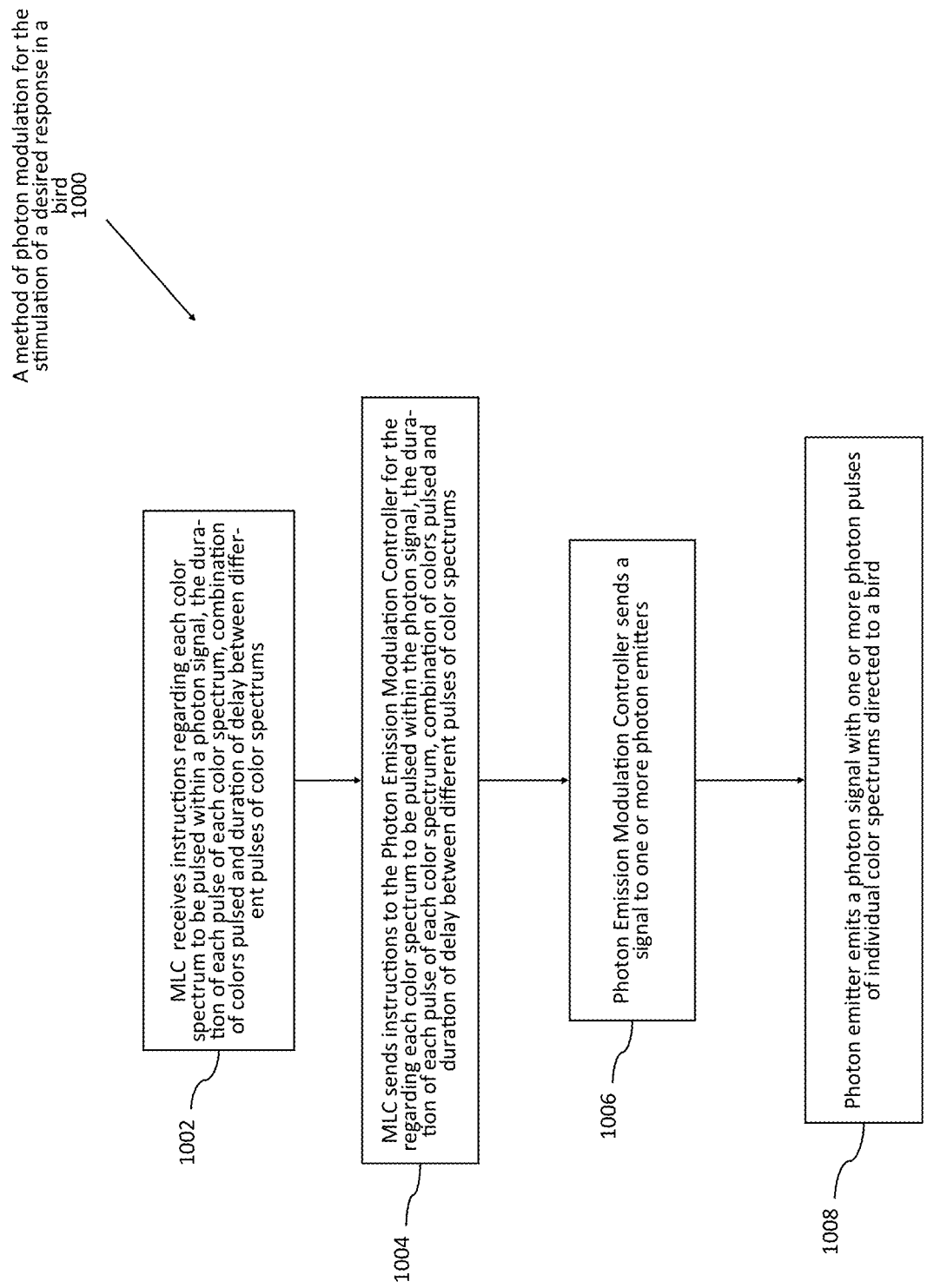
FIG. 10 is a flow diagram showing a method of photon modulation for the stimulation of a desired response in a bird through pulsing of various wavelengths.

FIG. 10 is a flow diagram showing the method of modulation of individual color spectrums pulsed for bird growth 1000. As shown in FIG. 10, in step 1002, the master logic controller receives instructions regarding each individual color spectrum to be pulsed, the duration of each pulse of each color spectrum, the combination of colors to be pulsed and duration of delay between each color spectrum pulse. Instructions and information sent to the master logic controller may relate to the photon pulse duration of each color to be pulsed, photon pulse delay, intensity, frequency, duty cycle, bird type, state of maturity of the bird and the type of egg production as well as young and broiler bird growth and behavior that is desired to be induced. In step 1004, the master logic controller sends instructions to the photon emission modulation controller regarding each color spectrum to be pulsed, the duration of each pulse of each color spectrum, combination of colors pulse and duration of delay between different color spectrums. In step 1006, the photon emission modulation controller sends at least one signal to one or more photon emitters capable of emitting pulses of one or more individual color spectrums toward a bird, such as green LEDs, far-red LEDs, blue LEDs and orange LEDs. In step 1008, one or more photon emitters emit one or more photon pulses of individual color spectrums directed to a bird.

Figure 11:
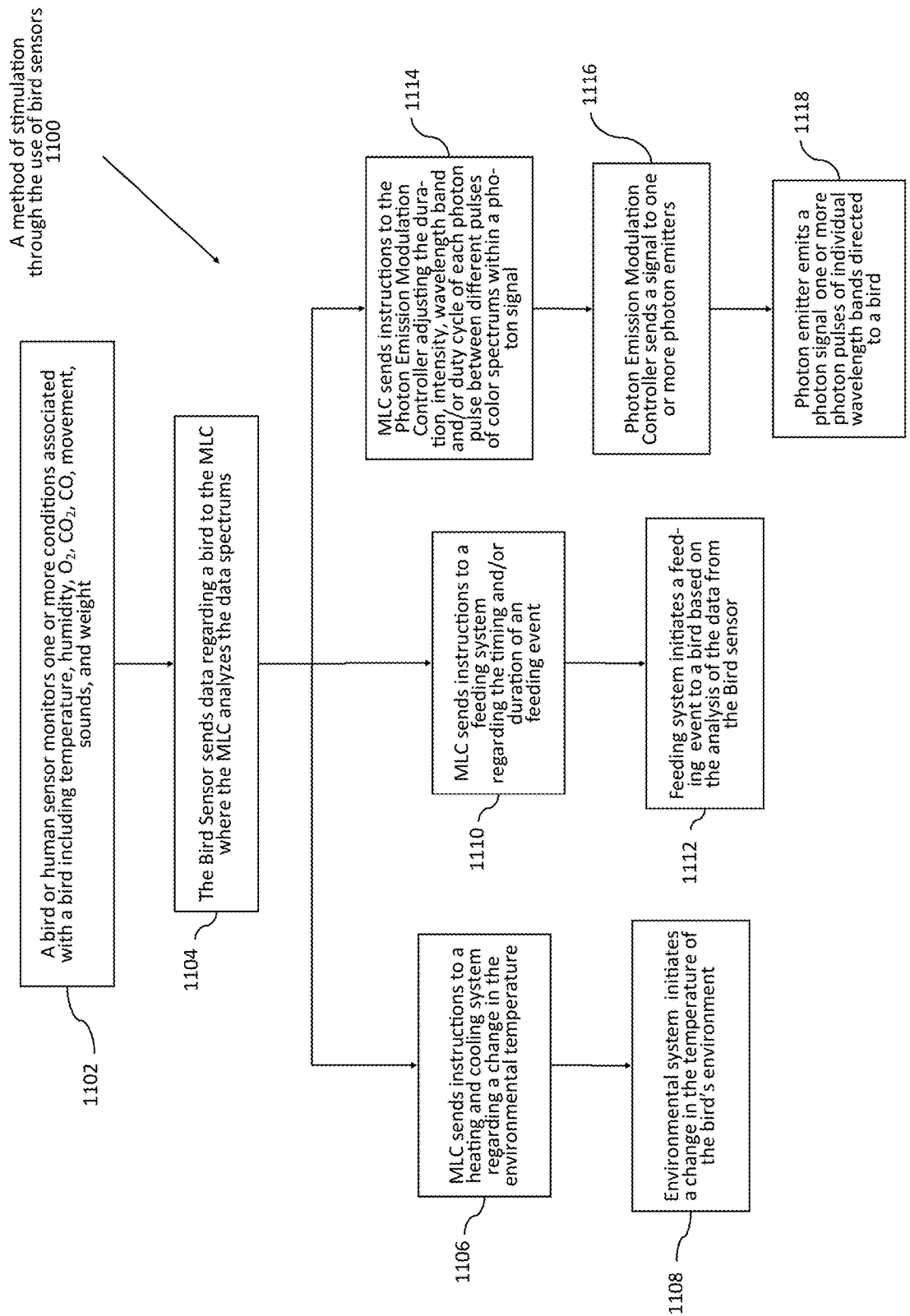
FIG. 11 is a flow diagram showing a method of stimulation of a desired response in a bird through the use of bird sensors.

FIG. 11 provides an additional embodiment of the present disclosure, showing a flow diagram of the stimulation of a desired response of a bird based on information from bird sensors 1100. As shown in step 1102, a bird sensor monitors one or more conditions associated with the environment of a bird. The conditions to be monitored include, but are not limited to, the air temperature, humidity, the bird's body temperature, weight, sound, movement of the birds, infrared, $O_2$, $CO_2$ and CO. In step 1104, the bird sensor sends data regarding the environmental or physical conditions associated with a bird to the MLC. The MLC then analyzes the data sent from the bird sensor or the analysis may be done by a third party software program that is remote to the system. In step 1106, based on the information from the bird sensor, the MLC sends instructions to change an embodiment of the environment such as air temperature or humidity. In step 1108, the environmental system initiates an event to one or more animals based on the analysis of the data from the sensor. As will be understood by one skilled in the art, the adjustment of the event can be on a micro level, such as an adjustment to the environment of one specific bird or the adjustment can be on a macro level such as an entire growth chamber or operation. In step 1110, based on the information from the bird sensor the MLC sends instructions to a feeding system, nutrient system or nutrient source, such as a drip, nutrient film or nutrient injection system, regarding the timing and/or concentration of the nutrient to be distributed to a bird during a nutrient event. In step 1112, nutrient system initiates a nutrient event where nutrients are directed to a bird based on the analysis of the data from the bird sensor. As will be understood by one skilled in the art, the adjustment of the nutrient event can be on a micro level, such as an adjustment to the nutrients to one specific bird or the adjustment can be on a macro level such as an entire growth chamber or operation. In step 1114, based on the analysis of the data from the bird sensor, the MLC sends instructions to the photon emission modulation controller adjusting the duration, intensity, color spectrum and/or duty cycle of each photon pulse between different pulses of color spectrums to a specific an animal or to a group of animals. In step 1116, the photon emission modulation controller sends a signal to one or more photon emitters adjusting the duration, intensity, color spectrum and/or duty cycle of each photon pulse between different pulses of color spectrums to a specific animal or to a group of animals. In step 1118, based on the signal received from the photon emission modulation controller, one or more photon emitters emit one or more photon pulses of individual color spectrums directed to an animal or to a group of animals.

Figure 12:
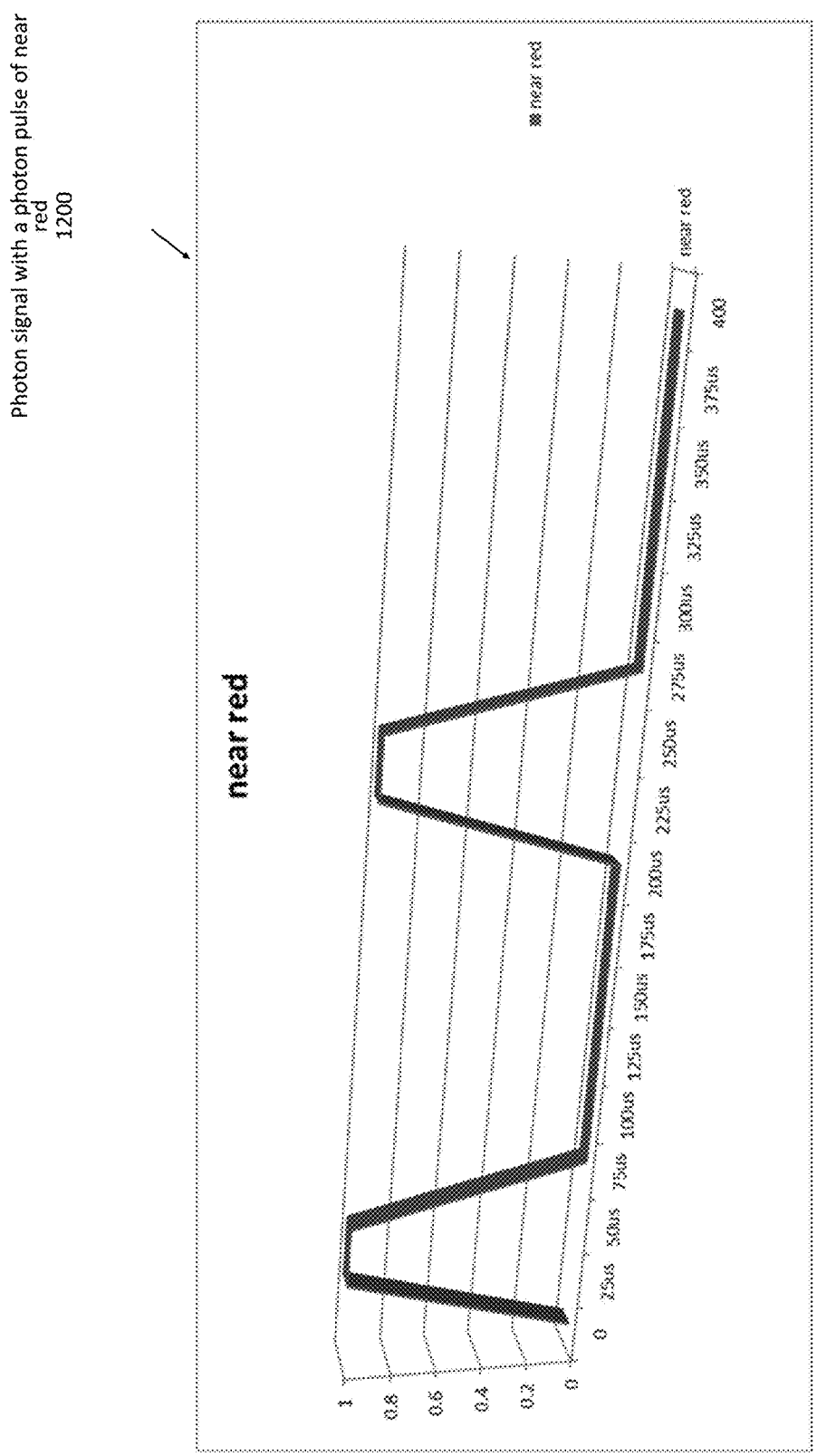
FIG. 12 is a graph showing an example of a photon signal with a photon pulse of near red, with the photon signal having a repetitive rate of 400 µs for the controlled stimulation of ovulation and egg laying in birds.

FIG. 12 is a graph showing an example photon signal with a repetitive photon pulse of near-red, showing a duration ON and a duration OFF for the controlled stimulation of ovulation in birds and egg laying in birds. As shown in FIG. 12 and previously described in FIGS. 1-11, an example of the cycling of a photon signal with repetitive photon pulses of one color spectrums within the photon signal is provided where a photon signal having a repetitive near-red photon pulse is emitted from a photon emitter. As shown in the graph near-red spectrum is pulsed first followed by a delay. Next, a second pulse comprising of near-red spectrum is again pulsed followed by a delay. This photon signal may be repeated indefinitely or until the bird ovulation and bird egg production under and receiving the photon pulses have reached their desired production amount. While in this descriptive example of a photon signal having a repetitive photon pulse set comprising offset pulsing of one color spectrum, it should be understood that this description is applicable to any such system with other emissions of photon pulses over a period of time, as various combinations of pulses of color spectrums including but not limited to near-red, far-red, infra-red, green blue, yellow, orange and ultraviolet excluding the standard analog frequency lighting emission standards of the United States of 60 Hz and Europe of 50 Hz. Examples of the photon pulse duration between pulses of each individual color spectrum or color spectrum combinations may include but are not limited to, 0.01 microseconds to 5000 milliseconds and all integers in between. The system of the present disclosure also allows for other durations between pulses of each individual color spectrum or color spectrum combinations including but not limited to 0.1 microsecond to 24 hours, and all integers in between. The system of the present disclosure may be programmed to allow for variations of photon emission as well as variations of photon emission delay to allow for events such as extended dark cycles.

Figure 13:
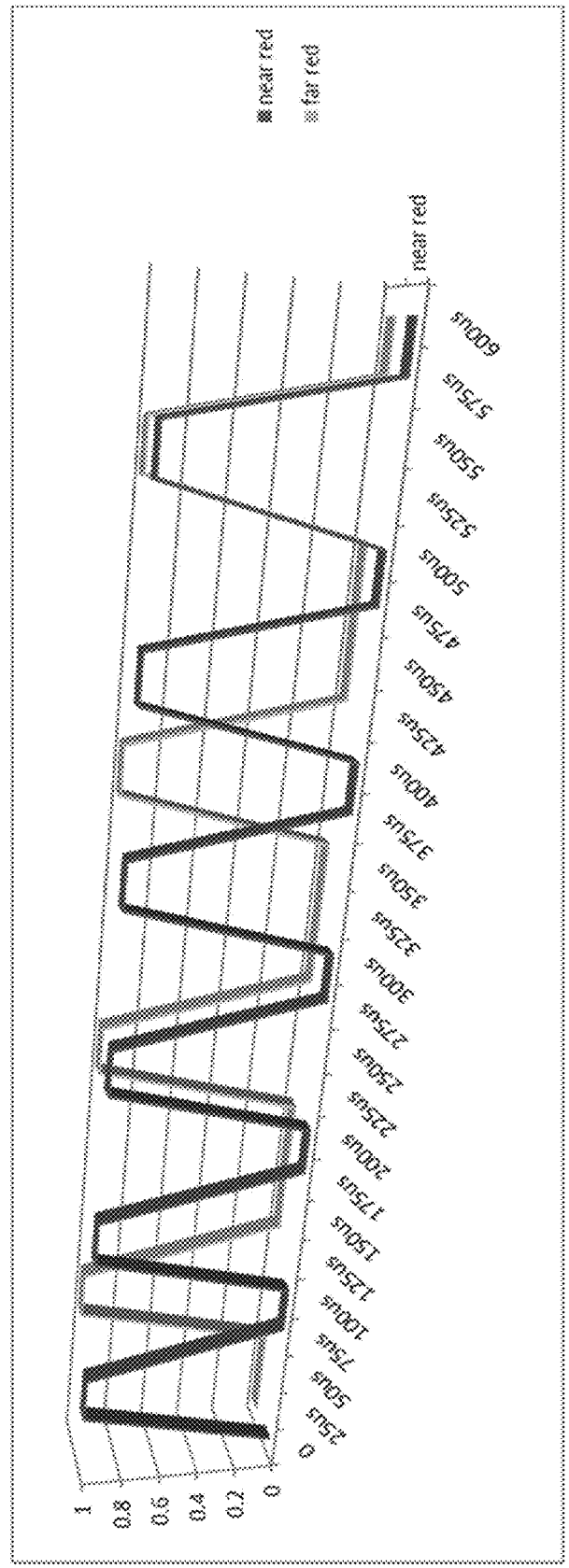
FIG. 13 is a graph showing an example of a photon signal with a photon pulse of near red and a photon pulse of far red, with the photon signal having a repetitive rate of 600 µs for the controlled stimulation of ovulation and egg laying in birds.

FIG. 13 is a graph showing an example photon signal containing photon pulses of two color spectrums, near-red and far red. The time scale on this chart is not to scale but serves as an example embodiment exhibiting the variation of color spectrum, duration ON, duration OFF frequency and duty cycle within a photon signal that may be utilized to stimulate ovulation. As shown in FIG. 13 and previously described in FIGS. 1-11, another example of the cycling of photon pulses of various color spectrum of the present disclosure is provided where a photon signal comprising photon pulses of two color spectrums are emitted from a photon emitter. As shown in the graph a far-red spectrum is pulsed first followed by a delay and then a pulse of a near-red spectrum and then followed by a delay. Next, a second pulse of near red is initiated, followed by a delay, followed by an individual pulse of far-red. This photon signal may be repeated indefinitely or until the desired bird response has been initiated. As discussed above, this example may also be used to stimulate ovulation or to reset the bird's circadian rhythm. While in this descriptive example of a photon pulse set comprising offset pulsing of two color spectrums, it should be understood that this description is applicable to any such system with other emissions of photon pulses over a period of time, as various combinations of pulses of color spectrums including but not limited to, near-red, far-red, infra-red, green, blue, yellow, orange and ultraviolet excluding the standard analog frequency lighting emission standards of the United States of 60 Hz and Europe of 50 Hz. Examples of the photon pulse duration between pulses of each individual color spectrum or color spectrum combinations may include but is not limited to, 0.01 microseconds to 5000 milliseconds and all integers in between. The system of the present disclosure also allows for other durations between pulses of each individual color spectrum or color spectrum combinations including but not limited to 0.1 microsecond to 24 hours, and all integers in between. The system of the present disclosure may be programmed to allow for variations of photon emission as well as variations of photon emission delay to allow for events such as extended dark cycles.

Figure 14:
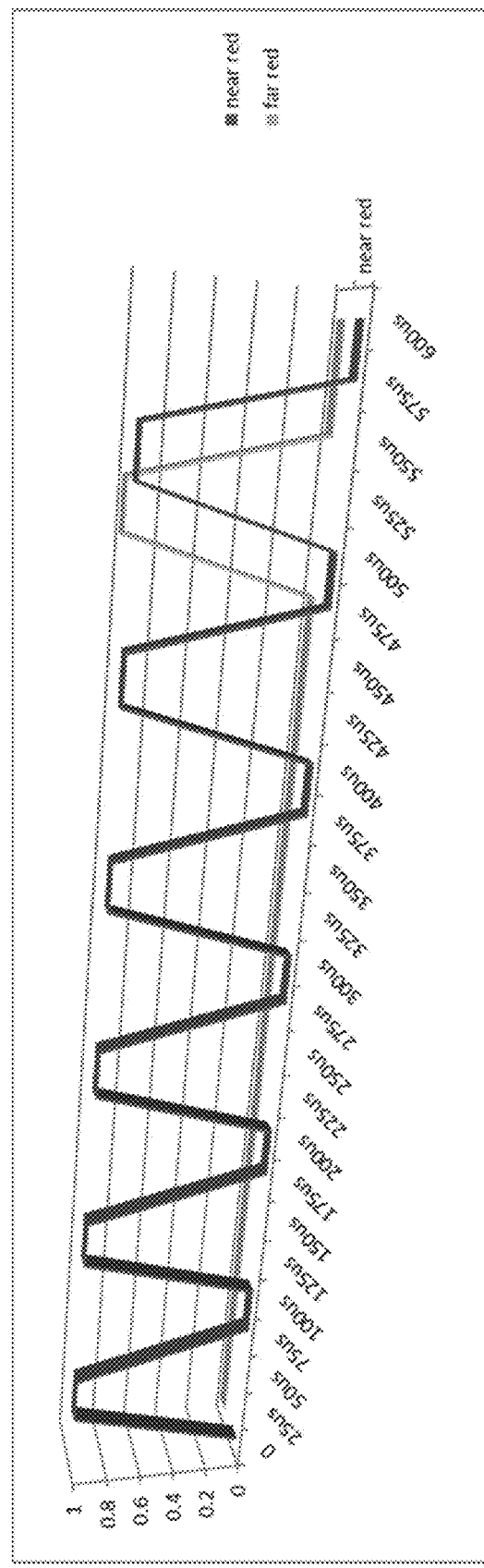
FIG. 14 is a second graph showing an example of a photon signal with a photon pulse of near red and a photon pulse of far red, where the two photon pulses have a different duration ON and duration OFF from the example shown in FIG. 13, with the photon signal having a repetitive rate of 600 µs for the controlled stimulation of ovulation and egg laying in birds.

FIG. 14 is a graph showing a second example photon signal containing photon pulses of two color spectrums, near-red and far red. Again, the time scale on this chart is not to scale but serves as an example embodiment exhibiting the variation of color spectrum, duration ON, duration OFF frequency and duty cycle within a photon signal that may be utilized to stimulate ovulation. As shown in FIG. 14 and previously described in FIGS. 1-11, another example of the cycling of photon pulses of various color spectrum of the present disclosure is provided where photon signal comprising photon pulses of two color spectrums are emitted from a photon emitter. As shown in the graph, a far-red spectrum is pulsed in a series or pulse train of five pulses followed by a pulse of a near-red spectrum and then followed by a delay. This photon signal may be repeated indefinitely or until the desired bird response has been initiated. As discussed above, this example may also be used to stimulate ovulation or to reset the bird's circadian rhythm. While in this descriptive example of a photon pulse set comprising offset pulsing of two color spectrums, it should be understood that this description is applicable to any such system with other emissions of photon pulses over a period of time, as various combinations of pulses of color spectrums including but not limited to, near-red, far-red, infra-red, green, blue, yellow, orange and ultraviolet; excluding the standard analog frequency lighting emission standards of the United States of 60 Hz and Europe of 50 Hz. Examples of the photon pulse duration between pulses of each individual color spectrum or color spectrum combinations may include but are not limited to, 0.01 microseconds to 5000 milliseconds and all integers in between. The system of the present disclosure also allows for other durations between pulses of each individual color spectrum or color spectrum combinations including but not limited to 0.1 microsecond to 24 hours, and all integers in between. The system of the present disclosure may be programmed to allow for variations of photon emission as well as variations of photon emission delay to allow for events such as extended dark cycles.

Figure 15:
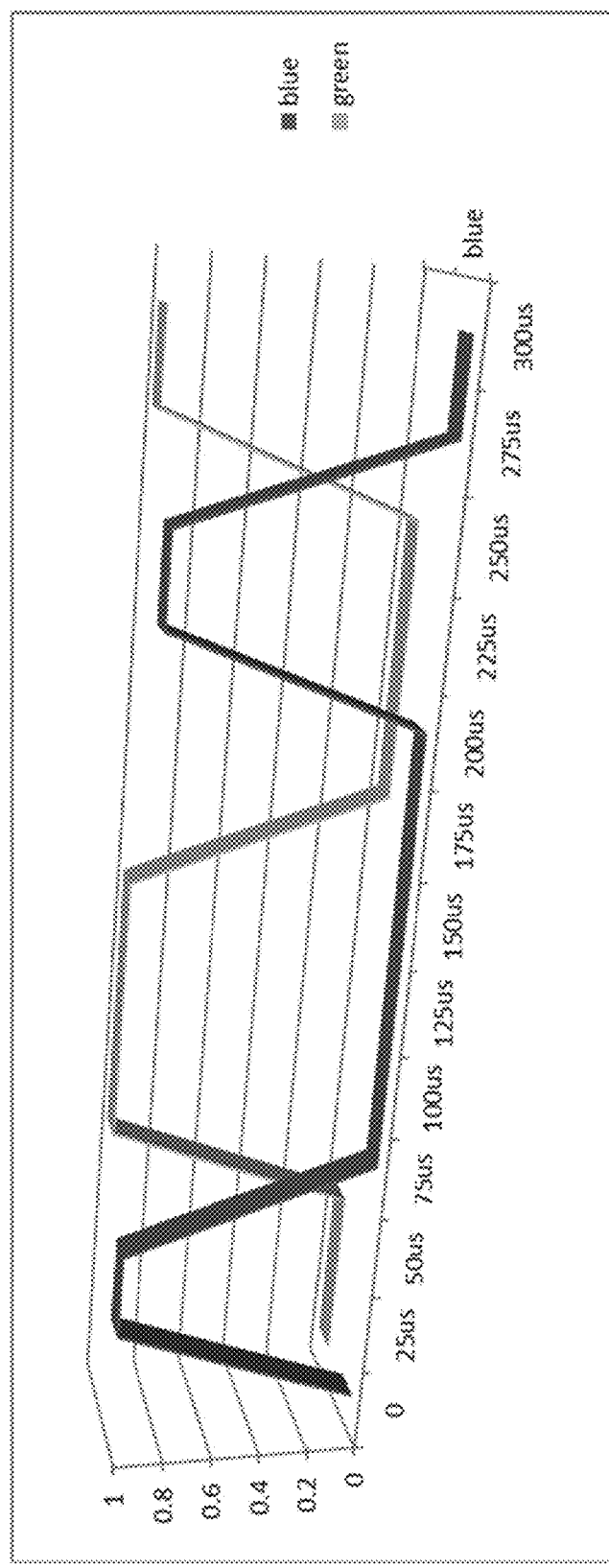
FIG. 15 is a graph showing an example of a photon signal with a photon pulse of blue and a photon pulse of green, with the photon signal having a repetitive rate of 600 µs for the controlled stimulation of hunger and growth.

FIG. 15 is a graph showing an example photon signal containing photon pulses of two color spectrums, blue and green. The time scale on this chart is not to scale but serves as an example embodiment exhibiting the variation of color spectrum, frequency and duty cycle that may be utilized to stimulate hunger or a specific mood and to reset the circadian rhythm of the bird. As shown in FIG. 15 and previously described in FIGS. 1-11, another example of the cycling of photon pulses of various color spectrums of the present disclosure is provided where photon pulses of two color spectrums are emitted from a photon emitter. As shown in the graph pulses of blue and green are pulsed first followed by a delay. Next, a second pulse of blue is initiated, followed by a delay, followed by an individual pulse of green. This cycle may be repeated indefinitely or until the desired bird response has been initiated. As discussed above, this example may also be used to stimulate hunger, mood or even to reset the birds circadian rhythm. While in this descriptive example of a photon pulse set comprising offset pulsing of two color spectrums, it should be understood that this description is applicable to any such system with other emissions of photon pulses over a period of time, as various combinations of pulses of color spectrums including but not limited to, near-red, far-red, infra-red, green, blue, yellow, orange and ultraviolet; excluding the standard analog frequency lighting emission standards of the United States of 60 Hz and Europe of 50 Hz. Examples of the photon pulse duration between pulses of each individual color spectrum or color spectrum combinations may include but are not limited to, 0.01 microseconds to 5000 milliseconds and all integers in between. The system of the present disclosure also allows for other durations between pulses of each individual color spectrum or color spectrum combinations including but not limited to 0.1 microsecond to 24 hours, and all integers in between. The system of the present disclosure may be programmed to allow for variations of photon emission as well as variations of photon emission delay to allow for events such as extended dark cycles.

Figure 16:
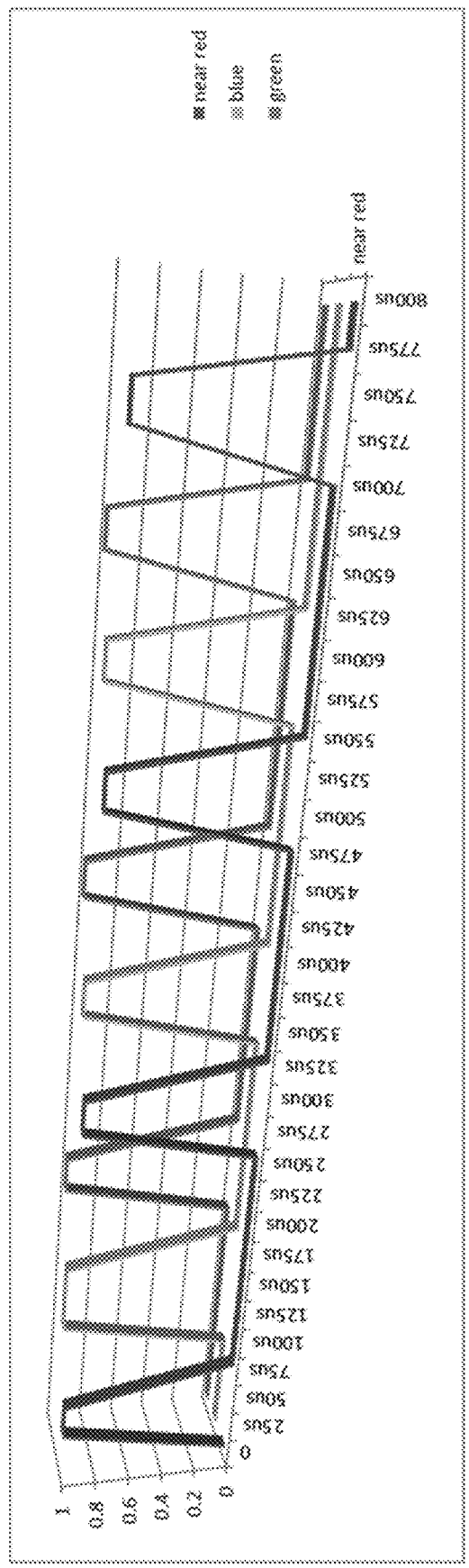
FIG. 16 is a graph showing an example of a photon signal with a photon pulse of blue, a photon pulse of green, and a pulse of near red with the photon signal having a repetitive rate of 800 µs for the controlled stimulation of ovulation, egg production, hunger and growth.

FIG. 16 graph showing an example photon signal containing photon pulses of three color spectrums, near-red, blue and green. The time scale on this chart is not to scale but serves as an example embodiment exhibiting the variation of color spectrum, frequency and duty cycle that may be utilized to stimulate ovulation, hunger or a specific mood and to reset the circadian rhythm of the bird. As shown in FIG. 16 and previously described in FIGS. 1-11, another example of the cycling of photon pulses of various color spectrums of the present disclosure is provided where photon pulses of three color spectrums are emitted from a photon emitter. As shown in the graph, a pulse of near red is provided followed by a delay. Next, a pulse of blue is initiated, followed by a delay, followed by an individual pulse of green. This cycle may be repeated indefinitely or until the desired bird response has been initiated. As discussed above, this example may also be used to stimulate ovulation, hunger, mood or even to reset the bird's circadian rhythm. While in this descriptive example of a photon pulse set comprising offset pulsing of three color spectrums, it should be understood that this description is applicable to any such system with other emissions of photon pulses over a period of time, as various combinations of pulses of color spectrums including but not limited to near-red, far-red, infra-red, green, blue, yellow, orange and ultraviolet; excluding the standard analog frequency lighting emission standards of the United States of 60 Hz and Europe of 50 Hz. Examples of the photon pulse duration between pulses of each individual color spectrum or color spectrum combinations may include but are not limited to, 0.01 microseconds to 5000 milliseconds and all integers in between. The system of the present disclosure also allows for other durations between pulses of each individual color spectrum or color spectrum combinations including but not limited to 0.1 microsecond to 24 hours, and all integers in between. The system of the present disclosure may be programmed to allow for variations of photon emission as well as variations of photon emission delay to allow for events such as extended dark cycles.

Figure 17:
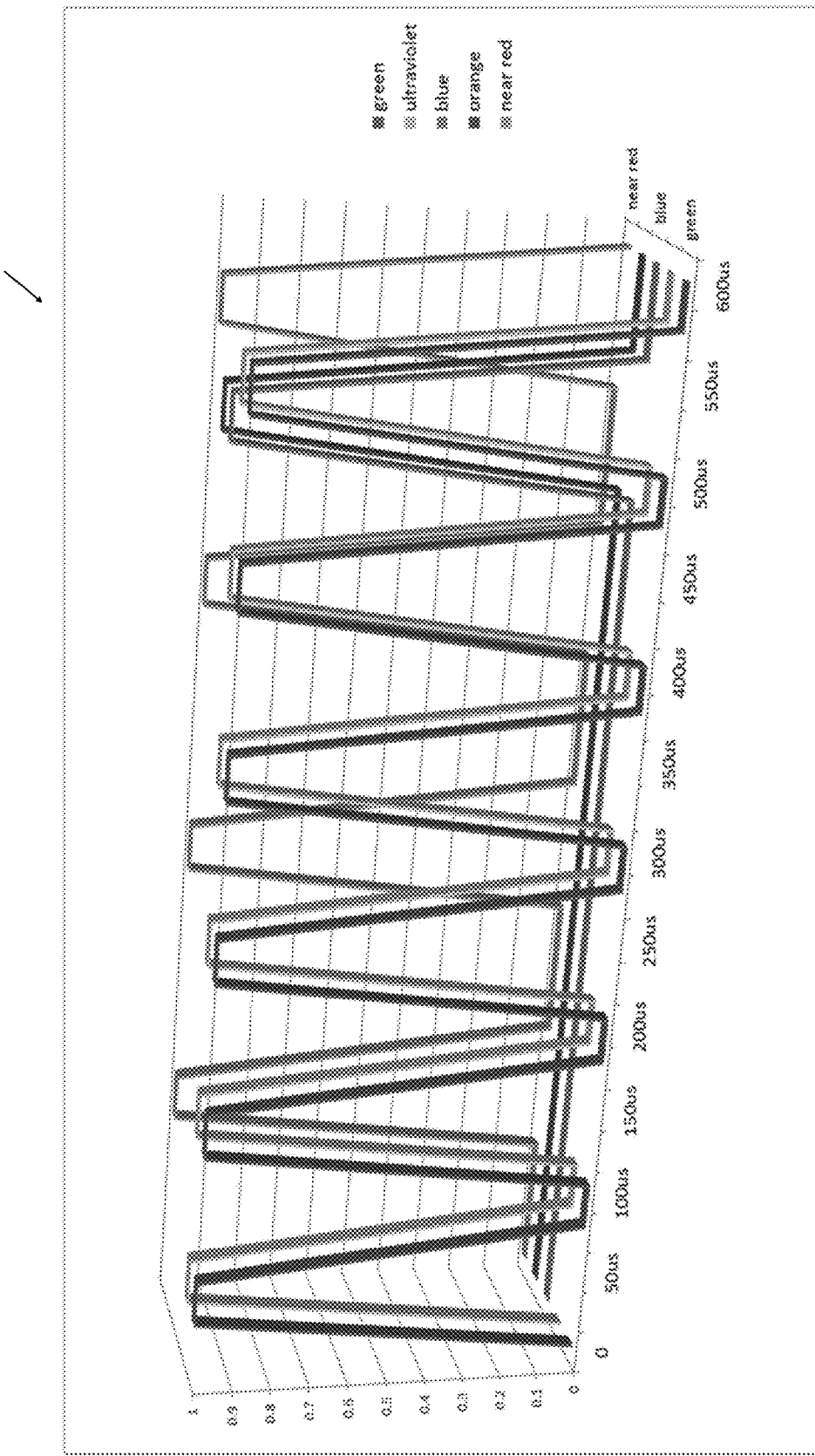
FIG. 17 is a graph showing an example of a photon signal with a photon pulse of blue, a photon pulse of ultraviolet, a photon pulse of orange, a photon pulse of green, and a pulse of near red with the photon signal having a repetitive rate of 600 µs for the controlled stimulation of ovulation, egg production, hunger and growth.

FIG. 17 graph showing an example photon signal containing photon pulses of five color spectrums, green, ultraviolet, orange, near-red, and blue. The time scale on this chart is not to scale but serves as an example embodiment exhibiting the variation of color spectrum, frequency and duty cycle that may be utilized to stimulate ovulation, hunger or a specific mood and to reset the circadian rhythm of the bird. As shown in FIG. 17 and previously described in FIGS. 1-11, another example of the cycling of photon pulses of various color spectrum within a signal of the present disclosure is provided where photon pulses of five color spectrums are emitted from a photon emitter. As shown in the graph, pulses of green and ultraviolet are provided followed by a delay. Next, a pulse of near red is initiated, followed by a delay, followed by pulses of green and ultraviolet. This cycle may be repeated with five pulses of green and ultraviolet and three pulses of near red and then a single pulse of blue and orange. This pulse signal may be repeated indefinitely or until the desired bird response has been initiated under. As discussed above, this example may also be used to stimulate ovulation, hunger, mood or even to reset the bird's circadian rhythm. While in this descriptive example of a photon pulse set comprising offset pulsing of three color spectrums, it should be understood that this description is applicable to any such system with other emissions of photon pulses over a period of time, as various combinations of pulses of color spectrums including but not limited to near-red, far-red, infra-red, green, blue, yellow, orange and ultraviolet; excluding the standard analog frequency lighting emission standards of the United States of 60 Hz and Europe of 50 Hz. Examples of the photon pulse duration between pulses of each individual color spectrum or color spectrum combinations may include but are not limited to, 0.01 microseconds to 5000 milliseconds and all integers in between. The system of the present disclosure also allows for other durations between pulses of each individual color spectrum or color spectrum combinations including but not limited to 0.1 microsecond to 24 hours, and all integers in between. The system of the present disclosure may be programmed to allow for variations of photon emission as well as variations of photon emission delay to allow for events such as extended dark cycles.

Figure 18:
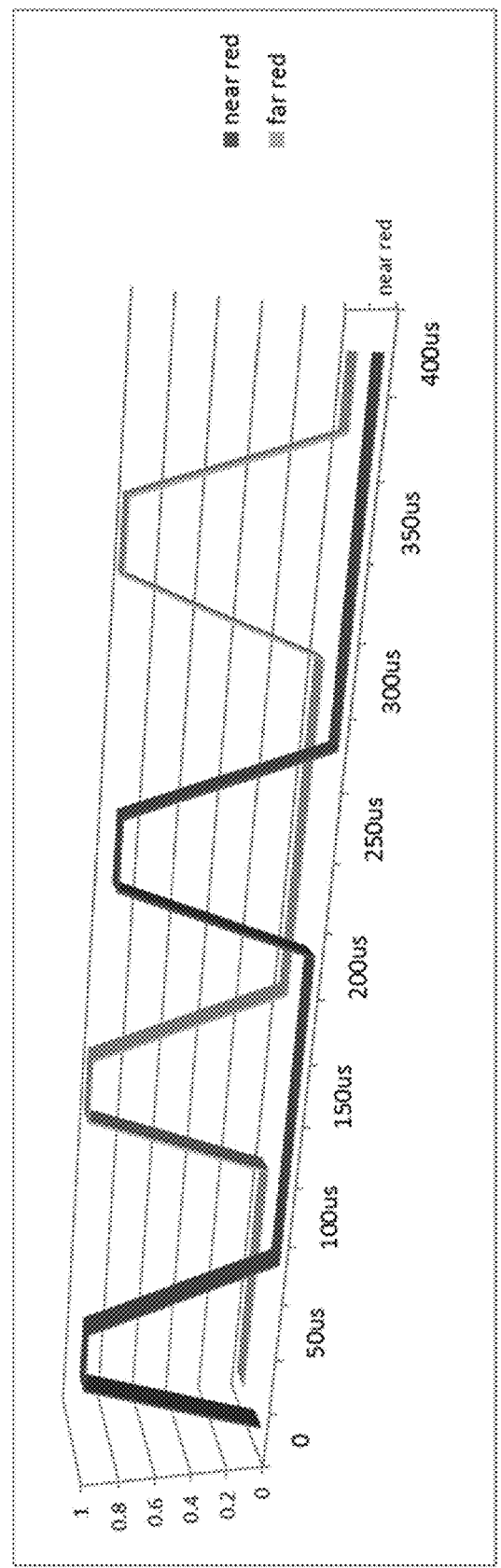
FIG. 18 is a third graph showing an example of a photon signal with a photon pulse of near red and a photon pulse of far red, where the two photon pulses have a different duration ON and duration OFF from the examples shown in FIG. 13 and FIG. 14, with the photon signal having a repetitive rate of 400 µs for the controlled stimulation of ovulation and egg laying in birds.

FIG. 18 is a graph showing a third example photon signal containing photon pulses of two color spectrums, near-red and far red. The time scale on this chart is not to scale but serves as an example embodiment exhibiting the variation of color spectrum, duration ON, duration OFF frequency and duty cycle within a photon signal that may be utilized to stimulate ovulation. As shown in FIG. 18 and previously described in FIGS. 1-11, another example of the cycling of photon pulses of various color spectrum within a signal of the present disclosure is provided where photon signal comprising photon pulses of two color spectrums are emitted from a photon emitter. As shown in the graph a far-red spectrum is pulsed first followed by a delay and then a pulse of a near-red spectrum and then followed by a delay. Next, a second pulse of near red is initiated followed by a delay followed by an individual pulse of far-red. This photon signal may be repeated indefinitely or until the desired bird response has been initiated. As discussed above, this example may also be used to stimulate ovulation or to reset the bird's circadian rhythm. While in this descriptive example of a photon pulse set comprising offset pulsing of two color spectrums, it should be understood that this description is applicable to any such system with other emissions of photon pulses over a period of time, as various combinations of pulses of color spectrums including but not limited to near-red, far-red, infra-red, green, blue, yellow, orange and ultraviolet; excluding the standard analog frequency lighting emission standards of the United States of 60 Hz and Europe of 50 Hz. Examples of the photon pulse duration between pulses of each individual color spectrum or color spectrum combinations may include but are not limited to, 0.01 microseconds to 5000 milliseconds and all integers in between. The system of the present disclosure also allows for other durations between pulses of each individual color spectrum or color spectrum combinations including but not limited to 0.1 microseconds to 24 hours, and all integers in between. The system of the present disclosure may be programmed to allow for variations of photon emission as well as variations of photon emission delay to allow for events such as extended dark cycles.

Figure 19:
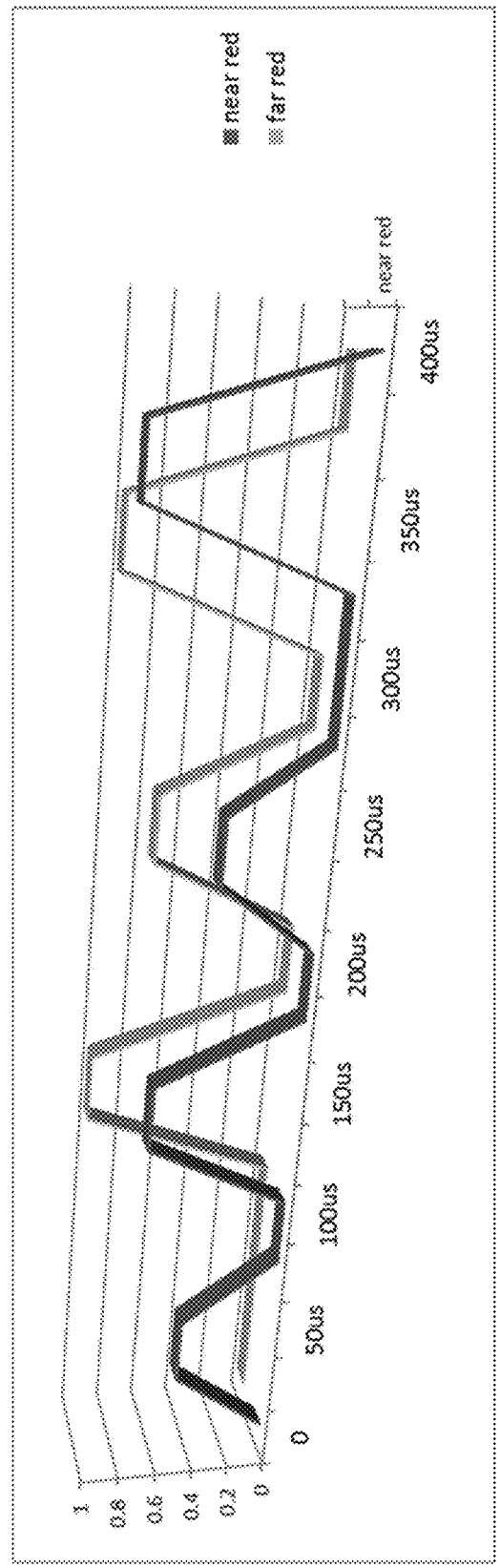
FIG. 19 is a fourth graph showing an example of a photon signal with a photon pulse of near red and a photon pulse of far red, where the two photon pulses have a different duration ON with different intensities and duration OFF from the examples shown in FIG. 13 and FIG. 14, with the photon signal having a repetitive rate of 400 µs for the controlled stimulation of ovulation and egg laying in birds.

FIG. 19 is a graph showing an example photon signal containing photon pulses of two color spectrums, near-red and far red. The time scale on this chart is not to scale but serves as an example embodiment exhibiting the variation of color spectrum, duration ON with varying intensities, duration OFF frequency and duty cycle within a photon signal that may be utilized to stimulate ovulation. As shown in FIG. 19 and previously described in FIGS. 1-11, another example of the cycling of photon pulses of various color spectrum of the present disclosure is provided where photon signal comprising photon pulses of two color spectrums are emitted from a photon emitter. As shown in the graph a far-red spectrum is pulsed first with a first intensity followed by a delay and then a pulse of far red and near-red spectrums with a different intensities and then followed by a delay. Next, a second pulse of near red and far red with different intensities followed by a delay followed by an individual pulse of far-red with a different intensity and then a near red with the same intensity. This photon signal may be repeated indefinitely or until the desired bird response has been receiving the photon pulses. As discussed above, this example may also be used to stimulate ovulation or to reset the bird's circadian rhythm. While in this descriptive example of a photon pulse set comprising offset pulsing of two color spectrums with varying intensities, it should be understood that this description is applicable to any such system with other emissions of photon pulses over a period of time, as various combinations of pulses of color spectrums including but not limited to near-red, far-red, infra-red, green, blue, yellow, orange and ultraviolet; excluding the standard analog frequency lighting emission standards of the United States of 60 Hz and Europe of 50 Hz. Examples of the photon pulse duration between pulses of each individual color spectrum or color spectrum combinations may include but are not limited to, 0.01 microseconds to 5000 milliseconds and all integers in between. The system of the present disclosure also allows for other durations between pulses of each individual color spectrum or color spectrum combinations including but not limited to 0.1 microsecond to 24 hours, and all integers in between. The system of the present disclosure may be programmed to allow for variations of photon emission as well as variations of photon emission delay to allow for events such as extended dark cycles.

Table 1 below provides a table of lighting options. As shown in Table 1, column one provides the name or designation of the lighting option or pulse signal, column two provides the color pulses in the lighting option, column three is the duration ON of each pulse within the pulse signal, column four is the duration OFF of each pulse within the pulse signal, column five provides the time from ON to OFF, column six is the amperage of each color within the lighting option, and column seven is the duration or length of time each option is active on a 24 hour basis.

TABLE 1

LIGHTING OPTIONS

| Lighting Option | Colors | Duration ON | Duration OFF | Timing from t-0 | Ma of each color | Duration of system on |
|---|---|---|---|---|---|---|
| Option 1 | Near red 1 | 50 us | 200 us | ON-0 | 600 | 24 hours |
|  | Near red 2 |  |  | OFF-50 US |  |  |
| Option 2 | Near red 1 | 50 us | 50 us | ON-0 | 600 | 24 hours |
|  | Near red 2 |  |  | OFF-50 US |  |  |
|  | Far Red | 50 us | 100 us | ON-100 us | 900 | 24 hours |
|  |  |  |  | OFF-150 us |  |  |
| Option 3 | Near red 1 | 50 us | 50 us | ON-0 | 600 | 6 hours ON |
|  | Near red 2 |  |  | OFF-50 US |  | 18 OFF |
|  | Far Red | 50 us | 100 us | ON-100 us | 900 | 6 hours ON |
|  |  |  |  | OFF- 150 us |  | 18 OFF |
| Option 4 | Near red 1 | 50 us | 200 us | ON-0 | 600 | 24 hour |
|  | Near red 2 |  |  | OFF-50 US |  |  |
| Option 5 | Near red 1 | 50 us | 100 us | ON-0 | 600 | 6 hours ON |
|  | Near red 2 |  |  | OFF-50 US |  | 18 OFF |
|  | Far Red | 50 us | 500 us | ON-150 us | 900 | 6 hours ON |
|  |  |  |  | OFF-200 US |  | 18 OFF |
| Option 6 | Near red 1 | 50 us | 50 us | ON-0 | 600 | 6 hours ON |
|  | Near red 2 |  |  | OFF-50 US |  | 18 OFF |
|  | Far Red | 50 us | 100 us | ON-100 us | 900 | 6 hours ON |
|  |  |  |  | OFF-150 us |  | 18 OFF |
| Option 7 | Green | 50 us | 50 us | ON-0 | 600 | 24 hours on |
|  |  |  |  | OFF-50 US |  |  |
|  | Far Red | 50 us | 100 us | ON-100 us | 900 | 24 hours on |
|  |  |  |  | OFF-150 us |  |  |
| Option 8 | Blue | 50 us | 50 us | ON-0 | 600 | 24 hours on |
|  |  |  |  | OFF-50 US |  |  |
|  | Far Red | 50 us | 100 us | ON-100 us | 900 | 24 hours on |
|  |  |  |  | OFF-150 us |  |  |
| Option 9 | Near red 1 | 50 us | 100 us | ON-0 | 600 | 6 hours ON |
|  | Near red 2 |  |  | OFF-50 US |  | 18 OFF |
|  | Green | 50 us | 500 us | ON-150 us | 600 | 6 hours ON |
|  |  |  |  | OFF-200us |  | 18 OFF |
| Option 10 | Near red 1 | 50 us | 100 us | ON-0 | 600 | 6 hours ON |
|  | Near red 2 |  |  | OFF-50 US |  | 18 OFF |
|  | Blue | 50 us | 500 us | ON-150 us | 600 | 6 hours ON |
|  |  |  |  | OFF-200 US |  | 18 OFF |
| Option 11 | Near red 1 | 50 us | 100 us | ON-0 | 600 | 24 hours ON |
|  |  |  |  | OFF-50 US |  |  |
|  | Blue | 50 us | 500 us | ON-150 us | 600 | 24 hours ON |
|  |  |  |  | OFF-50 US |  |  |
|  | Green | 50 us | 50 us | ON-0 | 600 | 24 hours ON |
|  |  |  |  | OFF-50 US |  |  |
| Option 12 | Near red 1 | 50 us | 100 us | ON-0 | 600 | 24 hours ON |
|  |  |  |  | OFF-50 US |  |  |
|  | Blue | 50 us | 500 us | ON-150 us | 600 | 24 hours ON |
|  | Orange |  |  | OFF-50 US |  |  |
|  | Green | 50 us | 50 us | ON-0 | 600 | 24 hours ON |
|  | Ultraviolet |  |  | OFF-50 US |  |  |
| Option 13 | Blue | 50 us | 50 us | ON-150 us | 600 | 24 hours ON |
|  |  |  |  | OFF-50 US |  |  |
|  | Green | 50 us | 50 us | ON-0 | 600 | 24 hours ON |
|  |  |  |  | OFF-50 US |  |  |
| Option 14 | Blue | 50 us | 50 us | ON-150 us | 600 | 24 hours ON |
|  |  |  |  | OFF-50 us |  |  |

EXAMPLES

The following examples are provided to illustrate further the various applications and are not intended to limit the invention beyond the limitations set forth in the appended claims.

Increased Average Egg Production

Six comparison studies were conducted in Greeley, Colo. in the winter and spring of 2016 using the lighting system and method of the current disclosure and compared to eggs produced in a commercially egg production system, using standard commercially available lights.

Eggs produced under the system of the present application described herein were produced in compliance with the United Egg Producers Animal Husbandry Guidelines using various strains of white leghorn varieties raised from pullets. Birds were housed in cages in blackout grow tents, with one bird per cage, and eight birds per tent. Birds were fed an all-natural, 100% vegetarian diet comprised predominantly of corn, soybean meal, limestone, vitamins and minerals, matching the diets, feeding and watering times for the commercial comparison birds.

The commercial comparison for egg production was a conventional egg production facility located in northern Colorado. All eggs were produced in compliance with the United Egg Producers Animal Husbandry Guidelines using various strains of white leghorn varieties raised from pullets. Birds were fed all natural, 100% vegetarian diet comprised predominantly of corn, soybean meal, limestone, vitamins and minerals. No hormones or stimulants were used. The commercial comparison egg producing birds were housed under a computerized environment management system, which monitors and controls fans and temperature, the fluorescent lighting, turning feeders on and off and monitors the amount of water consumed. Eggs produced where counted every morning at 9 am and weighed using a common scale.

Example 1—Average Egg Production—Lighting Option One

Table 2 shows a comparison of the average egg production rate to the total number of birds of the system and method of the current application using lighting Option 1 (Table 1) when compared with average egg production rate to the total number of birds in a conventional production facility using conventional commercial lighting.

Figure 20:
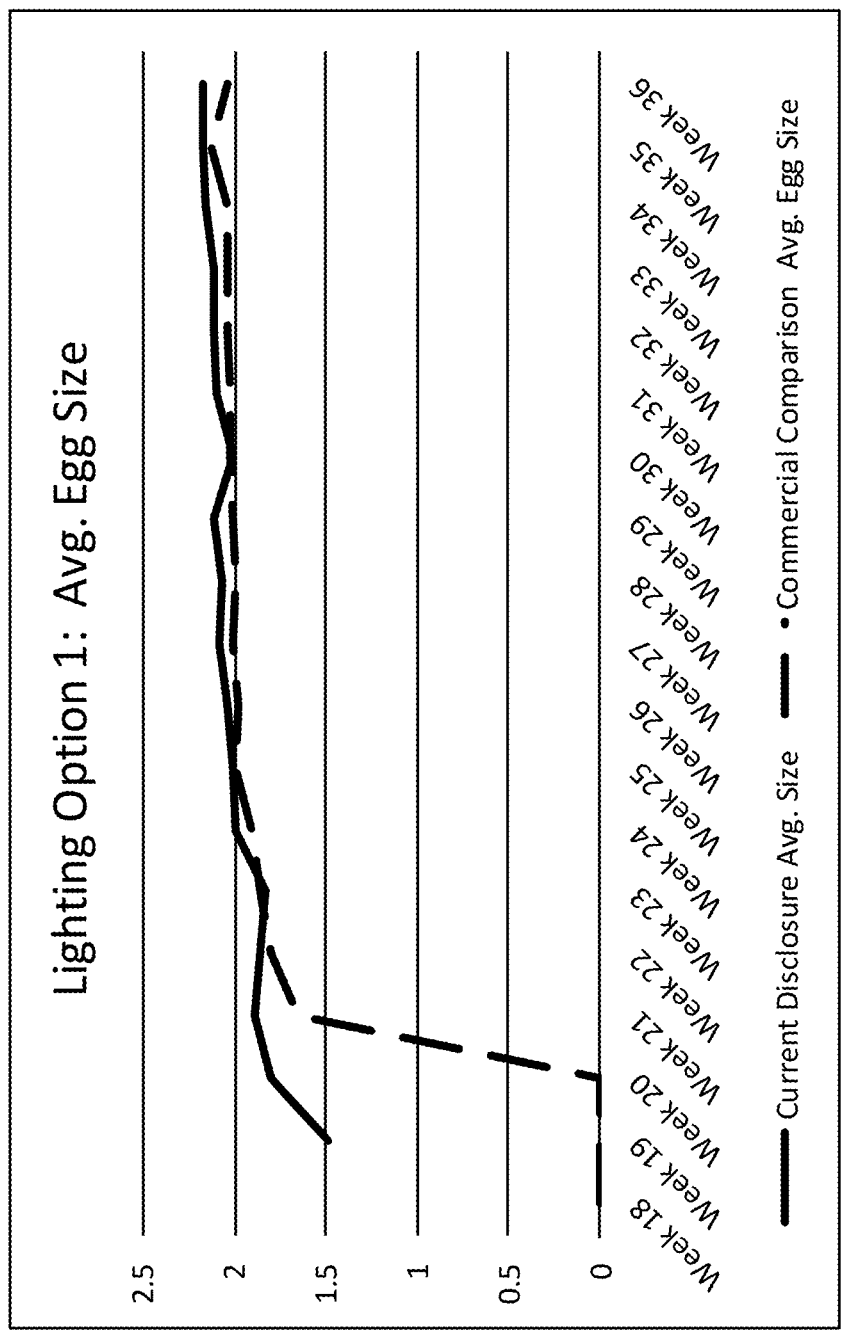
FIG. 20 is a graph showing a comparison of average egg production using lighting option 1 of the current disclosure with a commercial comparison.

As shown in Table 2 and illustrated in FIG. 20, the comparison began with birds (chickens) 18 weeks old. Birds grown under the lighting of the system of the current application showed egg production beginning in week 19, with 21.43% of birds producing eggs in week 20, 55.36% in week 21 and finally reaching 100% production, or all birds producing eggs in week 26. Conversely, the commercial comparison lighting systems began producing eggs in week 20, 3.78%, with 25.44% production in week 21, with 96.27% in week 26. As shown in Table 2, an increased percentage of birds grown under the lighting of the current application produced eggs from weeks 18 to 36 when compared to birds grown or living under a commercial lighting system.

TABLE 2

Average egg production per day
Lighting Option 1

| | Percentage of eggs production to total number of birds using the technology of the present disclosure | Commercial Comparison Avg./Day |
|---|---|---|
| Week 18 | 0 | 0.00% |
| Week 19 | 1.79% | 0.00% |
| Week 20 | 21.43% | 3.78% |
| Week 21 | 55.36% | 25.44% |
| Week 22 | 76.79% | 62.17% |
| Week 23 | 83.93% | 76.82% |
| Week 24 | 89.29% | 81.76% |
| Week 25 | 91.07% | 97.12% |
| Week 26 | 100.00% | 90.60% |
| Week 27 | 94.64% | 95.49% |
| Week 28 | 100.00% | 96.27% |
| Week 29 | 98.21% | 95.18% |
| Week 30 | 100.00% | 97.12% |
| Week 31 | 98.21% | 95.92% |
| Week 32 | 98.21% | 96.12% |
| Week 33 | 98.2% | 93.89% |
| Week 34 | 96.4% | 94.08% |
| Week 35 | 98.2% | 93.30% |
| Week 36 | 98.2% | 96.04% |

Example 2—Average Egg Production—Lighting Option Two

Table 3 shows a comparison of the average egg production rate to the total number of birds of the system and method of the current application using lighting Option 2 (Table 1), when compared with average egg production rate to the total number of birds in a conventional production facility using conventional commercial lighting.

Figure 21:
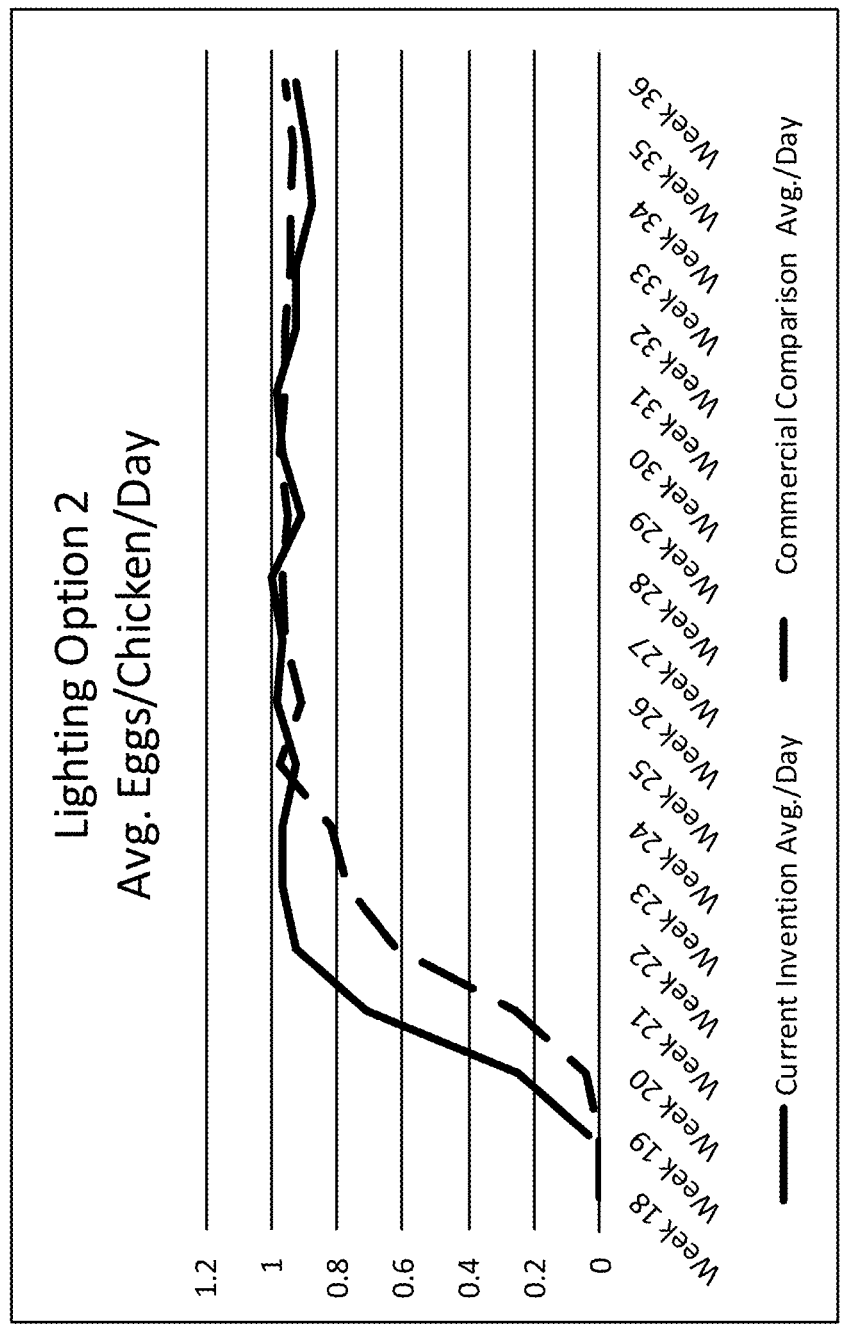
FIG. 21 is a graph showing a comparison of average egg production using lighting option 2 of the current disclosure with a commercial comparison.

As shown in Table 3 and illustrated in FIG. 21, the comparison began with birds (chickens) 18 weeks old. Birds grown under the lighting of the system of the current application showed egg production beginning in week 19, with 25.00% of birds producing eggs in week 20, 71.43% in week 21 and finally reaching 100% production, or all birds producing eggs in week 28. Conversely, the commercial comparison lighting systems began producing eggs in week 20, 3.78%, with 25.44% production in week 21, with 96.27% in week 26. As shown in Table 3, an increased percentage of birds grown under the lighting of the current application produced eggs from weeks 18 to 36 when compared to birds grown or living under a commercial lighting system.

TABLE 3

Average egg production per day
Lighting Option 2

| | Percentage of eggs production to total number of birds using the technology of the present disclosure | Commercial Comparison Avg./Day |
|---|---|---|
| Week 18 | 0 | 0.00% |
| Week 19 | 3.57% | 0.00% |
| Week 20 | 25.00% | 3.78% |
| Week 21 | 71.43% | 25.44% |
| Week 22 | 92.86% | 62.17% |
| Week 23 | 96.43% | 76.82% |
| Week 24 | 96.43% | 81.76% |
| Week 25 | 92.86% | 97.12% |
| Week 26 | 98.21% | 90.60% |
| Week 27 | 96.43% | 95.49% |
| Week 28 | 100.00% | 96.27% |
| Week 29 | 91.07% | 95.18% |
| Week 30 | 96.43% | 97.12% |
| Week 31 | 98.21% | 95.92% |
| Week 32 | 92.86% | 96.12% |
| Week 33 | 92.86% | 93.89% |
| Week 34 | 87.50% | 94.08% |
| Week 35 | 89.29% | 93.30% |
| Week 36 | 92.86% | 96.04% |

Example 3—Average Egg Production—Lighting Option Three

Table 4 shows a comparison of the average egg production rate to the total number of birds of the system and method of the current application using lighting Option 3 (Table 1), when compared with average egg production rate to the total number of birds in a conventional production facility using conventional commercial lighting.

Figure 22:
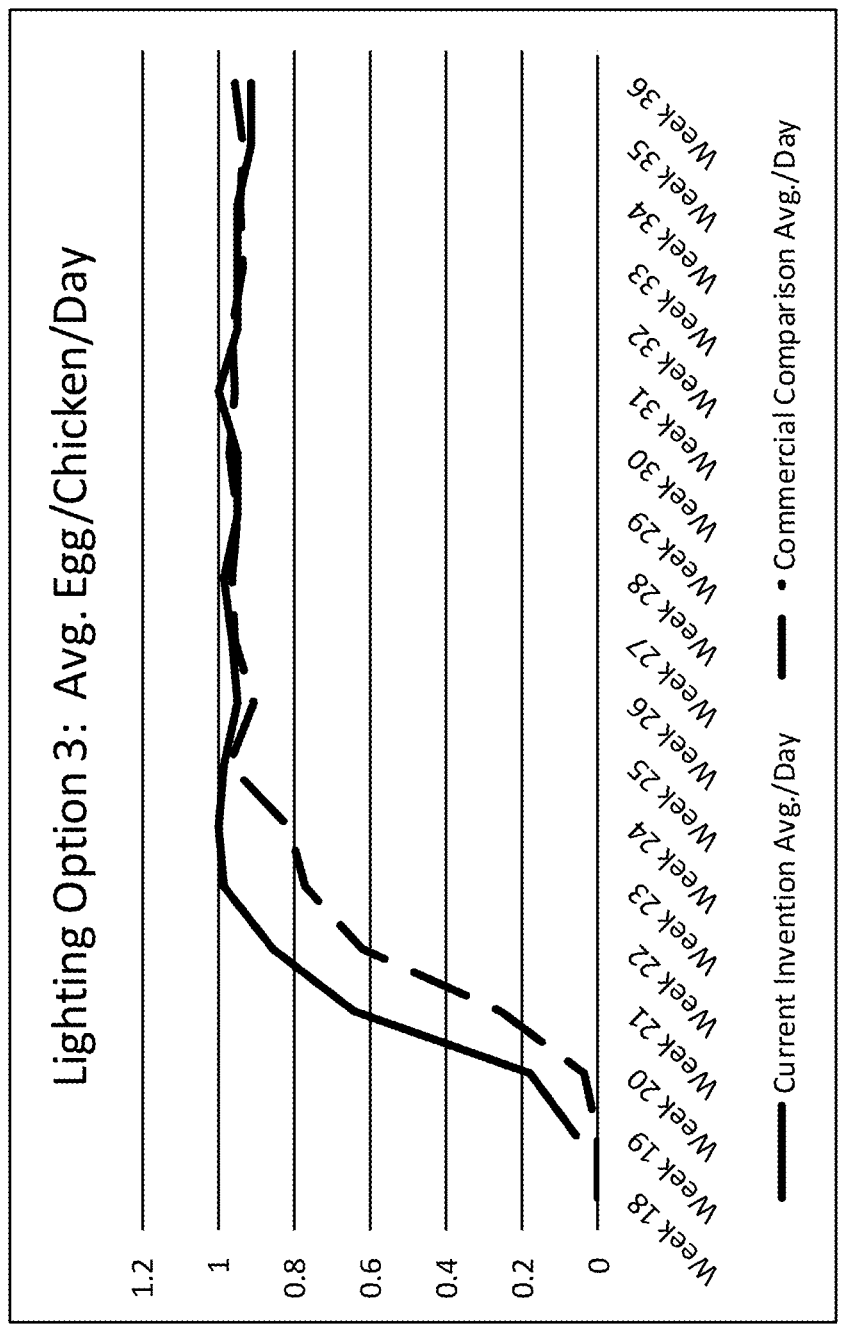
FIG. 22 is a graph showing a comparison of average egg production using lighting option 3 of the current disclosure with a commercial comparison.

As shown in Table 4 and illustrated in FIG. 22, the comparison began with birds (chickens) 18 weeks old. Birds grown under the lighting of the system of the current application showed egg production beginning in week 19, with 17.86% of birds producing eggs in week 20, 64.29% in week 21 and finally reaching 100% production, or all birds producing eggs in week 24. Conversely, the commercial comparison lighting systems began producing eggs in week 20, 3.78%, with 25.44% production in week 21, with 96.27% in week 26. As shown in Table 4 and illustrated in FIG. 22, an increased percentage of birds grown under the lighting of the current application produced eggs from weeks 18 to 36 when compared to birds grown or living under a commercial lighting system.

TABLE 4

Average egg production per day
Lighting Option 3

| | Percentage of eggs production to total number of birds using the technology of the present disclosure | Commercial Comparison Avg./Day |
|---|---|---|
| Week 18 | 0 | 0.00% |
| Week 19 | 5.36% | 0.00% |
| Week 20 | 17.86% | 3.78% |
| Week 21 | 64.29% | 25.44% |
| Week 22 | 85.71% | 62.17% |
| Week 23 | 98.21% | 76.82% |
| Week 24 | 100.00% | 81.76% |
| Week 25 | 98.21% | 97.12% |
| Week 26 | 94.64% | 90.60% |
| Week 27 | 96.43% | 95.49% |
| Week 28 | 98.21% | 96.27% |
| Week 29 | 94.64% | 95.18% |
| Week 30 | 94.64% | 97.12% |
| Week 31 | 100.00% | 95.92% |
| Week 32 | 94.64 | 96.12% |
| Week 33 | 94.64% | 93.89% |
| Week 34 | 94.64% | 94.08% |
| Week 35 | 91.07% | 93.30% |
| Week 36 | 91.07% | 96.04% |

Example 4—Average Egg Production—Lighting Option Four

Table 5 shows a comparison of the average egg production rate to the total number of birds of the system and method of the current application using lighting Option 4, when compared with average egg production rate to the total number of birds in a conventional production facility using conventional commercial lighting.

Figure 23:
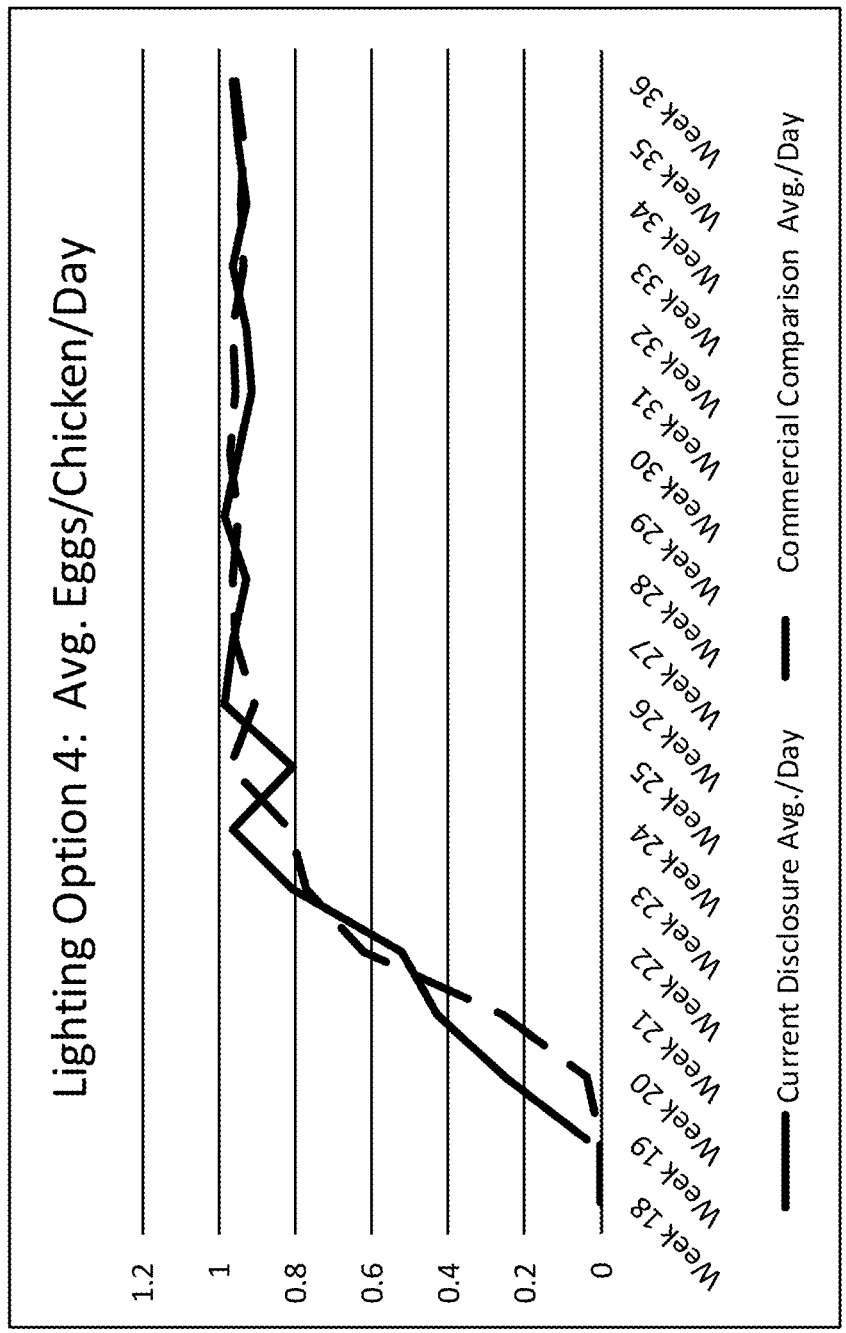
FIG. 23 is a graph showing a comparison of average egg production using lighting option 4 of the current disclosure with a commercial comparison.

As shown in Table 5 and illustrated in FIG. 23, the comparison began with birds (chickens) 18 weeks old. Birds grown under the lighting of the system of the current application showed egg production beginning in week 18, with 25.00% of birds producing eggs in week 20, 42.86% in week 21 and finally reaching 96.43% production, or all birds producing eggs in week 24. Conversely, the commercial comparison lighting systems began producing eggs in week 20, 3.78%, with 25.44% production in week 21, with 96.27% in week 26. As shown in Table 5, an increased percentage of birds grown under the lighting of the current application produced eggs from weeks 18 to 36 when compared to birds grown or living under a commercial lighting system.

TABLE 5

Average egg production per day
Lighting Option 4

| | Percentage of eggs production to total number of birds using the technology of the present disclosure | Commercial Comparison Avg./Day |
|---|---|---|
| Week 18 | 0.00% | 0.00% |
| Week 19 | 3.57% | 0.00% |
| Week 20 | 25.00% | 3.78% |
| Week 21 | 42.86% | 25.44% |
| Week 22 | 51.79% | 62.17% |
| Week 23 | 80.36% | 76.82% |
| Week 24 | 96.43% | 81.76% |
| Week 25 | 80.36% | 97.12% |

TABLE 5-continued

Average egg production per day
Lighting Option 4

| | Percentage of eggs production to total number of birds using the technology of the present disclosure | Commercial Comparison Avg./Day |
|---|---|---|
| Week 26 | 98.21% | 90.60% |
| Week 27 | 96.43% | 95.49% |
| Week 28 | 92.86% | 96.27% |
| Week 29 | 98.21% | 95.18% |
| Week 30 | 94.64% | 97.12% |
| Week 31 | 91.07% | 95.92% |
| Week 32 | 92.85% | 96.12% |
| Week 33 | 9.42% | 93.89% |
| Week 34 | 92.85% | 94.08% |
| Week 35 | 94.64% | 93.30% |
| Week 36 | 96.43% | 96.04% |

Example 5—Average Egg Production—Lighting Option Five

Table 6 shows a comparison of the average egg production rate to the total number of birds of the system and method of the current application using lighting Option 5, when compared with average egg production rate to the total number of birds in a conventional production facility using conventional commercial lighting.

Figure 24:
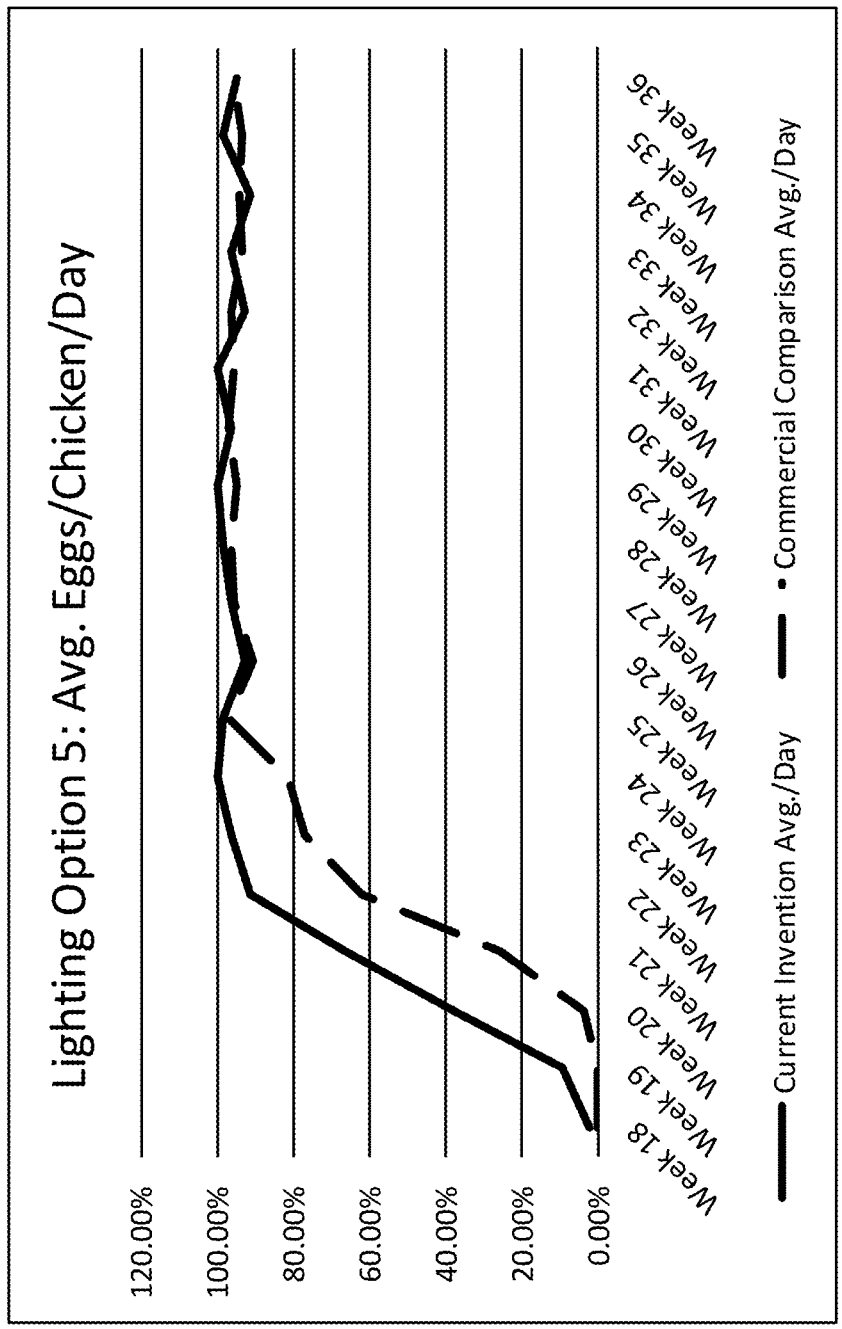
FIG. 24 is a graph showing a comparison of average egg production using lighting option 5 of the current disclosure with a commercial comparison.

As shown in Table 6 and illustrated in FIG. 24, the comparison began with birds (chickens) 18 weeks old. Birds grown under the lighting of the system of the current application showed egg production beginning in week 18, with 37.50% of birds producing eggs in week 20, 66.07% in week 21 and finally reaching 100% production, or all birds producing eggs in week 24. Conversely, the commercial comparison lighting systems began producing eggs in week 20, 3.78%, with 25.44% production in week 21, with 96.27% in week 26. As shown in Table 6, an increased percentage of birds grown under the lighting of the current application produced eggs from weeks 18 to 36 when compared to birds grown or living under a commercial lighting system.

TABLE 6

Average egg production per day
Lighting Option 5

| | Percentage of eggs production to total number of birds using the technology of the present disclosure | Commercial Comparison Avg./Day |
|---|---|---|
| Week 18 | 1.79% | 0.00% |
| Week 19 | 8.93% | 0.00% |
| Week 20 | 37.50% | 3.78% |
| Week 21 | 66.07% | 25.44% |
| Week 22 | 91.07% | 62.17% |
| Week 23 | 96.43% | 76.82% |
| Week 24 | 100.00% | 81.76% |
| Week 25 | 98.21% | 97.12% |
| Week 26 | 92.86% | 90.60% |
| Week 27 | 96.43% | 95.49% |
| Week 28 | 98.21% | 96.27% |
| Week 29 | 100.00% | 95.18% |
| Week 30 | 96.43% | 97.12% |
| Week 31 | 100.00% | 95.92% |
| Week 32 | 92.86% | 96.12% |
| Week 33 | 96.43% | 93.89% |

TABLE 6-continued

Average egg production per day
Lighting Option 5

| | Percentage of eggs production to total number of birds using the technology of the present disclosure | Commercial Comparison Avg./Day |
|---|---|---|
| Week 34 | 91.07% | 94.08% |
| Week 35 | 98.21% | 93.30% |
| Week 36 | 94.64% | 96.04% |

Example 6—Average Egg Production—Lighting Option Six

Table 7 shows a comparison of the average egg production rate to the total number of birds of the system and method of the current application using lighting Option 6, when compared with average egg production rate to the total number of birds in a conventional production facility using conventional commercial lighting.

Figure 25:
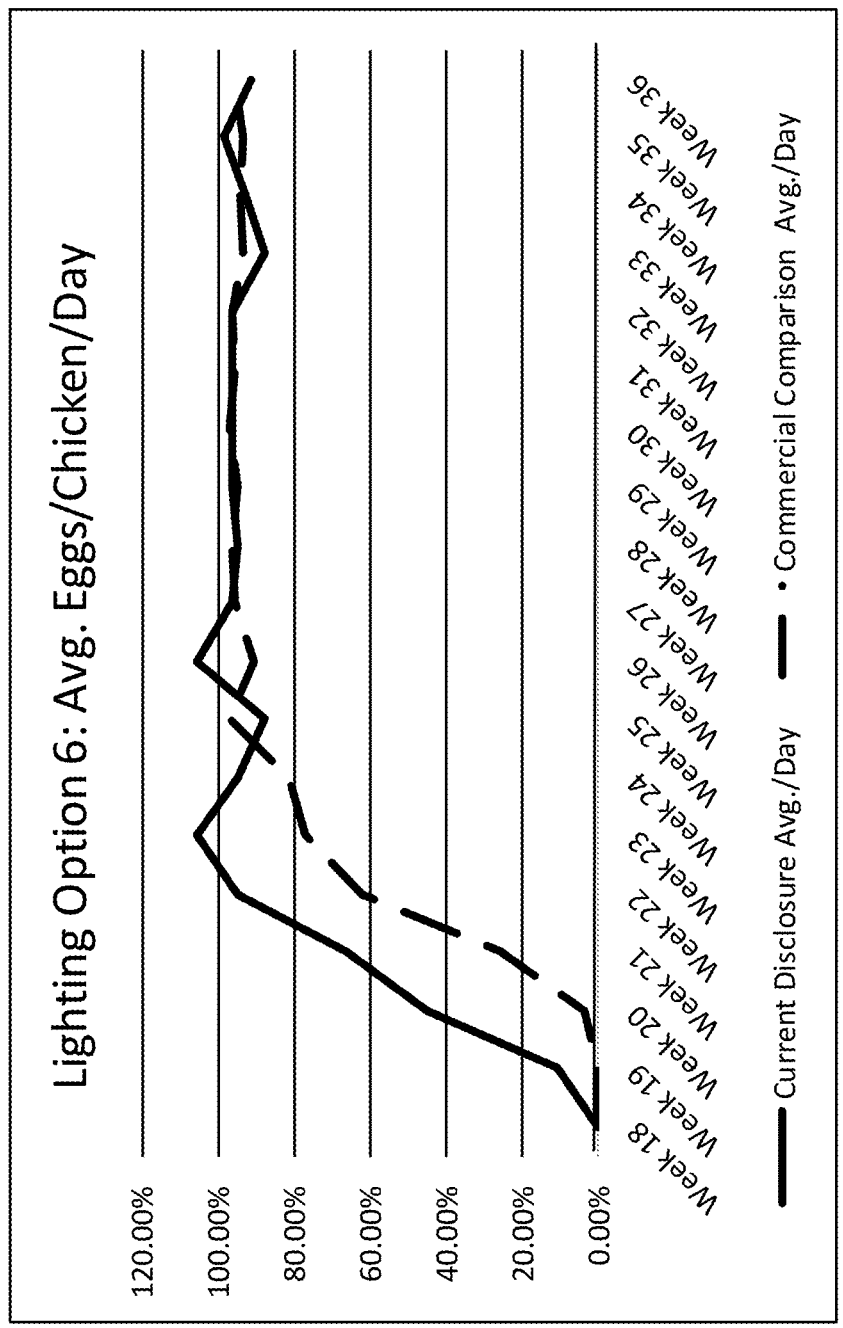
FIG. 25 is a graph showing a comparison of average egg production using lighting option 6 of the current disclosure with a commercial comparison.

As shown in Table 7 and illustrated in FIG. 25, the comparison began with birds (chickens) 18 weeks old. Birds grown under the lighting of the system of the current application showed egg production beginning in week 19, with 44.64% of birds producing eggs in week 20, 66.07% in week 21 and finally reaching 105.36% production, or all birds producing eggs in week 23. Conversely, the commercial comparison lighting systems began producing eggs in week 20, 3.78%, with 25.44% production in week 21, with 96.27% in week 26. As shown in Table 7, an increased percentage of birds grown under the lighting of the current application produced eggs from weeks 18 to 36 when compared to birds grown or living under a commercial lighting system.

TABLE 7

Average egg production per day
Lighting Option 6

| | Percentage of eggs production to total number of birds using the technology of the present disclosure | Commercial Comparison Avg./Day |
|---|---|---|
| Week 18 | 0.00% | 0.00% |
| Week 19 | 10.71% | 0.00% |
| Week 20 | 44.64% | 3.78% |
| Week 21 | 66.07% | 25.44% |
| Week 22 | 94.64% | 62.17% |
| Week 23 | 105.36% | 76.82% |
| Week 24 | 94.64% | 81.76% |
| Week 25 | 87.50% | 97.12% |
| Week 26 | 105.36% | 90.60% |
| Week 27 | 96.43% | 95.49% |
| Week 28 | 94.64% | 96.27% |
| Week 29 | 96.43% | 95.18% |
| Week 30 | 96.43% | 97.12% |
| Week 31 | 96.43% | 95.92% |
| Week 32 | 96.43% | 96.12% |
| Week 33 | 0.00% | 93.89% |
| Week 34 | 10.71% | 94.08% |
| Week 35 | 44.64% | 93.30% |
| Week 36 | 66.07% | 96.04% |

Example 7—Average Egg Production—Comparison with Standard Lighting and Time

Example 7 provides a comparison study of average egg production rate. The study was conducted in Greeley, Colo. in the summer of 2016 using three lighting systems, Lighting Option 4 (shown in Table 1) of the lighting method of the current disclosure but on a standard commercial day/night cycle (15 hours ON at week 17 with a 15 minute increase each week), a control with standard fluorescent lighting on a standard commercial day/night cycle, and Lighting Option 4 using the lighting method of the current disclosure.

Eggs were produced in compliance with the United Egg Producers Animal Husbandry Guidelines using various strains of white leghorn varieties raised from pullets. Birds were housed in cages in blackout grow tents, with one bird per cage, and eight birds per tent. Birds were fed an all-natural, 100% vegetarian diet comprised predominantly of corn, soybean meal, limestone, vitamins and minerals, matching the diets, feeding and watering times for the commercial comparison birds.

Figure 26:
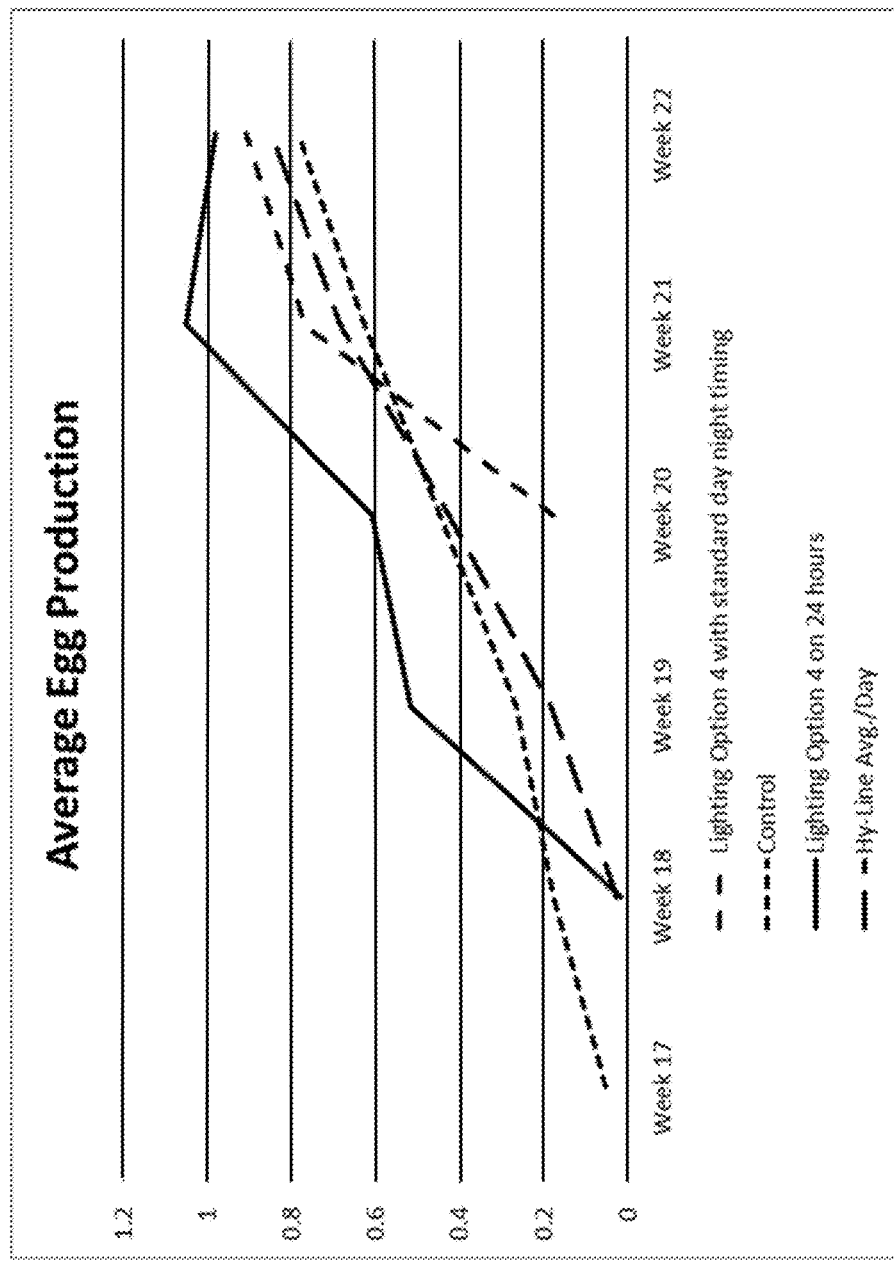
FIG. 26 is a graph showing a four-way comparison of average egg production using lighting option 4 of the current disclosure with standard day/night timing, 24 hour timing in comparison with a commercial control and the commercial average.

As shown in Table 8 below (and in FIG. 26), birds in the comparison produced a small amount of eggs (5.36%) starting in week 17 with the control, however birds grown under Lighting Option 4 (24 hour (column 4)) quickly surpassed by week 19 standard production levels both for the control (column 3) and the average (column 5, see Management Guide, W-36 Commercial Layers, published by Hy-Line International, January 2016). By week 22, both the birds grown under Lighting Option 4 on a 24 hour cycle and birds grown under Lighting Option 4 on a commercial standard day/night timing showed an increase in production over the control and the commercial average, with birds grown under Lighting Option 4 on a 24 hour cycle producing at 98.21%, birds grown under Lighting Option 4 on a commercial standard day/night timing producing at 91.07% s, while birds grown under the control producing at 78.57% and the commercial average at 85.00%.

TABLE 8

Average Egg Production
Comparison Study with Commercial Control

| | Lighting Option 4 with commercial standard timing | Control | Lighting option 4 on a 24 hour cycle | Commercial Average |
|---|---|---|---|---|
| Week 17 | | 5.36% | | |
| Week 18 | | 17.86% | 1.79% | 2.50% |
| Week 19 | | 26.79% | 51.79% | 18.50% |
| Week 20 | 17.86% | 44.64% | 60.71% | 42.50% |
| Week 21 | 76.79% | 62.50% | 105.36% | 68.50% |
| Week 22 | 91.07% | 78.57% | 98.21% | 85.00% |

Increased Average Egg Weight

Six poultry egg weight studies were conducted in Greeley, Colo. in the winter and spring of 2016 using the lighting system and method of the current disclosure and compared standard commercial chicken egg weights for white leghorn varieties raised under standard commercially available lights (see Hy-Line International, January 2016).

Birds raised under the lighting of the system and methods of the current disclosure were raised in compliance with the United Egg Producers Animal Husbandry Guidelines using various strains of white leghorn varieties raised from pullets. Birds were housed in cages in blackout grow tents, with one bird per cage, and eight birds per tent. Birds were fed an all-natural, 100% vegetarian diet comprised predominantly of corn, soybean meal, limestone, vitamins and minerals, matching the diets, feeding and watering times for the commercial comparison birds. Egg weights were captured using a digital scale and measured on a daily basis at 9 am.

Example 8—Average Egg Weight—Lighting Option One

Table 9 shows a comparison of the average bird weight of the system and method of the current application using lighting Option One (Table 1) when compared with the commercial average bird weight.

Figure 27:
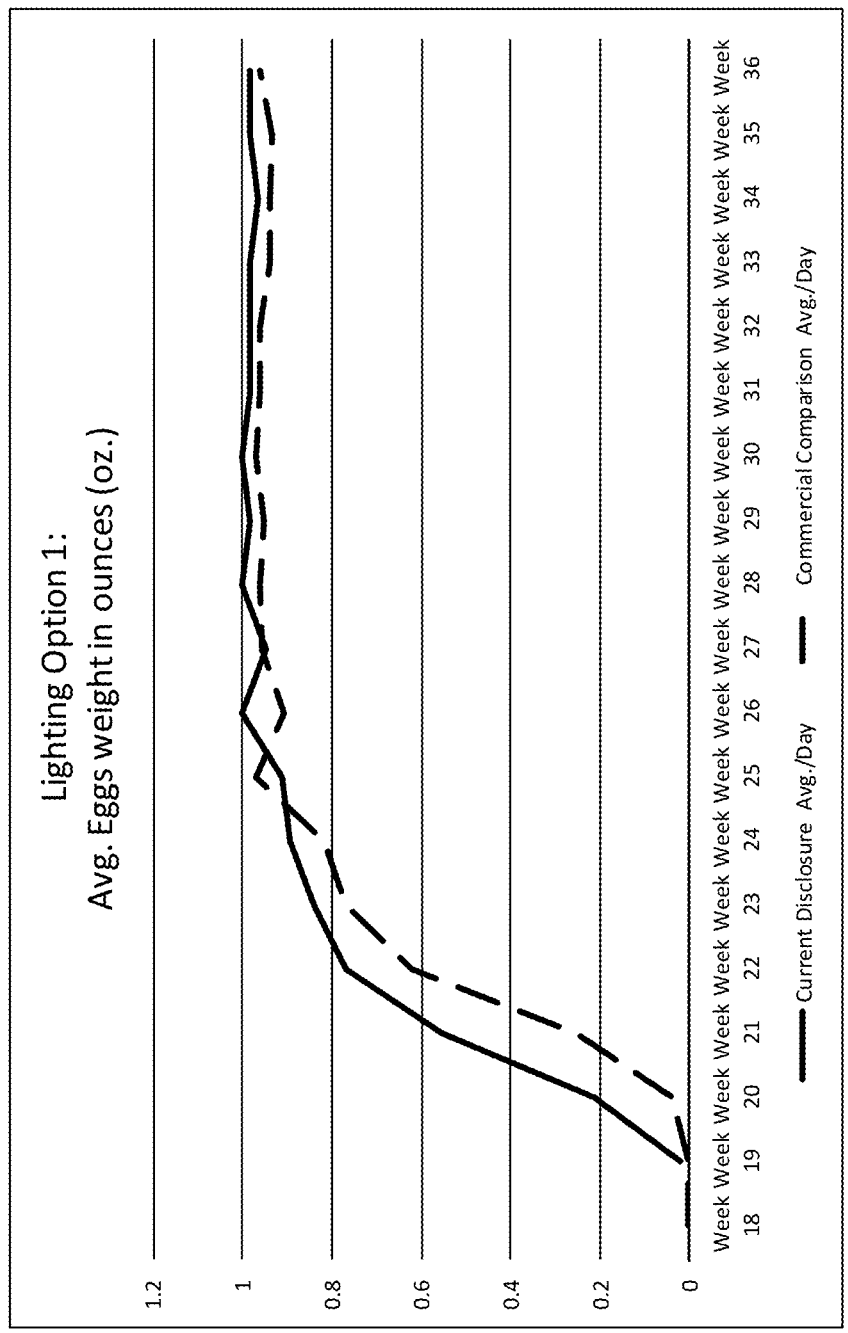
FIG. 27 is a graph showing a comparison of average egg size using lighting option 1 of the current disclosure with a commercial comparison.

As shown in Table 9 and illustrated in FIG. 27, the average egg weight comparison began with birds (chickens) 18 weeks old birds raised under the lighting of the system of the current application showed egg production beginning in week 19, with an average weight of 1.495 oz., at 20 weeks, average egg weight was 1.803 oz., with average egg weight reaching 2.00 oz. at week 25, increasing to 2.10 oz. in week 29, 2.17 oz. in week 35. Conversely, the average egg weight of eggs produced under the commercial comparison lighting system showed at average egg weight of 1.65 oz. in week 21, 1.90 oz. in week 24, 1.99 oz. in week 25 and maxing out at 2.13 in week 35. As shown in Table 8, eggs produced under lighting of the technology of current application produced eggs from weeks 18 to 36 with an average increased egg weight of 0.07 when compared to birds grown or living under a commercial lighting system.

TABLE 9

Average egg weight in ounces (oz.) Lighting Option 1

| | Average egg weight using the technology of the present disclosure | Commercial Comparison Avg. weight | Difference between systems |
|---|---|---|---|
| Week 18 | 0.00 | 0.00 | |
| Week 19 | 1.495 | 0.00 | |
| Week 20 | 1.803387097 | 0.00 | |
| Week 21 | 1.882093023 | 1.653333333 | 0.23 |
| Week 22 | 1.864893617 | 1.795555556 | 0.07 |
| Week 23 | 1.835612245 | 1.866666667 | −0.03 |
| Week 24 | 1.994117647 | 1.902222222 | 0.09 |
| Week 25 | 2.001196429 | 1.991111111 | 0.01 |
| Week 26 | 2.032075472 | 1.973333333 | 0.06 |
| Week 27 | 2.081696429 | 2.008888889 | 0.08 |
| Week 28 | 2.066727273 | 1.991111111 | 0.07 |
| Week 29 | 2.106071429 | 2.008888889 | 0.10 |
| Week 30 | 2.004351852 | 2.026666667 | −0.02 |
| Week 31 | 2.099636364 | 2.026666667 | 0.07 |
| Week 32 | 2.1074 | 2.044444444 | 0.06 |
| Week 33 | 2.119181818 | 2.044444444 | 0.07 |
| Week 34 | 2.150740741 | 2.044444444 | 0.11 |
| Week 35 | 2.17 | 2.133333333 | 0.04 |
| Week 36 | 2.169636364 | 2.044444444 | 0.12 |
| Average difference | | | 0.07 oz. |

Example 9—Average Egg Weight—Lighting Option Two

Table 10 shows a comparison of the average egg weight of the system and method of the current application using lighting Option Two (Table 1) when compared with average egg weight in a conventional production facility using conventional commercial lighting.

Figure 28:
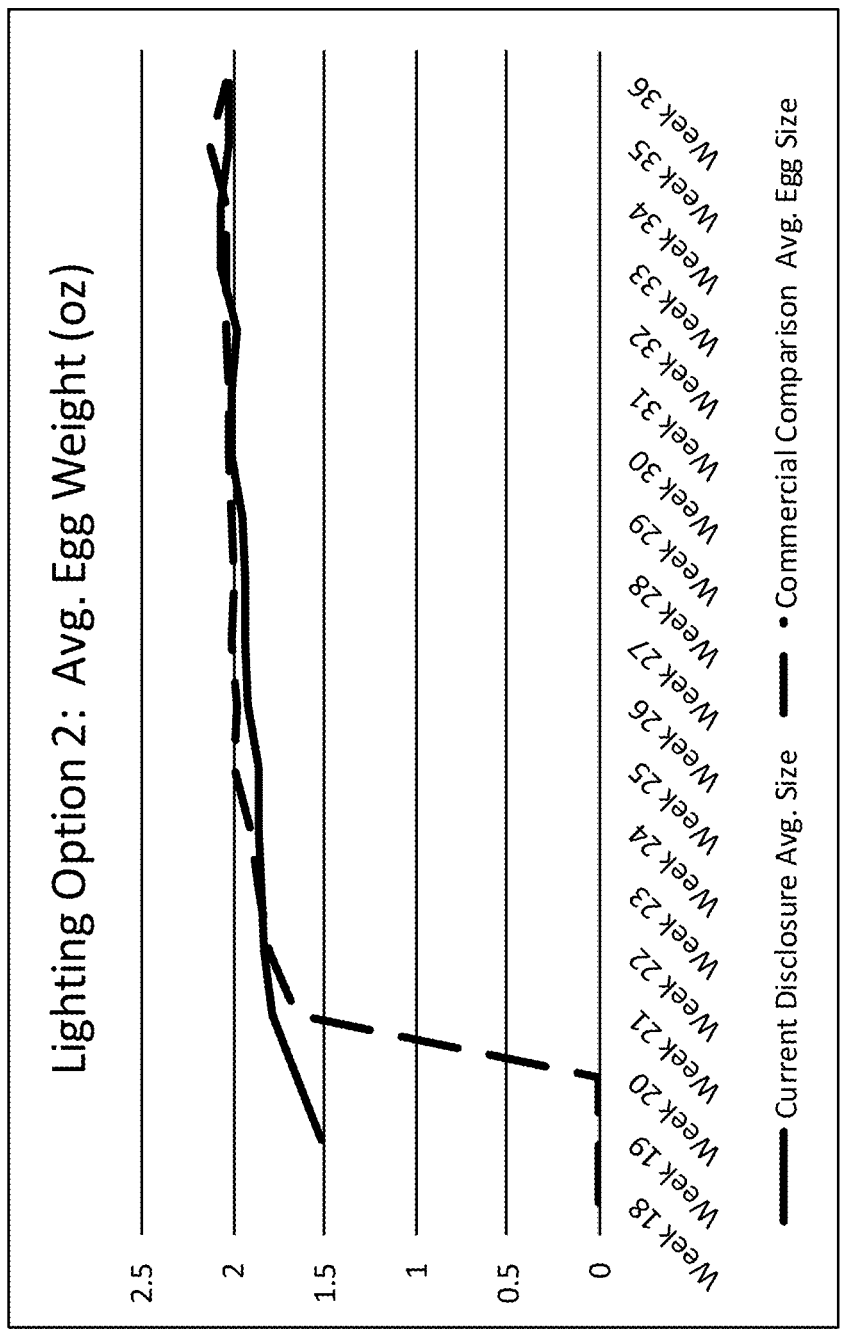
FIG. 28 is a graph showing a comparison of average egg size using lighting option 2 of the current disclosure with a commercial comparison.

As shown in Table 10 and illustrated in FIG. 28, the average egg weight comparison began with birds (chickens) 18 weeks old. Birds raised under the lighting of the system of the current application showed egg production beginning in week 19, with an average weight of 1.52 oz., at 20 weeks, average egg weight was 1.65 oz., with average egg weight reaching 1.86 oz. at week 25, increasing to 1.95 oz. in week 29, and 2.03 oz. in week 35. Conversely, the average egg weight of eggs produced under the commercial comparison lighting system showed at average egg weight of 1.65 oz. in week 21, 1.90 oz. in week 24, 1.99 in week 25 and maxing out at 2.13 in week 35.

TABLE 10

Average egg weight in ounces (oz.) Lighting Option 2

| | Average egg weight with current application system | Commercial Comparison Avg. weight |
|---|---|---|
| Week 18 | | 0.00 |
| Week 19 | 1.515 | 0.00 |
| Week 20 | 1.652916667 | 0.00 |
| Week 21 | 1.78125 | 1.653333333 |
| Week 22 | 1.828173077 | 1.795555556 |
| Week 23 | 1.849907407 | 1.866666667 |
| Week 24 | 1.866574074 | 1.902222222 |
| Week 25 | 1.861980769 | 1.991111111 |
| Week 26 | 1.916909091 | 1.973333333 |
| Week 27 | 1.926574074 | 2.008888889 |
| Week 28 | 1.9305 | 1.991111111 |
| Week 29 | 1.955784314 | 2.008888889 |
| Week 30 | 2.004351852 | 2.026666667 |
| Week 31 | 2.012909091 | 2.026666667 |
| Week 32 | 1.977980769 | 2.044444444 |
| Week 33 | 2.062980769 | 2.044444444 |
| Week 34 | 2.061326531 | 2.044444444 |
| Week 35 | 2.0282 | 2.133333333 |
| Week 36 | 2.016923077 | 2.044444444 |

Example 10—Average Egg Weight—Lighting Option Three

Table 11 shows a comparison of the average egg weight of the system and method of the current application using lighting Option Three (Table 1) when compared with average egg weight in a conventional production facility using conventional commercial lighting.

Figure 29:
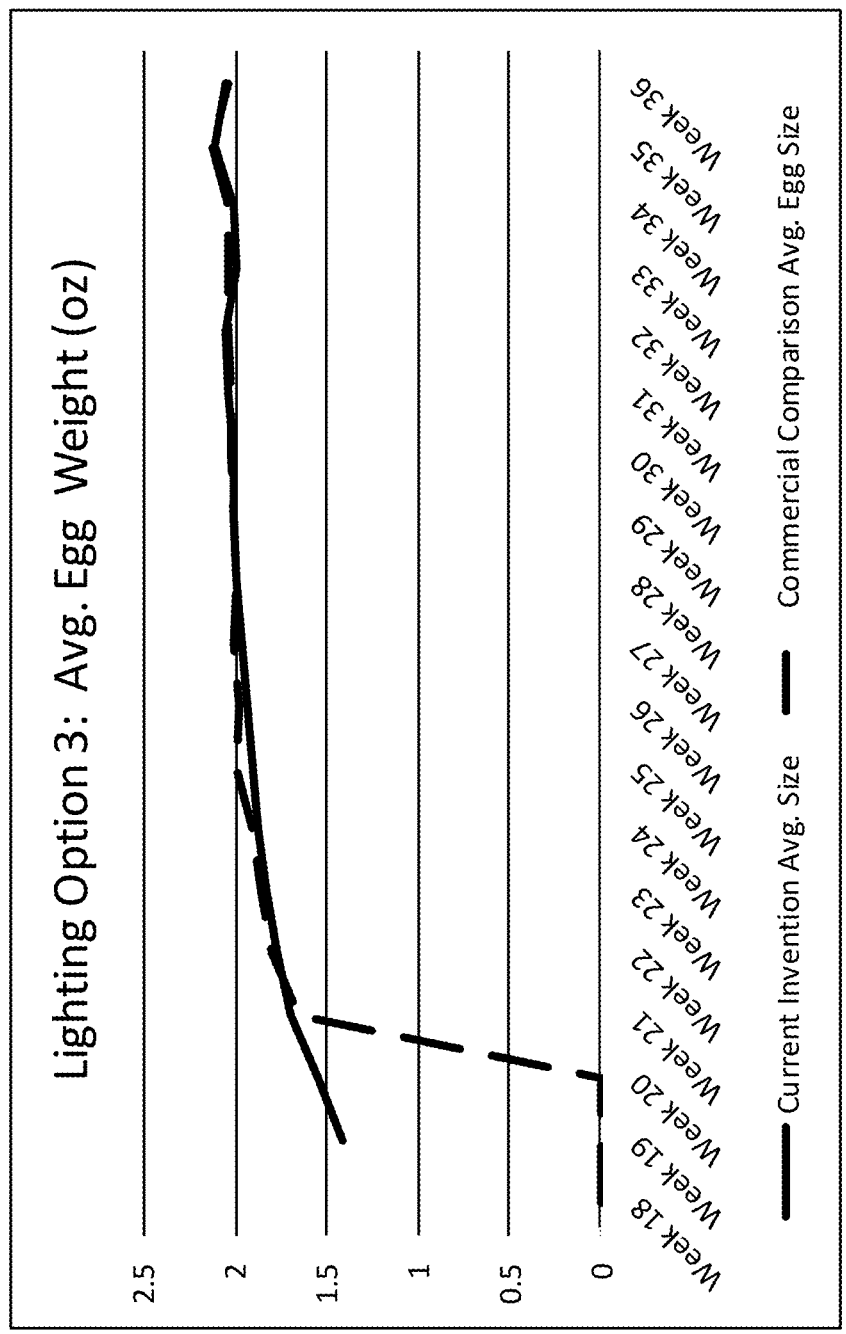
FIG. 29 is a graph showing a comparison of average egg size using lighting option 3 of the current disclosure with a commercial comparison.

As shown in Table 11 and illustrated in FIG. 29, the average egg weight comparison began with birds (chickens) 18 weeks old. Birds raised under the lighting of the system of the current application showed egg production beginning in week 19, with an average weight of 1.54 oz., at 20 weeks the average egg weight was 1.70 oz., with average egg weight reaching 2.00 oz. at week 28, increasing to 2.04 oz. in week 32, and 2.11 oz. in week 35. Conversely, the average egg weight of eggs produced under the commercial comparison lighting system showed at average egg weight of 1.65 oz. in week 21, 1.90 oz. in week 24, 1.99 oz. in week 25 and maxing out at 2.13 in week 35.

TABLE 11

Average egg weight in ounces (oz.) Lighting Option 3

| | Average egg weight with current application system | Commercial Comparison Avg. weight |
|---|---|---|
| Week 18 | | 0.00 |
| Week 19 | 1.42 | 0.00 |
| Week 20 | 1.5445 | 0.00 |
| Week 21 | 1.695556 | 1.653333333 |
| Week 22 | 1.774063 | 1.795555556 |
| Week 23 | 1.834091 | 1.866666667 |
| Week 24 | 1.878125 | 1.902222222 |

TABLE 11-continued

Average egg weight in ounces (oz.)
Lighting Option 3

| | Average egg weight with current application system | Commercial Comparison Avg. weight |
|---|---|---|
| Week 25 | 1.901545 | 1.991111111 |
| Week 26 | 1.938173 | 1.973333333 |
| Week 27 | 1.960741 | 2.008888889 |
| Week 28 | 2.000545 | 1.991111111 |
| Week 29 | 2.011415 | 2.008888889 |
| Week 30 | 2.003396 | 2.026666667 |
| Week 31 | 2.036161 | 2.026666667 |
| Week 32 | 2.046132 | 2.044444444 |
| Week 33 | 1.993491 | 2.044444444 |
| Week 34 | 2.011038 | 2.044444444 |
| Week 35 | 2.113235 | 2.133333333 |
| Week 36 | 2.058627 | 2.044444444 |

Example 11—Average Egg Weight—Lighting Option Four

Table 12 shows a comparison of the average egg weight of the system and method of the current application using lighting Option Four (Table 1) when compared with average egg weight in a conventional production facility using conventional commercial lighting.

Figure 30:
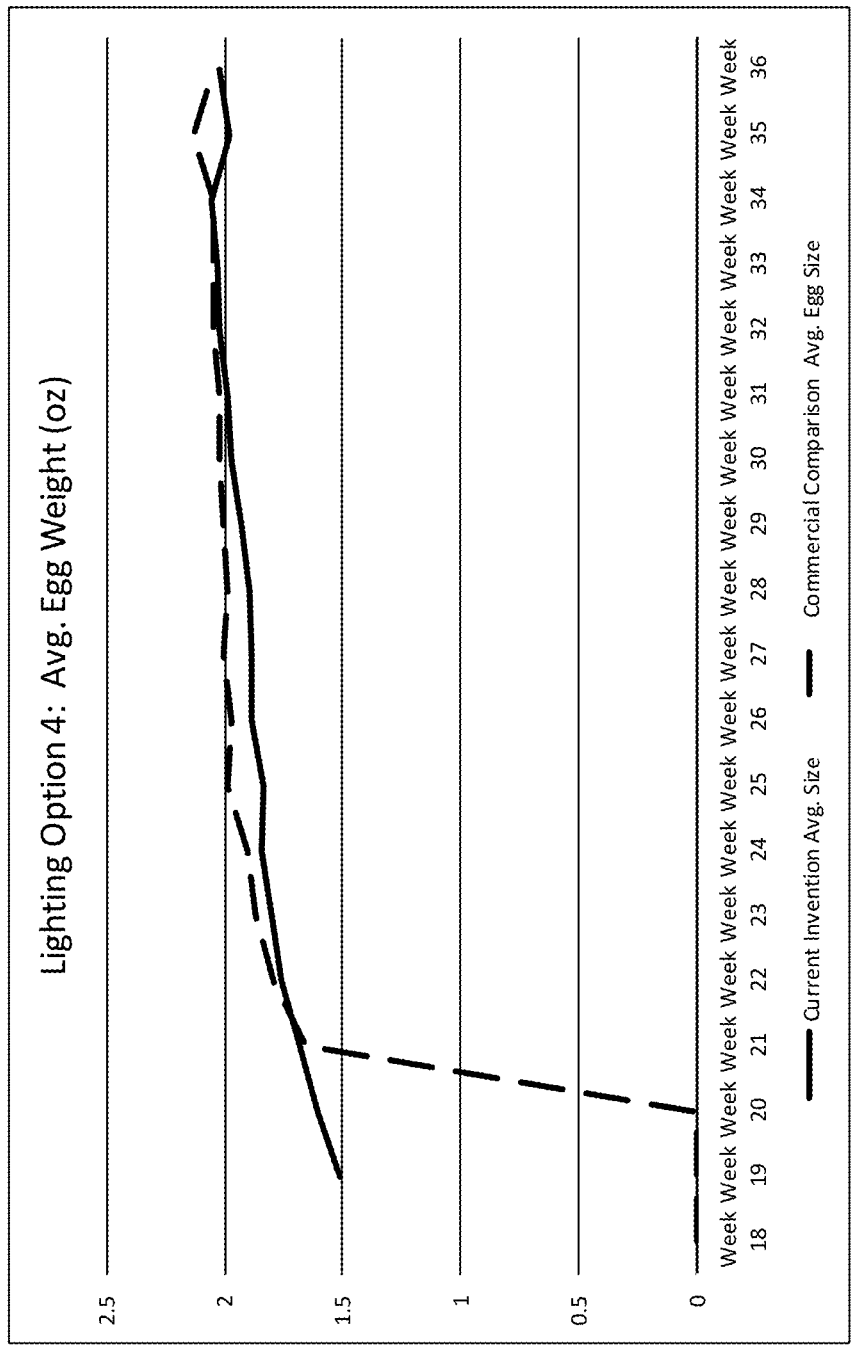
FIG. 30 is a graph showing a comparison of average egg size using lighting option 4 of the current disclosure with a commercial comparison.

As shown in Table 12 and illustrated in FIG. 30, the average egg weight comparison began with birds (chickens) 18 weeks old. Birds raised under the lighting of the system of the current application showed egg production beginning in week 19, with an average weight of 1.61 oz., at 20 weeks the average egg weight was 1.61 oz., with average egg weight reaching 2.02 oz. at week 32, and increasing to 2.06 oz. in week 34. Conversely, the average egg weight of eggs produced under the commercial comparison lighting system showed at average egg weight of 1.65 oz. in week 21, 1.90 oz. in week 24, 1.99 in week 25 and maxing out at 2.13 in week 35.

TABLE 12

Average egg weight in ounces (oz.)
Lighting Option 4

| | Average egg weight with current application system | Commercial Comparison Avg. weight |
|---|---|---|
| Week 18 | | 0.00 |
| Week 19 | 1.515 | 0.00 |
| Week 20 | 1.609643 | 0.00 |
| Week 21 | 1.684375 | 1.653333333 |
| Week 22 | 1.756034 | 1.795555556 |
| Week 23 | 1.797273 | 1.866666667 |
| Week 24 | 1.844906 | 1.902222222 |
| Week 25 | 1.833667 | 1.991111111 |
| Week 26 | 1.884364 | 1.973333333 |
| Week 27 | 1.888611 | 2.008888889 |
| Week 28 | 1.895115 | 1.991111111 |
| Week 29 | 1.926273 | 2.008888889 |
| Week 30 | 1.971434 | 2.026666667 |
| Week 31 | 1.985392 | 2.026666667 |
| Week 32 | 2.020192 | 2.044444444 |
| Week 33 | 2.03 | 2.044444444 |
| Week 34 | 2.055096 | 2.044444444 |
| Week 35 | 1.98283 | 2.133333333 |
| Week 36 | 2.024278 | 2.044444444 |

Example 12—Average Egg Weight—Lighting Option Five

Table 13 shows a comparison of the average egg weight of the system and method of the current application using lighting Option Five (Table 1) when compared with average egg weight in a conventional production facility using conventional commercial lighting.

Figure 31:
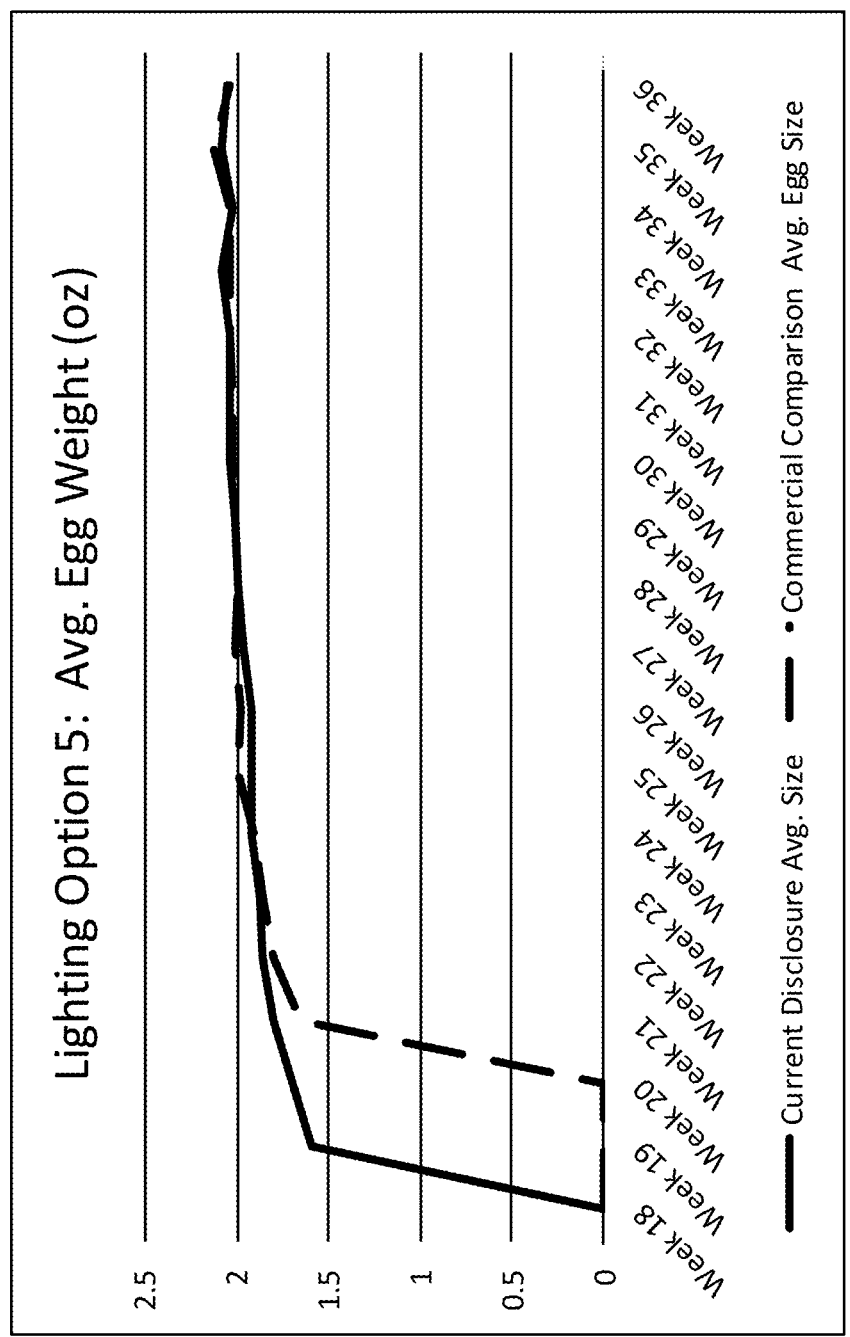
FIG. 31 is a graph showing a comparison of average egg size using lighting option 5 of the current disclosure with a commercial comparison.

As shown in Table 13 and illustrated in FIG. 31, the average egg weight comparison began with birds (chickens) 18 weeks old. Birds raised under the lighting of the system of the current application showed egg production beginning in week 19, with an average weight of 1.594 oz., at 20 weeks, average egg weight was 1.692 oz., with average egg weight reaching 2.00 oz. at week 29, and increasing to 2.08 oz. in week 33. Conversely, the average egg weight of eggs produced under the commercial comparison lighting system showed at average egg weight of 1.65 oz. in week 21, 1.90 oz. in week 24, 1.99 in week 25 and maxing out at 2.13 in week 35. As shown in Table 8, eggs produced under lighting of the technology of current application produced eggs from weeks 18 to 36 with an average increased egg weight of 0.07 when compared to birds grown or living under a commercial lighting system.

TABLE 13

Average egg weight in ounces (oz.)
Lighting Option 5

| | Average egg weight with current application system | Commercial Comparison Avg. weight |
|---|---|---|
| Week 18 | 0.00 | 0.00 |
| Week 19 | 1.594 | 0.00 |
| Week 20 | 1.692619048 | 0.00 |
| Week 21 | 1.806857143 | 1.653333333 |
| Week 22 | 1.859791667 | 1.795555556 |
| Week 23 | 1.876759259 | 1.866666667 |
| Week 24 | 1.912857143 | 1.902222222 |
| Week 25 | 1.918545455 | 1.991111111 |
| Week 26 | 1.925784314 | 1.973333333 |
| Week 27 | 1.961944444 | 2.008888889 |
| Week 28 | 1.992181818 | 1.991111111 |
| Week 29 | 2.009732143 | 2.008888889 |
| Week 30 | 2.044722222 | 2.026666667 |
| Week 31 | 2.040982143 | 2.026666667 |
| Week 32 | 2.041673077 | 2.044444444 |
| Week 33 | 2.080092593 | 2.044444444 |
| Week 34 | 2.028823529 | 2.044444444 |
| Week 35 | 2.081090909 | 2.133333333 |
| Week 36 | 2.052075472 | 2.044444444 |

Example 13—Average Egg Weight—Lighting Option Six

Table 13 shows a comparison of the average egg weight of the system and method of the current application using lighting Option Six (Table 1) when compared with average egg weight in a conventional production facility using conventional commercial lighting.

Figure 32:
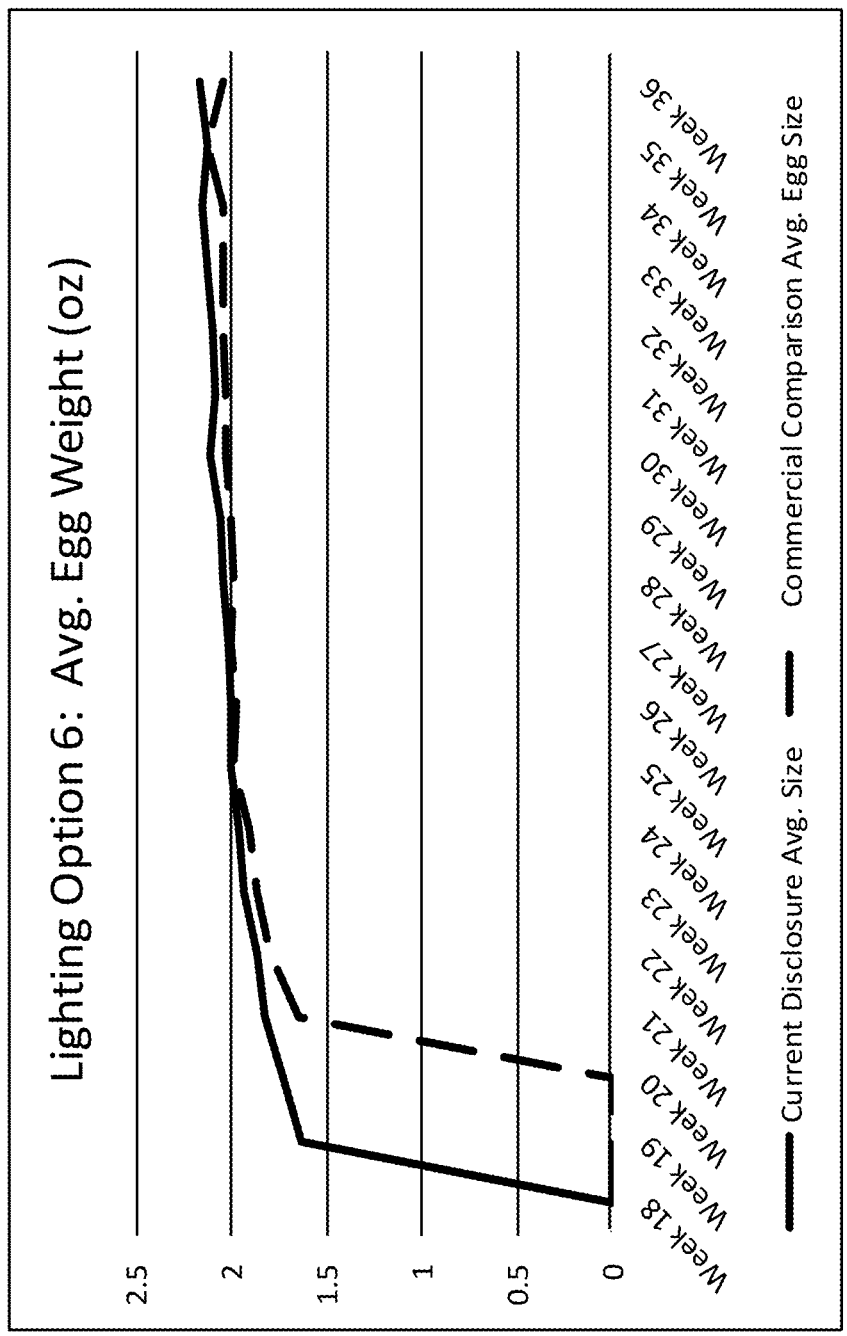
FIG. 32 is a graph showing a comparison of average egg size using lighting option 6 of the current disclosure with a commercial comparison.

As shown in Table 14 and illustrated in FIG. 32, the average egg weight comparison began with birds (chickens) 18 weeks old. Birds raised under the lighting of the system of the current application showed egg production beginning in week 19, with an average weight of 1.634 oz., at 20 weeks, average egg weight was 1.728 oz., with average egg weight reaching 2.00 oz. at week 25, increasing to 2.10 oz. in week 33 and continuing to increase to 2.17 oz. by week 36. Conversely, the average egg weight of eggs produced under the commercial comparison lighting system showed at average egg weight of 1.65 oz. in week 21, 1.90 oz. in week 24, 1.99 in week 25 and maxing out at 2.13 in week 35. As shown in Table 8, eggs produced under lighting of the technology of current application produced eggs from weeks 18 to 36 with an average increased egg weight of 0.07 when compared to birds grown or living under a commercial lighting system.

TABLE 14

Average egg weight in ounces (oz.)
Lighting Option 6

| | Average egg weight with current application system | Commercial Comparison Avg. weight |
|---|---|---|
| Week 18 | 0 | 0.00 |
| Week 19 | 1.634 | 0.00 |
| Week 20 | 1.7282 | 0.00 |
| Week 21 | 1.821857143 | 1.653333333 |
| Week 22 | 1.865098039 | 1.795555556 |
| Week 23 | 1.934224138 | 1.866666667 |
| Week 24 | 1.958113208 | 1.902222222 |
| Week 25 | 2.001734694 | 1.991111111 |
| Week 26 | 2.011440678 | 1.973333333 |
| Week 27 | 2.024074074 | 2.008888889 |
| Week 28 | 2.046415094 | 1.991111111 |
| Week 29 | 2.056574074 | 2.008888889 |
| Week 30 | 2.108888889 | 2.026666667 |
| Week 31 | 2.09 | 2.026666667 |
| Week 32 | 2.10 | 2.044444444 |
| Week 33 | 2.12 | 2.044444444 |
| Week 34 | 2.16 | 2.044444444 |
| Week 35 | 2.13 | 2.133333333 |
| Week 36 | 2.17 | 2.044444444 |

Example 14—Average Egg Weight—Comparison with Standard Lighting and Time

Example 14 provides a comparison study of average egg weight. The study was conducted in Greeley, Colo. in the summer of 2016 using three lighting system, the Lighting Option 4 (shown in Table 1) of the lighting method of the current disclosure but on a standard commercial day/night cycle (15 hours ON at week 17 with a 15 minute increase each week), a control with standard fluorescent lighting on a standard commercial day/night cycle, and Lighting Option 4 using the lighting method of the current disclosure.

Eggs were produced in compliance with the United Egg Producers Animal Husbandry Guidelines using various strains of white leghorn varieties raised from pullets. Birds were housed in cages in blackout grow tents, with one bird per cage, and eight birds per tent. Birds were fed an all-natural, 100% vegetarian diet comprised predominantly of corn, soybean meal, limestone, vitamins and minerals, matching the diets, feeding and watering times for the commercial comparison birds.

Figure 33:
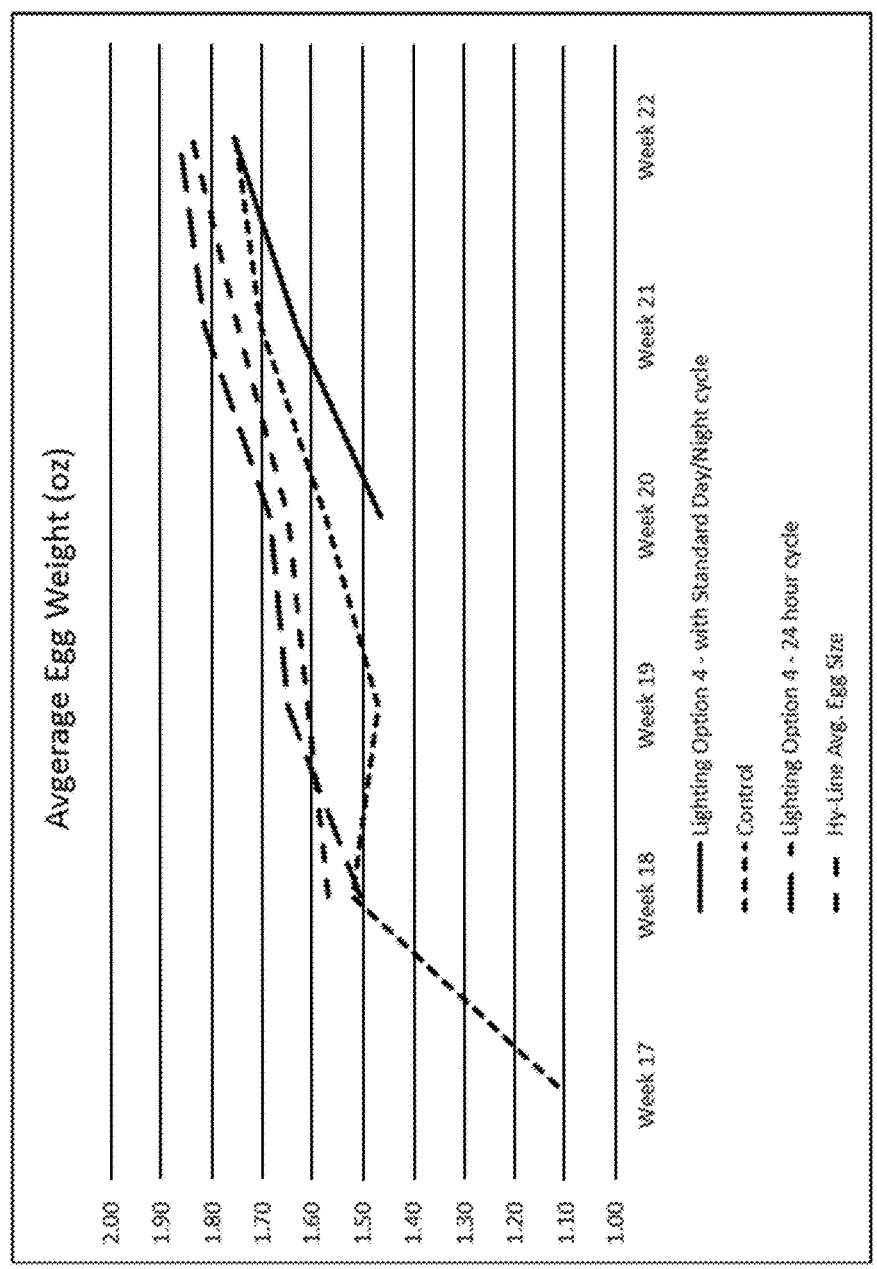
FIG. 33 is a graph showing a four-way comparison of average egg size using lighting option 4 of the current disclosure with standard day/night timing, 24 hour timing in comparison with a commercial control and the commercial average.

As shown in Table 15 below (and in FIG. 33), birds in the comparison produced small eggs (1.12 oz) (categorized as "PeeWee" by the USDA sizing, see United States Standards, Grades, and Weight Classes for Shell Eggs, AMS 56, Jul. 20, 2000) starting in week 17 with the control, however "PeeWee" eggs are not commercially viable. However, birds grown under Lighting Option 4 (24 hour (column 4)) quickly reached a commercially viable size of "Medium" at 1.82 oz per egg by week 21 and increased in weight to 1.87 oz per egg week 22. Lighting option 4 using standard commercial day/night timing, also reach a "Medium" weight of 1.76 oz per egg by week 22. The Control group reach a weight of 1.75 oz per by week 22 with the commercial average, shown in column 5 showing average commercial egg weights reaching a "Medium" by week 21.

TABLE 15

Average Egg Weight (oz)
Comparison Study with Commercial Control

| | Lighting Option 4 with commercial standard timing | Control | Lighting option 4 on a 24 hour cycle | Commercial Average |
|---|---|---|---|---|
| Week 17 | | 1.12 | | |
| Week 18 | | 1.52 | 1.51 | 1.57 |
| Week 19 | | 1.47 | 1.65 | 1.61 |
| Week 20 | 1.47 | 1.57 | 1.69 | 1.65 |
| Week 21 | 1.63 | 1.70 | 1.82 | 1.75 |
| Week 22 | 1.76 | 1.75 | 1.87 | 1.84 |

Increased Average Bird Weight

Six chicken weight gain over time studies were conducted in Greeley, Colo. in the winter and spring of 2016 using the lighting system and method of the current disclosure and compared standard commercial chicken weights for white leghorn varieties over the same period when raised under standard commercially available lights (see Hy-Line International, January 2016).

Birds raised under the lighting of the system and methods of the current disclosure were raised in compliance with the United Egg Producers Animal Husbandry Guidelines using various strains of white leghorn varieties raised from pullets. Birds were housed in cages in blackout grow tents, with one bird per cage, and eight birds per tent. Birds were fed an all-natural, 100% vegetarian diet comprised predominantly of corn, soybean meal, limestone, vitamins and minerals, matching the diets, feeding and watering times for the commercial comparison birds. Bird weights were captured using a common hanging scale and measured on a weekly basis, Tuesday mornings at 9 am.

Example 15—Average Bird Weight—Lighting Option One

Table 16 shows a comparison of the average bird (chicken) weight from 20 weeks to 31 weeks for birds housed and grown under the system and method of the current application using lighting Option One (shown in Table 1) when compared with the average bird weight (chicken) to the total number of birds in a conventional production facility using conventional commercial lighting.

Various strains of white leghorn varieties raised from pullets were used for the system of the current application. Birds were fed all natural, 100% vegetarian diet comprised predominantly of corn, soybean meal, limestone, vitamins and minerals, matching the diets, feeding and watering times with standard commercial practice. No hormones or stimulants were used.

Figure 34:
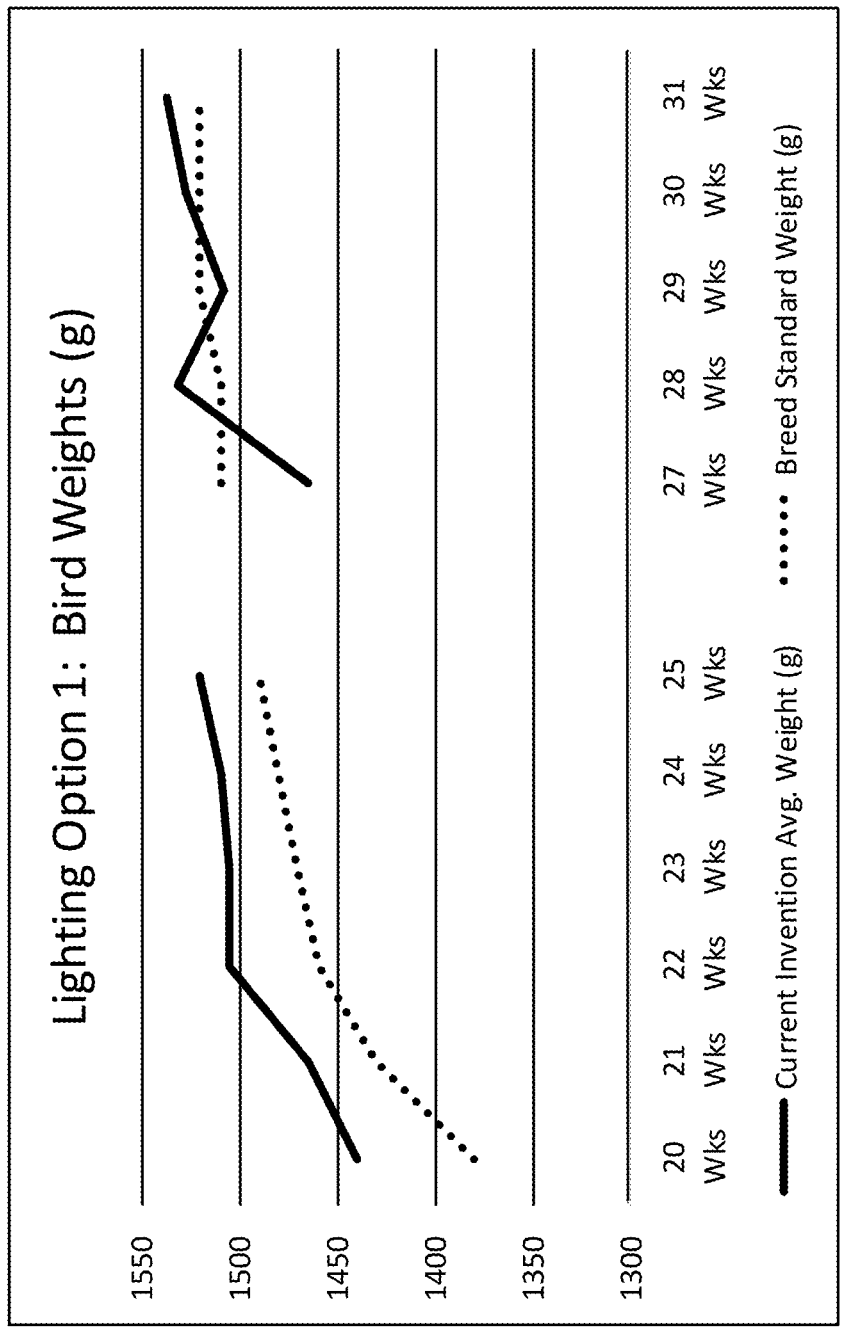
FIG. 34 is a graph showing a comparison of average bird weight in grams using lighting option 1 of the current disclosure with a commercial comparison.

As shown in Table 16 and illustrated in FIG. 34, the comparison began with 20 week old birds raised under the lighting of the system of the current application which showed an average weight 1440 g beginning in week 20, whereas the breed standard weight at 20 weeks is 1380 g. At 22 weeks, the average bird weight of the system of the present application was 1505 g, where the breed standard weight is 1460 g. At 25 weeks, the average bird weight of a bird raised under the system of the present application was 1520 g, compared to 1490 g for the breed standard weight. At 31 weeks, the average bird weight of a bird raised under the system of the present application was 1537.5 g, compared to 1520 g for the breed standard weight. Please note that a power failure at the bird housing facility at week 26 prevented a measure of birds for the week and caused a loss of weight in week 27 due to stress. As shown in Table 14, an, increase in average bird weight of 12 g per week was shown in birds raised under the lighting of the current application when compared to birds grown or living under a commercial lighting system.

TABLE 16

Average bird weight in grams (g)
Lighting Option 1

| Age | Bird Avg. Weight (g) using system of the present application | Breed Standard Weight (g) | Difference in bird weight between systems |
|---|---|---|---|
| 20 Weeks | 1440 | 1380 | 60 g |
| 21 Weeks | 1465 | 1430 | 35 g |
| 22 Weeks | 1505 | 1460 | 45 g |
| 23 Weeks | 1505 | 1470 | 35 g |
| 24 Weeks | 1510 | 1480 | 30 g |
| 25 Weeks | 1520 | 1490 | 30 g |
| 26 weeks | No data due to power outage | | |
| 27 Weeks | 1465 | 1510 | −45 g |
| 28 Weeks | 1532.5 | 1510 | 22.5 g |
| 29 Weeks | 1507.5 | 1520 | −13.5 g |
| 30 Weeks | 1527.5 | 1520 | 7.5 g |
| 31 Weeks | 1537.5 | 1520 | 17.5 g |
| Average weight difference over time | | | 12 g |

Example 16—Average Bird Weight—Lighting Option Two

Table 17 shows a comparison of the average bird (chicken) weight from 20 weeks to 31 weeks for birds housed and raised under the system and method of the current application using lighting option two (shown in Table 1) when compared with the average bird weight (chicken) to the total number of birds in a conventional production facility using conventional commercial lighting.

Various strains of white leghorn varieties raised from pullets were used for the system of the current application. Birds were fed all natural, 100% vegetarian diet comprised predominantly of corn, soybean meal, limestone, vitamins and minerals, matching the diets, feeding and watering times with standard commercial practice. No hormones or stimulants were used.

Figure 35:
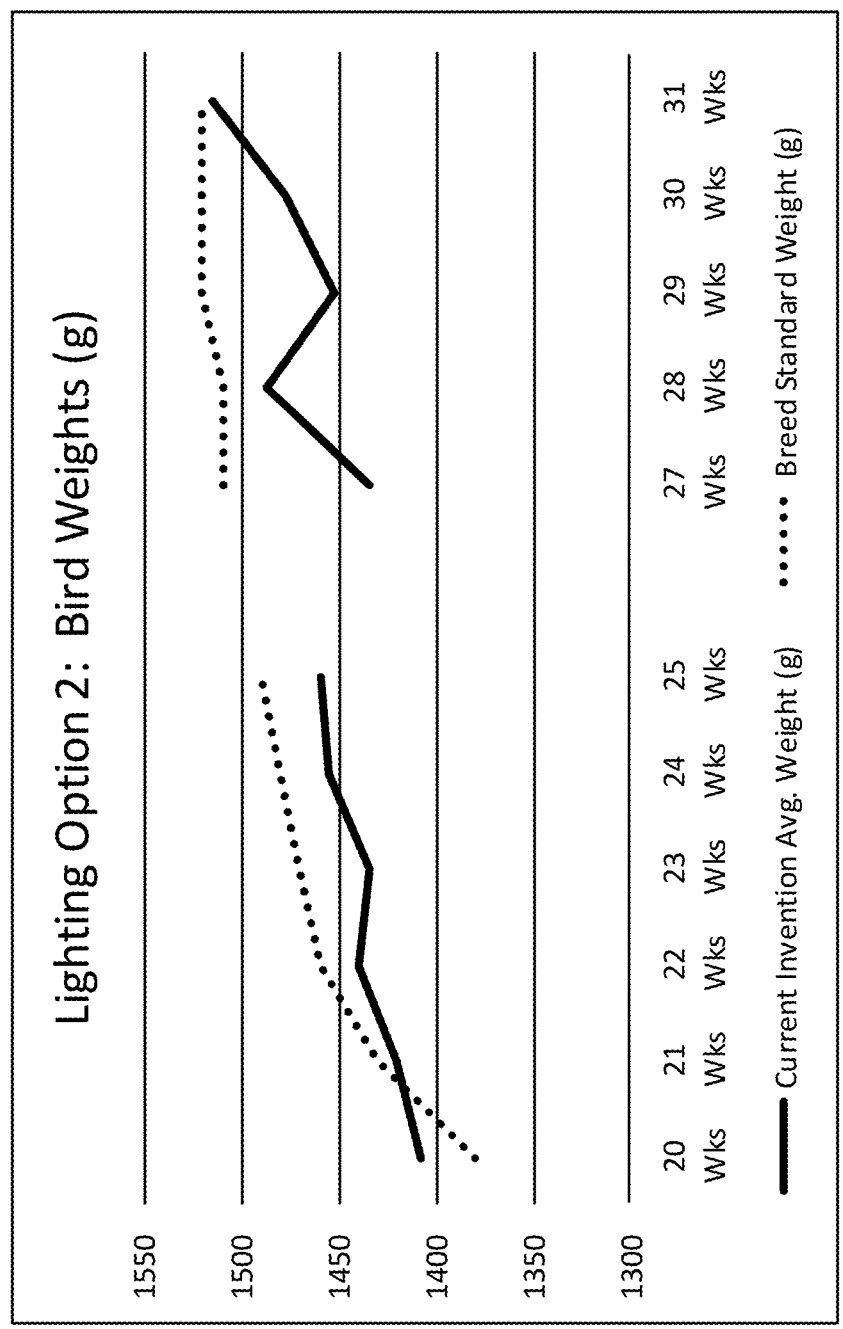
FIG. 35 is a graph showing a comparison of average bird weight in grams using lighting option 2 of the current disclosure with a commercial comparison.

As shown in Table 17 and illustrated in FIG. 35, the comparison began with 20 week old birds raised under the lighting of the system of the current application which showed an average weight 1407.5 g beginning in week 20, whereas the breed standard weight at 20 weeks is 1380 g. At 22 weeks, the average bird weight of the system of the present application was 1440 g, where the breed standard weight is 1460 g. At 25 weeks, the average bird weight of a bird raised under the system of the present application was 1460 g, compared to 1490 g for the breed standard weight. At 31 weeks, the average bird weight of a bird raised under the system of the present application was 1515.0 g, compared to 1520 g for the breed standard weight. Please note that a power failure at the bird housing facility at week 26 prevented a measure of bird week for the week and caused a loss of weight in week 27 due to stress.

TABLE 17

Average bird weight in grams (g)
Lighting Option 2

| Age | Bird Avg. Weight (g) using system of the present application | Breed Standard Weight (g) |
|---|---|---|
| 20 Weeks | 1407.5 | 1380 |
| 21 Weeks | 1420 | 1430 |
| 22 Weeks | 1440 | 1460 |
| 23 Weeks | 1435 | 1470 |
| 24 Weeks | 1455 | 1480 |
| 25 Weeks | 1460 | 1490 |
| 26 Weeks | No data due to power outage | |
| 27 Weeks | 1433.75 | 1510 |
| 28 Weeks | 1487.5 | 1510 |
| 29 Weeks | 1452.5 | 1520 |
| 30 Weeks | 1477.5 | 1520 |
| 31 Weeks | 1515 | 1520 |

Example 17—Average Bird Weight—Lighting Option Three

Table 18 shows a comparison of the average bird (chicken) weight from 20 weeks to 31 weeks for birds housed and raised under the system and method of the current application using lighting Option Three (shown in Table 1) when compared with the average bird weight (chicken) to the total number of birds in a conventional production facility using conventional commercial lighting.

Various strains of white leghorn varieties raised from pullets were used for the system of the current application. Birds were fed all natural, 100% vegetarian diet comprised predominantly of corn, soybean meal, limestone, vitamins and minerals, matching the diets, feeding and watering times with standard commercial practice. No hormones or stimulants were used.

Figure 36:
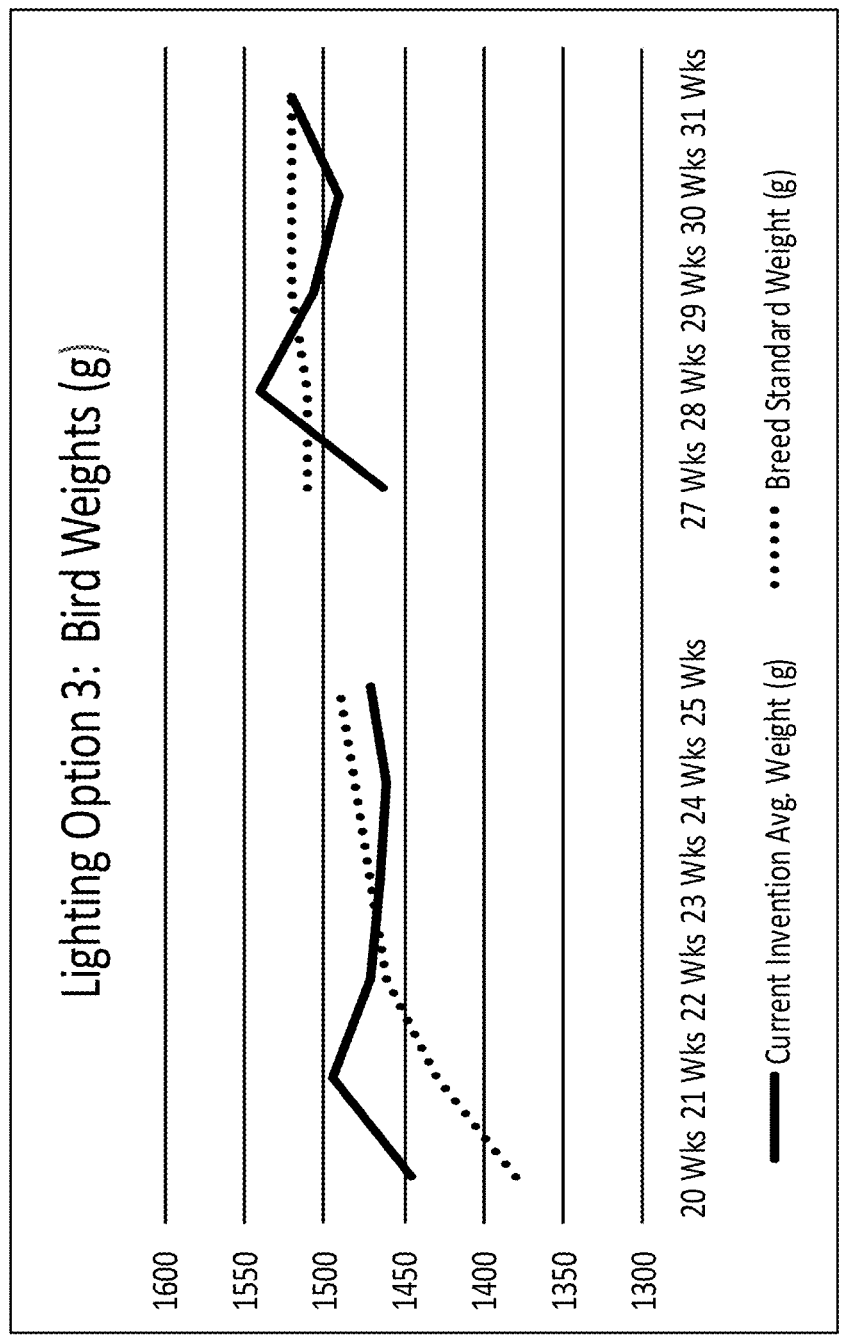
FIG. 36 is a graph showing a comparison of average bird weight in grams using lighting option 3 of the current disclosure with a commercial comparison.

As shown in Table 18 and illustrated in FIG. 36, the comparison began with 20 week old birds raised under the lighting of the system of the current application which showed an average weight 1445 g beginning in week 20, whereas the breed standard weight at 20 weeks is 1380 g. At 22 weeks the average bird weight of the system of the present application was 1470 g, where the breed stand weight is 1460 g. At 25 weeks the average bird weight of a bird raised under the system of the present application was 1470 g, compared to 1490 g for the breed standard weight. At 31 weeks the average bird weight of a bird raised under the system of the present application was 1520 g, compared to 1520 g for the breed standard weight. Please note that a power failure at the bird housing facility at week 26 prevented a measure of birds for the week and caused a loss of weight in week 27 due to stress. As shown in Table 16, an increase in average bird weight of 3.2 g per week was shown in birds raised under the lighting of the current application when compared to birds grown or living under a commercial lighting system.

TABLE 18

Average bird weight in grams (g)
Lighting Option 3

| Age | Bird Avg. Weight (g) using system of the present application | Breed Standard Weight (g) | Difference in bird weight between systems |
|---|---|---|---|
| 20 Weeks | 1445 | 1380 | 65 |
| 21 Weeks | 1495 | 1430 | 65 |
| 22 Weeks | 1470 | 1460 | 10 |
| 23 Weeks | 1465 | 1470 | −5 |
| 24 Weeks | 1460 | 1480 | −20 |
| 25 Weeks | 1470 | 1490 | −20 |
| 26 Weeks | No data due to power outage | | 0 |
| 27 Weeks | 1462.5 | 1510 | −47.5 |
| 28 Weeks | 1540 | 1510 | 30 |
| 29 Weeks | 1507.5 | 1520 | −12.5 |
| 30 Weeks | 1490 | 1520 | −30 |
| 31 Weeks | 1520 | 1520 | 0 |
| Average weight difference over time | | | 3.2 |

TABLE 19

Average bird weight in grams (g)
Lighting Option 4

| Age | Bird Avg. Weight (g) using system of the present application | Breed Standard Weight (g) | Terence in bird weight between systems |
|---|---|---|---|
| 20 Weeks | 1390 | 1380 | 10 g |
| 21 Weeks | 1460 | 1430 | 30 g |
| 22 Weeks | 1545 | 1460 | 85 g |
| 23 Weeks | 1555 | 1470 | 85 g |
| 24 Weeks | 1565 | 1480 | 85 g |
| 25 Weeks | 1580 | 1490 | 90 g |
| 26 Weeks | No data due to power outage | | |
| 27 Weeks | 1545 | 1510 | 35 g |
| 28 Weeks | 1602.5 | 1510 | 92.5 g |
| 29 Weeks | 1570 | 1520 | 50 g |
| 30 Weeks | 1585 | 1520 | 65 g |
| 31 Weeks | 1620 | 1520 | 100 g |
| Average weight difference over time | | | 66.1 g |

Example 18—Average Bird Weight—Lighting Option Four

Table 19 shows a comparison of the average bird (chicken) weight from 20 weeks to 31 weeks for birds housed and raised under the system and method of the current application using lighting Option Four (shown in Table 1) when compared with the average bird weight (chicken) to the total number of birds in a conventional production facility using conventional commercial lighting.

Various strains of white leghorn varieties raised from pullets were used for the system of the current application. Birds were fed all natural, 100% vegetarian diet comprised predominantly of corn, soybean meal, limestone, vitamins and minerals, matching the diets, feeding and watering times with standard commercial practice. No hormones or stimulants were used.

Figure 37:
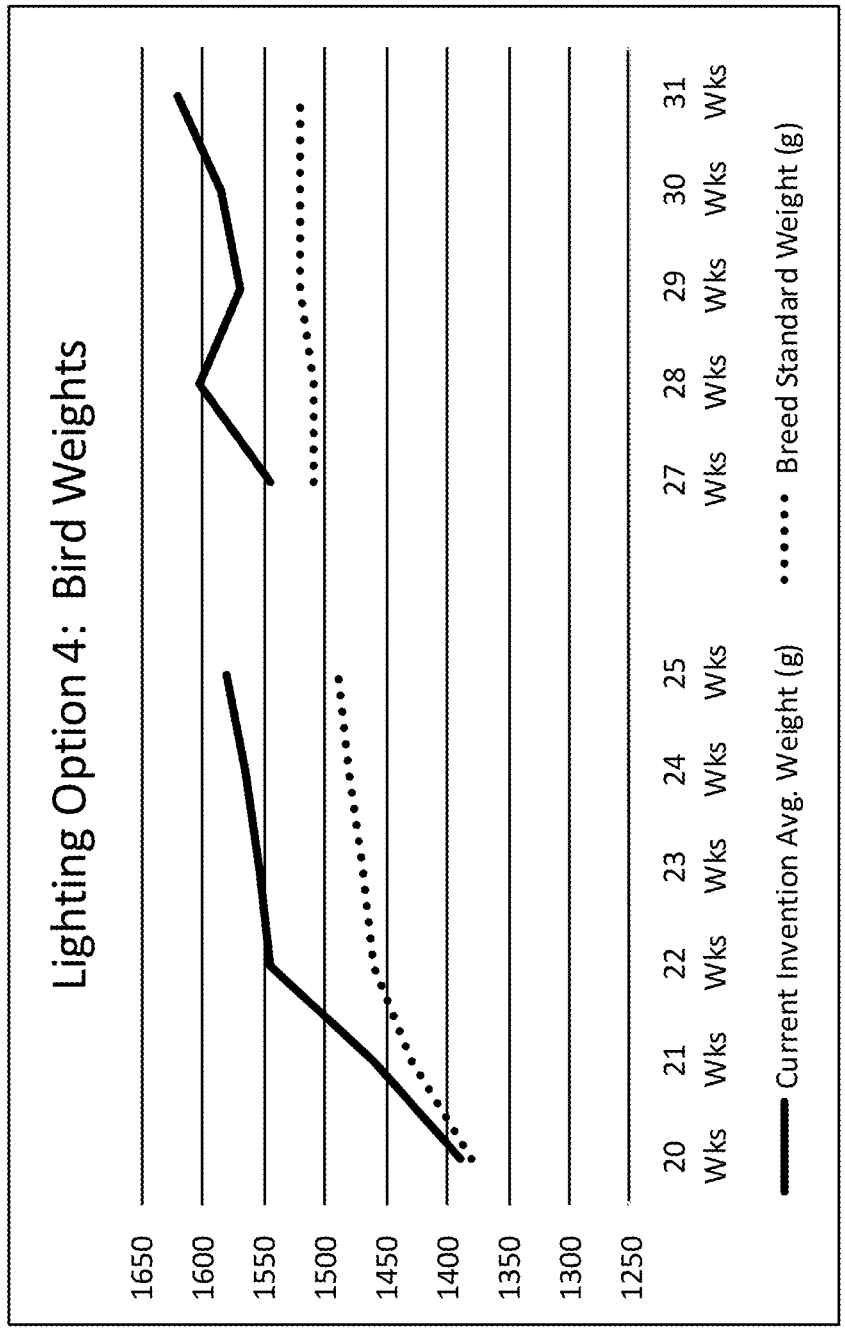
FIG. 37 is a graph showing a comparison of average bird weight in grams using lighting option 4 of the current disclosure with a commercial comparison.

As shown in Table 19 and illustrated in FIG. 37, the comparison began with 20 week old birds raised under the lighting of the system of the current application which showed an average weight 1445 g beginning in week 20, whereas the breed standard weight at 20 weeks is 1380 g. At 22 weeks, the average bird weight of the system of the present application was 1470 g, where the breed standard weight is 1460 g. At 25 weeks, the average bird weight of bird raised under the system of the present application was 1470 g, compared to 1490 g for the breed standard weight. At 31 weeks, the average bird weight of a bird raised under the system of the present application was 1520 g, compared to 1520 g for the breed standard weight. Please note that a power failure at the bird housing facility at week 26 prevented a measure of birds for the week and caused a loss of weight in week 27 due to stress. As shown in Table 17, an increase in average bird weight of 66.1 g per week was shown in birds raised under the lighting of the current application when compared to birds grown or living under a commercial lighting system.

Example 19—Average Bird Weight—Lighting Option Five

Table 20 shows a comparison of the average bird (chicken) weight from 20 weeks to 31 weeks for birds housed and raised under the system and method of the current application using lighting Option Five (shown in Table 1) when compared with the average bird weight (chicken) to the total number of birds in a conventional production facility using conventional commercial lighting.

Various strains of white leghorn varieties raised from pullets were used for the system of the current application. Birds were fed all natural, 100% vegetarian diet comprised predominantly of corn, soybean meal, limestone, vitamins and minerals, matching the diets, feeding and watering times with standard commercial practice. No hormones or stimulants were used.

Figure 38:
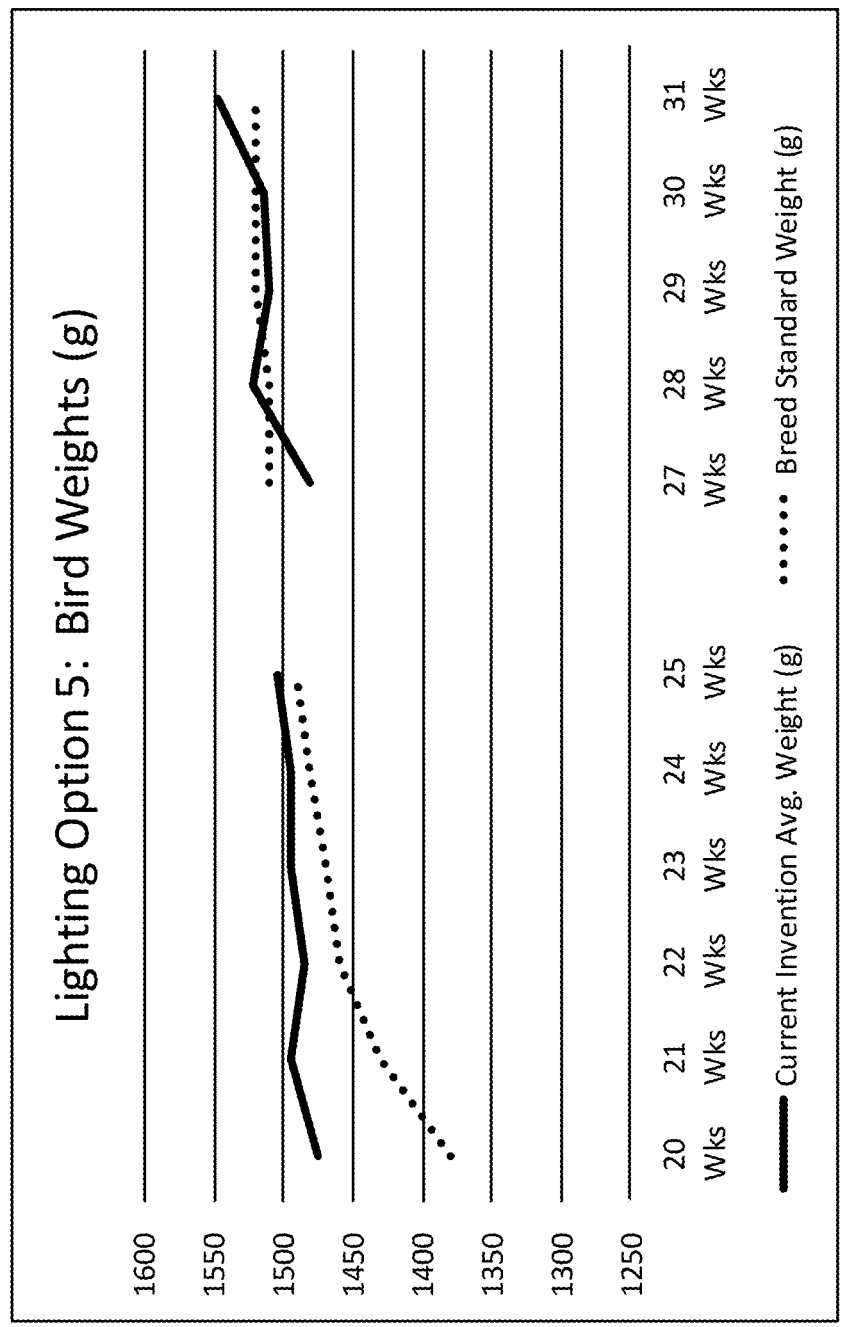
FIG. 38 is a graph showing a comparison of average bird weight in grams using lighting option 5 of the current disclosure with a commercial comparison.

As shown in Table 20 and illustrated in FIG. 38, the comparison began with 20 week old birds raised under the lighting of the system of the current application showed an average weight 1475 g beginning in week 20, whereas the breed standard weight at 20 weeks is 1380 g. At 22 weeks, the average bird weight of the system of the present application was 1485 g, where the breed standard weight is 1460 g. At 25 weeks, the average bird weight of a bird raised under the system of the present application was 1505 g, compared to 1490 g for the breed standard weight. At 31 weeks, the average bird weight of bird raised under the system of the present application was 1547.5 g, compared to 1520 g for the breed standard weight. Please note that a power failure at the bird housing facility at week 26 prevented a measure of birds for the week and caused a loss of weight in week 27 due to stress. As shown in Table 18, an increase in average bird weight 21.5 g per week was shown in birds raised under the lighting of the current application when compared to birds grown or living under a commercial lighting system.

TABLE 20

Average bird weight in grams (g)
Lighting Option 5

| Age | Bird Avg. Weight (g) using system of the present application | Breed Standard Weight (g) | Difference in bird weight between systems |
|---|---|---|---|
| 20 Weeks | 1475 | 1380 | 95 g |
| 21 Weeks | 1495 | 1430 | 65 g |
| 22 Weeks | 1485 | 1460 | 25 g |
| 23 Weeks | 1495 | 1470 | 25 g |
| 24 Weeks | 1495 | 1480 | 15 g |
| 25 Weeks | 1505 | 1490 | 15 g |
| 26 Weeks | No data due to power outage | | |
| 27 Weeks | 1481.25 | 1510 | −28.75 g |
| 28 Weeks | 1522.5 | 1510 | 12.5 g |
| 29 Weeks | 1510 | 1520 | −10 g |
| 30 Weeks | 1515 | 1520 | −5 g |
| 31 Weeks | 1547.5 | 1520 | 27.5 g |
| Average weight difference over time | | | 21.5 g |

TABLE 21

Average bird weight in grams (g)
Lighting Option 6

| Age | Bird Avg. Weight (g) using system of the present application | Breed Standard Weight (g) | Difference in bird weight between systems |
|---|---|---|---|
| 20 Weeks | 1435 | 1380 | 55 g |
| 21 Weeks | 1455 | 1430 | 25 g |
| 22 Weeks | 1460 | 1460 | 0 |
| 23 Weeks | 1490 | 1470 | 20 g |
| 24 Weeks | 1470 | 1480 | −10 g |
| 25 Weeks | 1475 | 1490 | −15 g |
| 26 Weeks | No data due to power outage | | |
| 27 Weeks | 1482.5 | 1510 | −27.75 g |
| 28 Weeks | 1527.5 | 1510 | 17.5 g |
| 29 Weeks | 1522.5 | 1520 | 2.5 g |
| 30 Weeks | 1530 | 1520 | 10 g |
| 31 Weeks | 1587.5 | 1520 | 67.5 g |
| Average weight difference over time | | | 13.16 g |

Example 20—Average Bird Weight—Lighting Option Six

Table 21 shows a comparison of the average bird (chicken) weight from 20 weeks to 31 weeks for birds housed and raised under the system and method of the current application using lighting Option Six (shown in Table 1) when compared with the average bird weight (chicken) to the total number of birds in a conventional production facility using conventional commercial lighting.

Various strains of white leghorn varieties raised from pullets were used for the system of the current application. Birds were fed all natural, 100% vegetarian diet comprised predominantly of corn, soybean meal, limestone, vitamins and minerals, matching the diets, feeding and watering times with standard commercial practice. No hormones or stimulants were used.

Figure 39:
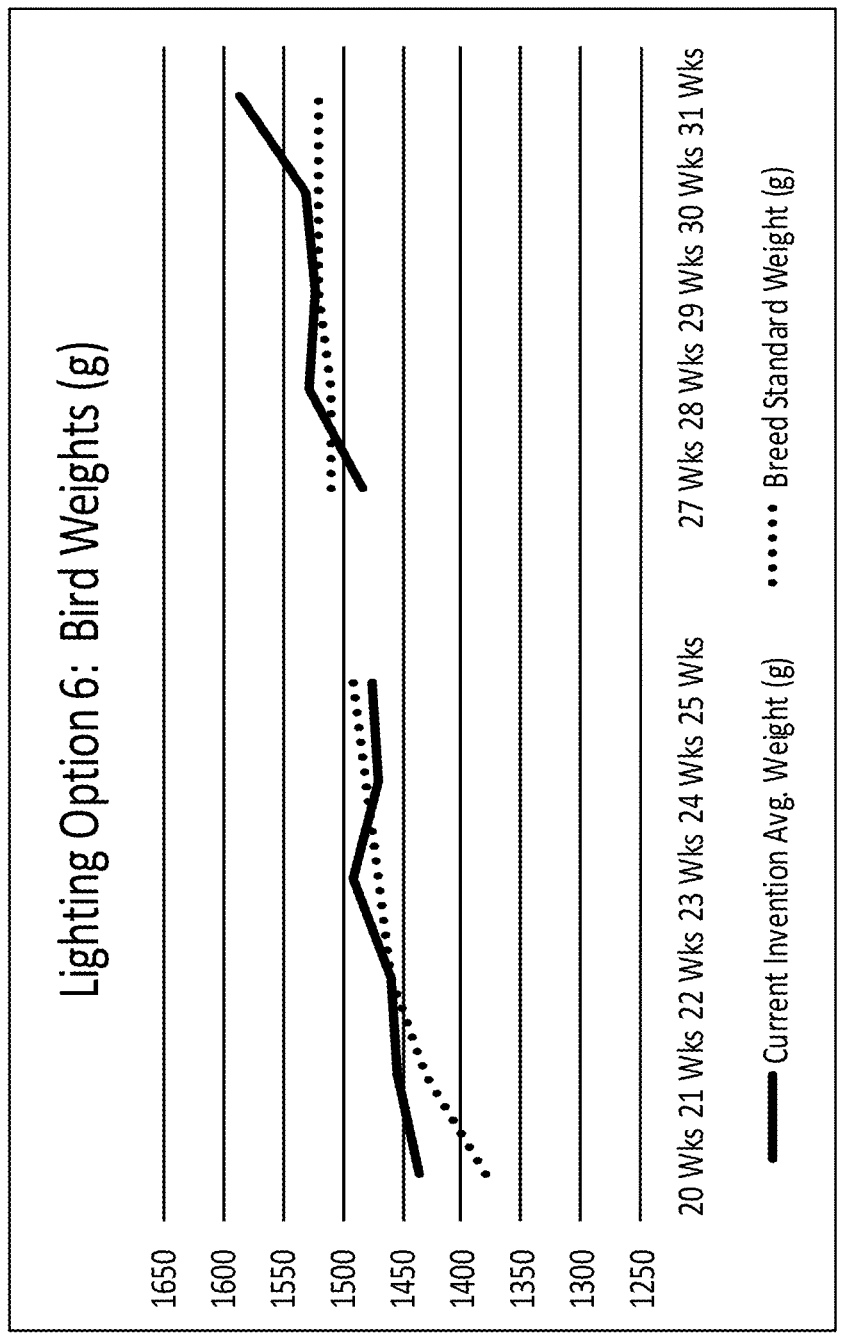
FIG. 39 is a graph showing a comparison of average bird weight in grams using lighting option 6 of the current disclosure with a commercial comparison.

As shown in Table 21 and illustrated in FIG. 39, the comparison began with 20 week old birds raised under the lighting of the system of the current application which showed an average weight 1435 g beginning in week 20, whereas the breed standard weight at 20 weeks is 1380 g. At 22 weeks, the average bird weight of the system of the present application was 1460 g, where the breed stand weight is 1460 g. At 25 weeks, the average bird weight of bird raised under the system of the present application was 1475 g, compared to 1490 g for the breed standard weight. At 31 weeks, the average bird weight of bird raised under the system of the present application was 1587.5 g, compared to 1520 g for the breed standard weight. Please note that a power failure at the bird housing facility at week 26 prevented a measure of bird week for the week and caused a loss of weight in week 27 due to stress. As shown in Table 19, an average increase average bird weight 13.16 g per week was shown in birds grown under the lighting of the current application when compared to birds grown or living under a commercial lighting system.

Example 21—Average Bird Weight—Comparison with Standard Lighting and Time

Example 21 provides a comparison study of average bird weight in grams. The study was conducted in Greeley, Colo. in the summer of 2016 using three lighting systems: Lighting Option 4 (shown in Table 1) of the lighting method of the current disclosure but on a standard commercial day/night cycle (15 hours ON at week 17 with a 15 minute increase each week), a control with standard fluorescent lighting on a standard commercial day/night cycle, and Lighting Option 4 and Option 5 using the lighting method of the current disclosure.

Birds produced under the system of the present application described herein were produced in compliance with the United Egg Producers Animal Husbandry Guidelines using various strains of white leghorn varieties raised from pullets. Birds were housed in cages in blackout grow tents, with one bird per cage, and eight birds per tent. Birds were fed an all-natural, 100% vegetarian diet comprised predominantly of corn, soybean meal, limestone, vitamins and minerals, matching the diets, feeding and watering times for the commercial comparison birds.

Birds raised under Lighting Option 4 on a 24 hour cycle were raised under Lighting Option 4 from weeks 13 to 16 and then switched to Lighting Option 5.

Birds raised under Lighting Option 4 on a standard commercial day/night cycle our cycle were raised under Lighting Option 5 from weeks 13 to 16 and then switched to Lighting Option 6.

Figure 40:
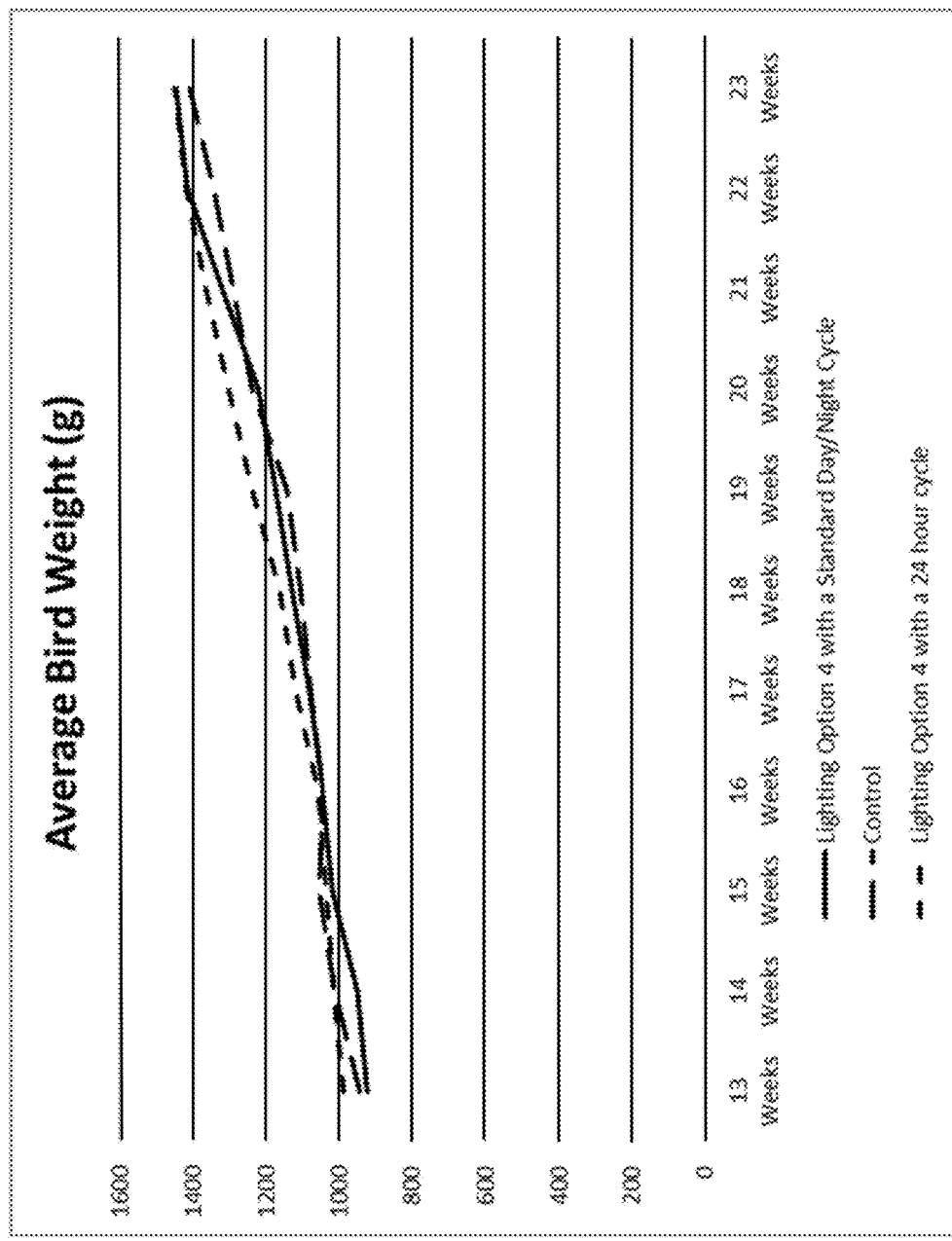
FIG. 40 is a graph showing a four-way comparison of average bird weight in grams using lighting option 4 of the current disclosure with standard day/night timing, 24 hour timing in comparison with a commercial control and the commercial average.

As shown in Table 22 below (and in FIG. 40) birds in the comparison grown under Lighting Option 4 on a 24 hour cycle consistently weighed more than birds raised under the control lighting once the lighting was changed to Option 5 at week 16. This was also true for birds raised under Lighting Option 4 on a standard day/night cycle once their lighting was changed to Option 6 at week 16.

TABLE 22

Average Bird Weight (g)
Comparison Study with Commercial Control

|  | Lighting Option 4 with commercial standard timing | Control | Lighting option 4 on a 24 hour cycle |
|---|---|---|---|
| Week 17 | 922.5 | 945 | 987.5 |
| Week 18 | 950 | 1012.5 | 1017.5 |
| Week 19 | 1020 | 1057.5 | 1037.5 |
| Week 20 | 1045 | 1047.5 | 1060 |
| Week 21 | 1082.5 | 1080 | 1122.5 |
| Week 22 | 1132.5 | 1107.5 | 1165 |

Example 22—Early Sexual Maturity in Female Birds

Visual studies of birds grown under the system of the present disclosure (such as lighting option 4) has shown earlier sexual maturity in birds when compared to the time of sexual maturity for birds grown under standard commercial lighting. Visual observations have shown that the combs, located on the top of the female birds, reach a larger size and with more symmetry, on birds that are grown under lights of the present disclosure.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

I claim:

1. A system for inducing a desired response in an organism, the system comprising:

at least one photon emission modulation controller in communication with at least one photon emitter, wherein said at least one photon emitter produces a photon signal to said organism, and wherein said photon signal comprises two or more independent components, wherein said two or more independent components comprise:

a first independent component comprising a repetitive first modulated photon pulse group, wherein said first modulated photon pulse group has one or more photon pulse ON durations between 0.01 microseconds and 999 milliseconds with one or more intensities, has one or more photon pulse OFF durations between 0.1 microseconds and 24 hours, and a wavelength color; and a second independent component comprising a repetitive second modulated photon pulse group, wherein said second modulated photon pulse group has one or more photon pulse ON durations between 0.01 microseconds and 999 milliseconds with one or more intensities, has one or more second photon pulse OFF durations between is between 0.1 microseconds and 24 hours, and a wavelength color;

wherein the first independent component and the second independent component are produced within said signal simultaneously;

wherein each pulse ON duration within said repetitive first modulated photon pulse group is initiated independently from each pulse ON duration within said repetitive second modulated photon pulse group;

wherein at least one of the one or more ON durations, one or more intensities, and one or more OFF durations of the second modulated photon pulse group are different from at least one of the one or more ON durations, one or more intensities, and one or more OFF durations of the first modulated photon pulse group;

wherein the wavelength color of the second modulated photon pulse group is different from the wavelength color of the first modulated photon pulse group; and wherein said signal is emitted toward said organism from said at least one photon emitter, wherein the combined effect of first modulated photon pulse group and the second modulated photon pulse group of the signal produces a desired response from said organism.

2. The system of claim 1, further comprising:

a third or more independent component comprising a repetitive third or more modulated photon pulse group, wherein said third or more modulated photon pulse group has one or more photon pulse ON durations between 0.01 microseconds and 5000 milliseconds with one or more intensities, has one or more photon pulse OFF durations between 0.1 microseconds and 24 hours, and one or more wavelength colors;

wherein the third or more independent component, the first independent component and the second independent component are produced within said signal simultaneously;

wherein the wavelength color of the third modulated photon pulse group is different from at least one of the wavelength color of the first modulated photon pulse group and the second modulated photon pulse group;

wherein at least one of the one or more ON durations, one or more intensities, and one or more OFF durations of the repetitive third or more modulated photon pulse group is different from the at least one of the one or more ON durations, one or more intensities, and one or more OFF durations of second modulated photon pulse group and the first modulated photon pulse group; and wherein said signal is emitted toward said organism from said at least one photon emitter, wherein the combined effect of the repetitive third or more modulated photon pulse group, the first modulated photon pulse group and the second modulated photon pulse group of the signal produces a desired response from said organism.

3. The system of claim 1, further comprising:

a master logic controller in communication with said at least one photon emission modulation controller, wherein said master logic controller sends commands to said at least one photon emission modulation controller controlling the modulated pulse groups of said first independent component and said second independent component from said at least one photon emitters.

4. The system of claim 3, further comprising at least one sensor, wherein said at least one sensor is capable of monitoring at least one condition associated with said organism, wherein said at least one condition associated with said organism is an environmental condition associated with said organism or a physiological condition associated with said organism;

wherein said at least one sensor is operably linked to a first communication device, wherein said first communication device sends data from said at least one sensor to said master logic controller.

5. The system of claim 4, wherein said master logic controller adjusts said components of second modulated photon pulse group and said first modulated photon pulse group based upon said data from said at least one sensor.

6. The system of claim 4, further comprising said master logic controller in communication with an irrigation source, wherein said irrigation source provides irrigation events to said organism.

7. The system of claim 6, wherein said master logic controller is capable of adjusting the timing and duration of an irrigation event to said organism based upon said data from said at least one sensor.

8. The system of claim 4, further comprising said master logic controller in communication with a nutrient source, wherein said nutrient source is capable of providing nutrient events to said organism.

9. The system of claim 8, wherein said master logic controller is capable of adjusting the timing and duration of a nutrient event to said organism based upon said data from said at least one sensor.

10. The system of claim 4, wherein said at least one sensor is selected from the group comprising a stem diameter sensor, a fruit diameter sensor, a leaf temperature sensor, a relative-rate sap sensor, an infrared sensor, a gas, a photorespiration sensor, a respiration sensor, a near-infrared sensor, camera, a pH sensor and combinations thereof.

11. The system of claim 3, wherein said master logic controller is in communication with a power consumption sensor that monitors the power usage of said at least one photon emitter and wherein said power consumption sensor is in communication with a host that is external to said master logic controller.

12. The system of claim 3, further comprising:
a master logic controller in communication with said at least one photon emission modulation controller, wherein said master logic controller sends commands to said at least one photon emission modulation controller controlling the modulated pulse groups of said first independent component, said second independent component and said third or more independent component from said at least one photon emitters.

13. The system of claim 12, further comprising:
wherein said master logic controller is in communication with said at least one photon emission modulation controller, wherein said master logic controller is capable of sending commands to said at least one photon emission modulation controller controlling the components of said third or more modulated photon pulse group.

14. The system of claim 1, wherein said at least one photon emitter is selected from the group of incandescent (Tungsten-halogen and Xenon), Fluorescent (CFL's), high intensity discharge (Metal Halide, High-Pressure Sodium, Low-Pressure Sodium, Mercury Vapor), and light emitting diode.

15. The system of claim 14, wherein said system has a power savings of at least 50%.

16. The system of claim 1, wherein said at least one photon emission modulation controller is selected from the group comprising a solid-state relay, a metal-oxide-semiconductor field-effect transistor, a field-effect transistor, a Zener diode, optical chopper and a device that induces modulation of said first modulated photon pulse group and said second modulated photon pulse group.

17. The system of claim 1, wherein said first wavelength color of said first wavelength band of said first modulated photon pulse is chosen from the group comprising near red, far-red, blue, infra-red, yellow, orange, and ultra-violet.

18. The system of claim 1, wherein said second wavelength color of said second wavelength band of said second modulated photon pulse is chosen from the group comprising near red, far-red, blue, infra-red, yellow, orange, and ultra-violet.

19. The system of claim 1, wherein said first wavelength color of said first modulated photon pulse group has a wavelength between 0.1 nm and 1 cm; and
wherein said second wavelength color of said second modulated photon pulse group has a wavelength between 0.1 nm and 1 cm.

20. The system of claim 1, wherein at least two of the components of said second modulated photon pulse group is the same as at least two of the components of said first modulated photon pulse group.

21. The system of claim 1, wherein said first modulated photon pulse group has a change in light quantum of at least 5%.

22. The system of claim 1, wherein said second modulated photon pulse group has a change in light quantum of at least 5%.

23. The system of claim 1, wherein said first modulated photon pulse group and second modulated photon pulse group have a duty cycle that ranges between 0.1% to 93%.

24. The system of claim 1, wherein said desired response from said organism is chosen from growth, repair and destruction.

25. The system of claim 1, wherein said desired response from said organism is chosen from a photosynthetic response, a phototropic response and a photoperiodic response.

26. The system of claim 1, wherein said organism is selected from the group comprising: bacteria, basidiomycetes, ascomycetes, sacchromycetes, angiosperms, pteridophytes, gymnosperms, cyanobacteria, diatoms, photosynthetic unicells, eukaryotic green algae, organisms within the kingdom Animalia and tissues thereof.

27. The system of claim 1, wherein said first modulated pulse group has one or more photon pulse ON durations between 0.01 microseconds and 999 microseconds; and
said second modulated pulse group has one or more photon pulse ON durations between 0.01 microseconds and 999 microseconds.

28. The system of claim 1, wherein said first modulated pulse group has one or more photon pulse ON durations between 999 microseconds and 99 milliseconds; and
said second modulated pulse group has one or more photon pulse ON durations between 999 microseconds and 99 milliseconds.

29. The system of claim 1, wherein said first modulated pulse group has one or more photon pulse ON durations between 99 milliseconds and 999 milliseconds; and
said second modulated pulse group has one or more photon pulse ON durations between 99 milliseconds and 999 milliseconds.

30. A system for inducing a desired response in an organism, the system comprising:
at least one photon emission modulation controller in communication with at least one photon emitter, wherein said at least one photon emitter produces a photon signal to said organism, and wherein said photon signal comprises two or more independent components, wherein said two or more independent components comprise:

a first independent component comprising a repetitive first modulated photon pulse group, wherein said first modulated photon pulse group has one or more photon pulse ON durations between 0.01 microseconds and 999 milliseconds with one or more intensities, has one or more photon pulse OFF durations between 0.1 microseconds and 999 milliseconds, and a wavelength color; and a second independent component comprising a repetitive second modulated photon pulse group, wherein said second modulated photon pulse group has one or more photon pulse ON durations between 0.01 microseconds and 999 milliseconds with one or more intensities, has one or more second photon pulse OFF durations between is between 0.1 microseconds and 999 milliseconds, and a wavelength color;

wherein the first independent component and the second independent component are produced within said signal simultaneously;

wherein at least two of the one or more ON durations, one or more intensities, and one or more OFF durations of the second modulated photon pulse group is the same as the at least two of the one or more ON durations, one or more intensities, and one or more OFF durations of the first modulated photon pulse group; and wherein said signal is emitted toward said organism from said at least one photon emitter, wherein the combined effect of first modulated photon pulse group and the second modulated photon pulse group of the signal produces a desired response from said organism.

* * * * *